(12) United States Patent
Yamagami et al.

(10) Patent No.: US 7,496,211 B2
(45) Date of Patent: Feb. 24, 2009

(54) IMAGE PROCESSING APPARATUS, IMAGE PROCESSING METHOD, AND IMAGE PROCESSING PROGRAM

(75) Inventors: Rui Yamagami, Kanagawa (JP); Yoko Takahashi, Kanagawa (JP); Osamu Date, Tokyo (JP)

(73) Assignee: Sony Corporation (JP)

( * ) Notice: Subject to any disclaimer, the term of this patent is extended or adjusted under 35 U.S.C. 154(b) by 781 days.

(21) Appl. No.: 10/486,609

(22) PCT Filed: Jun. 11, 2003

(86) PCT No.: PCT/JP03/07409
§ 371 (c)(1),
(2), (4) Date: Oct. 22, 2004

(87) PCT Pub. No.: WO03/105474
PCT Pub. Date: Dec. 18, 2003

(65) Prior Publication Data
US 2005/0044489 A1 Feb. 24, 2005

(30) Foreign Application Priority Data
Jun. 11, 2002 (JP) .............................. 2002-169565
Jul. 12, 2002 (JP) .............................. 2002-203479

(51) Int. Cl.
*G06K 9/00* (2006.01)
*G06F 3/00* (2006.01)
(52) U.S. Cl. ...................................... 382/103; 715/719
(58) Field of Classification Search ................. 382/103, 382/107, 125, 149, 189, 190, 198, 214, 236, 382/287, 309; 386/1, 4, 52, 53, 55, 126; 715/715, 716, 723, 725, 784, 786, 207, 223, 715/235, 255, 273, 719, 732, 761, 867
See application file for complete search history.

(56) References Cited

U.S. PATENT DOCUMENTS

| | | | |
|---|---|---|---|
| 5,838,320 A | 11/1998 | Matthews, III et al. | |
| 5,926,603 A | 7/1999 | Tanaka et al. | |
| 5,974,219 A * | 10/1999 | Fujita et al. | .................... 386/52 |
| 6,323,877 B1 * | 11/2001 | Katoh et al. | ................. 345/638 |
| 6,618,491 B1 * | 9/2003 | Abe | ........................... 382/107 |
| 6,670,966 B1 * | 12/2003 | Kusanagi | .................... 715/723 |
| 6,704,029 B1 * | 3/2004 | Ikeda et al. | .................. 715/723 |

FOREIGN PATENT DOCUMENTS

| | | |
|---|---|---|
| EP | 0 843 311 A2 | 5/1998 |
| GB | 2 342 216 A | 4/2000 |
| JP | 4-330881 A | 11/1992 |
| JP | 5-260431 A | 10/1993 |
| JP | 6-302161 | 10/1994 |
| JP | 10-51734 A1 | 2/1998 |
| JP | 10-285523 A1 | 10/1998 |
| WO | WO-84/02606 A1 | 7/1984 |
| WO | WO-98/46018 A1 | 10/1998 |
| WO | WO-00/28543 A1 | 5/2000 |

* cited by examiner

*Primary Examiner*—Abolfazl Tabatabai
(74) *Attorney, Agent, or Firm*—Lerner, David, Littenberg, Krumholz & Mentlik, LLP

(57) ABSTRACT

An image detecting apparatus has an edit function with good operability and compatibility. When a chapter mark key on a remote control is pressed while an image reproducing system including an MPEG video decoder, a video signal post-processing circuit, a combining circuit, and an NTSC encoder is reproducing image data recorded on a recording medium, a CPU obtains information for identifying the image being reproduced and displayed, and then records the information on the recording medium. With reference to the image provided with a chapter mark, a still image generating circuit displays reduced still images, for example, so that a target image can be specified. Reproduction and editing can be performed with reference to the specified image.

30 Claims, 31 Drawing Sheets

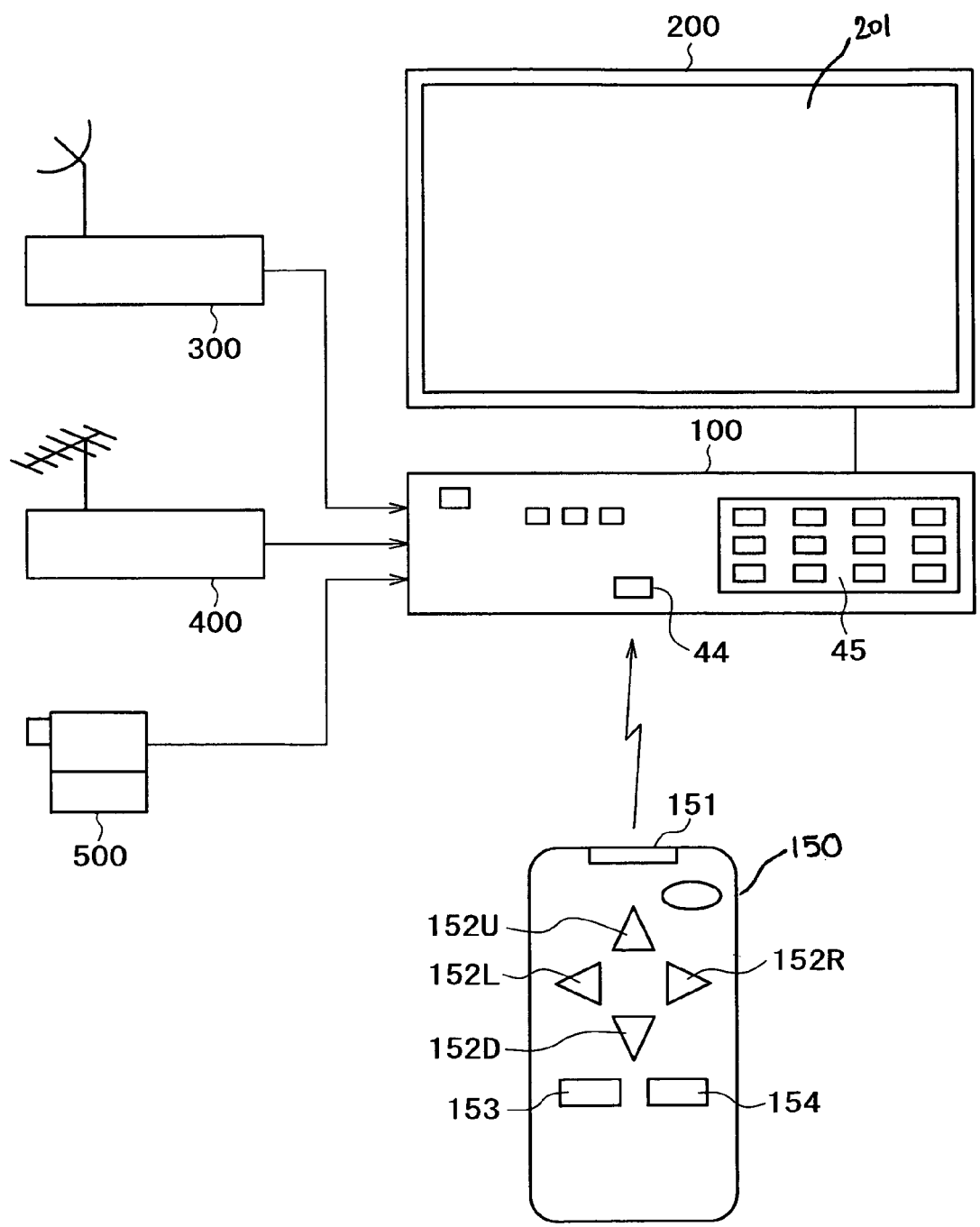

F I G. 7
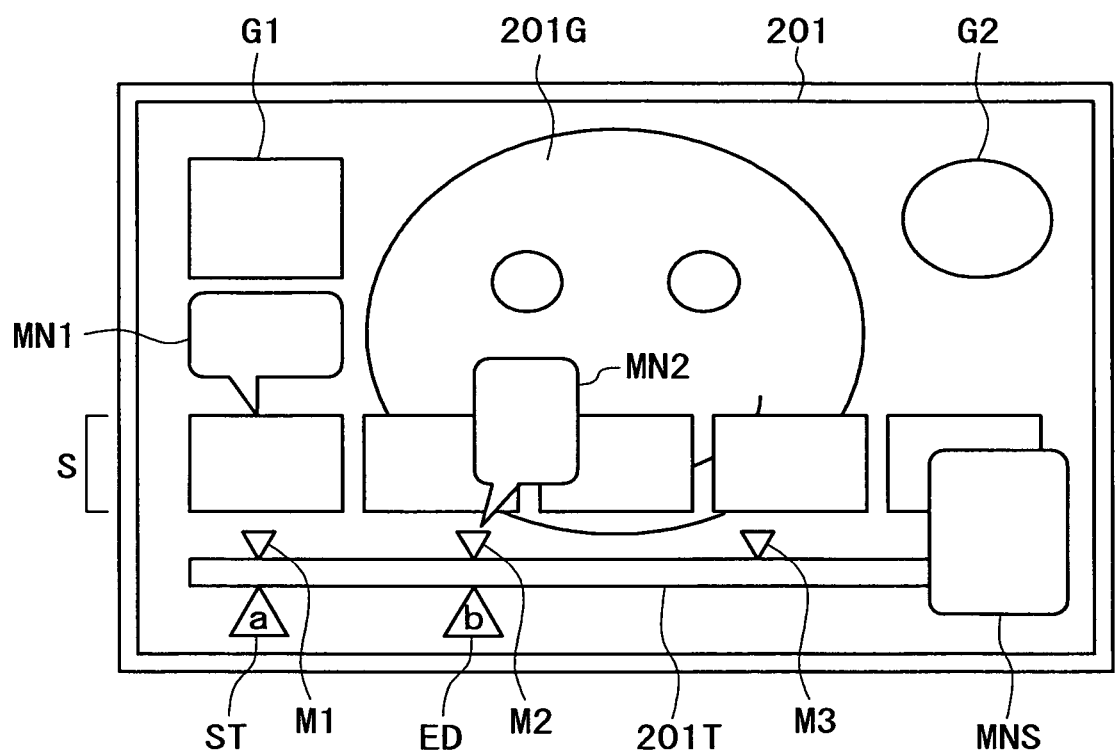

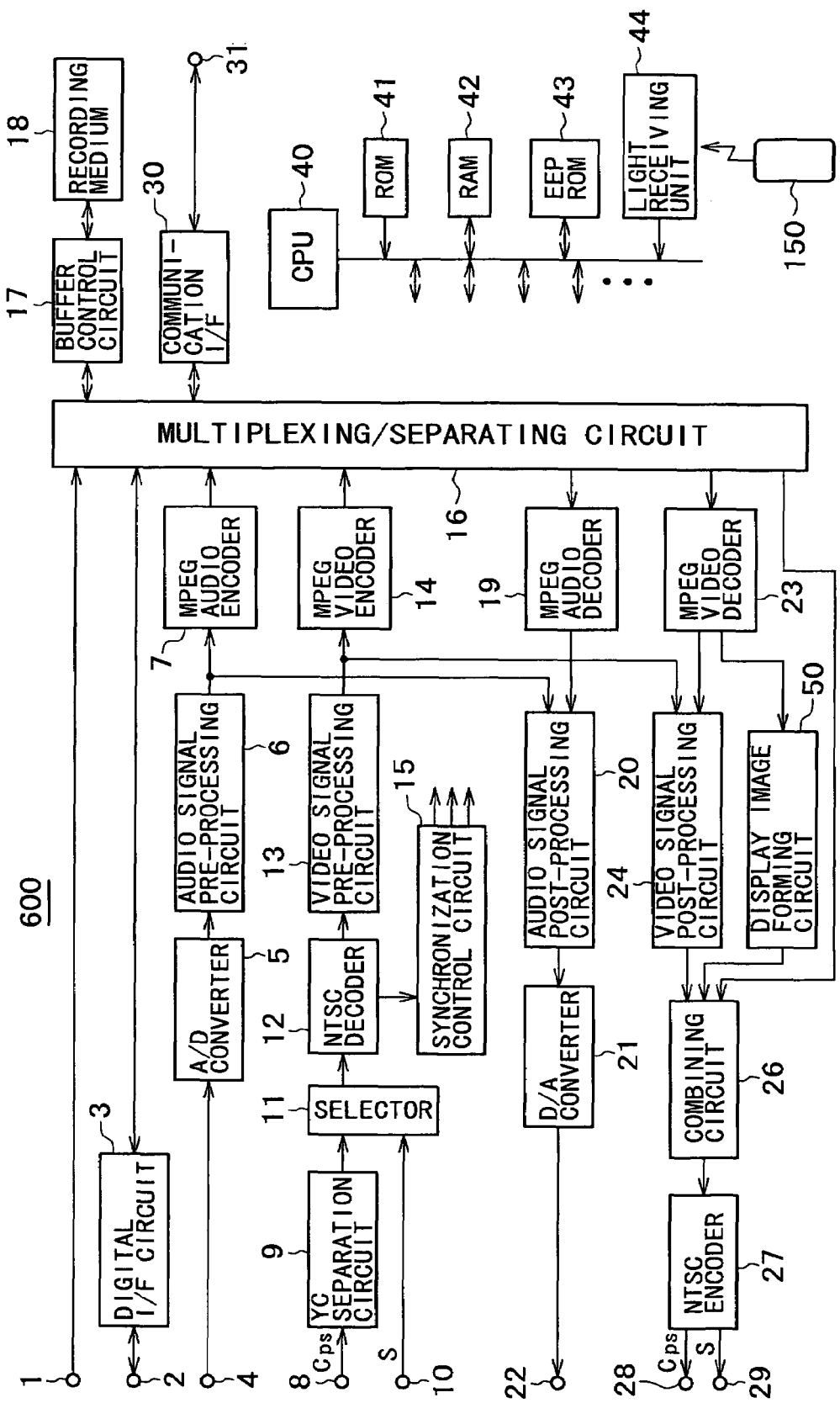

F I G. 1 4
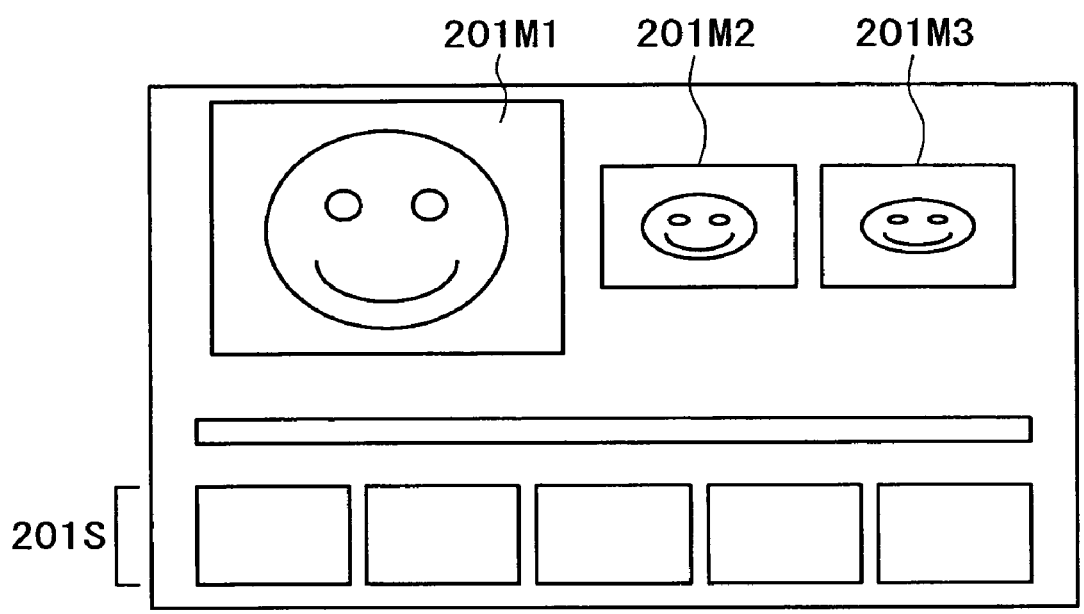

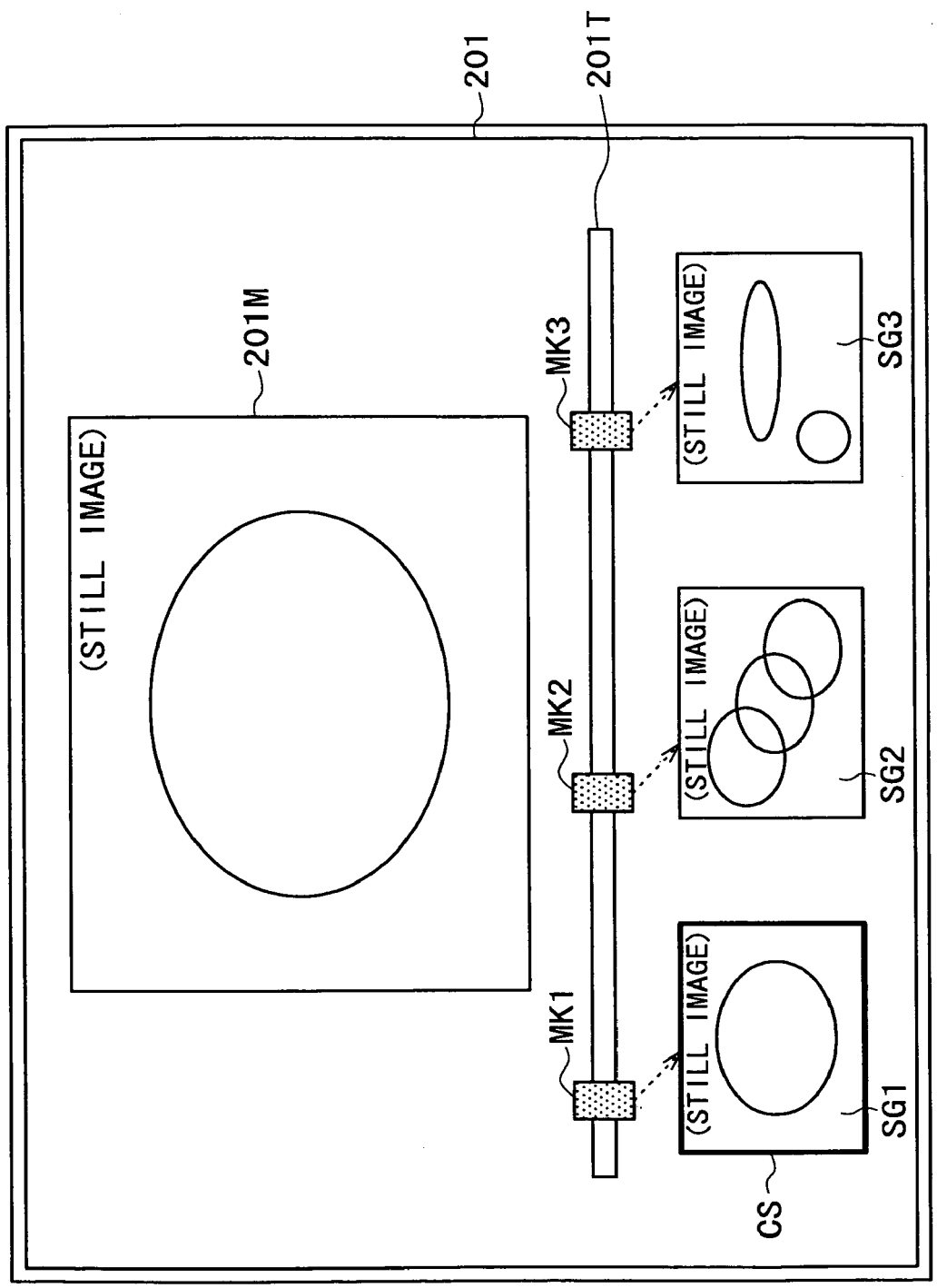

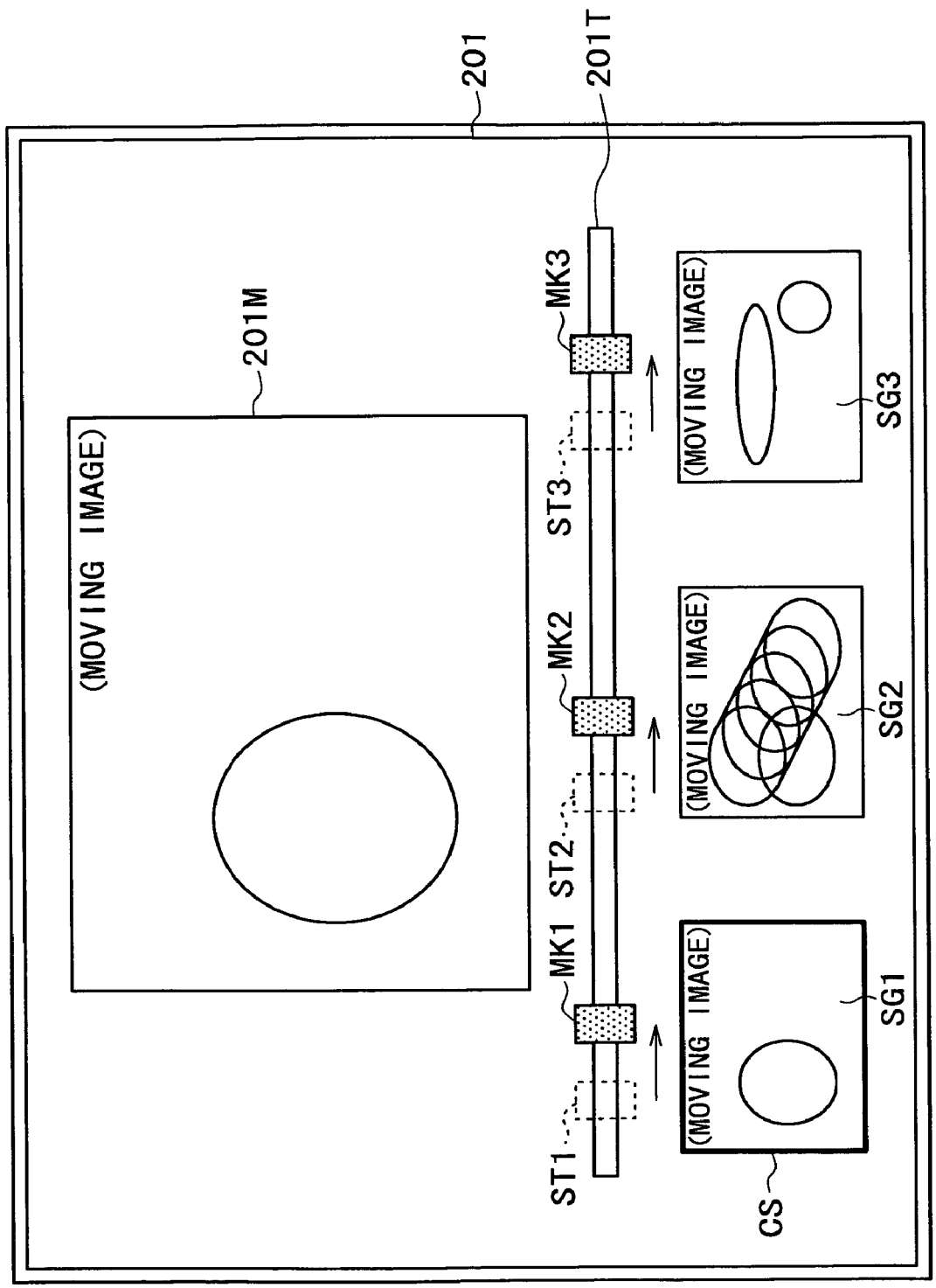

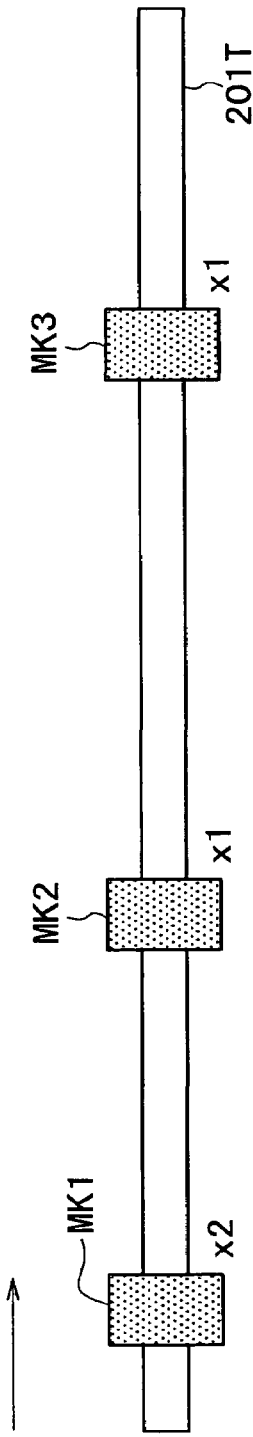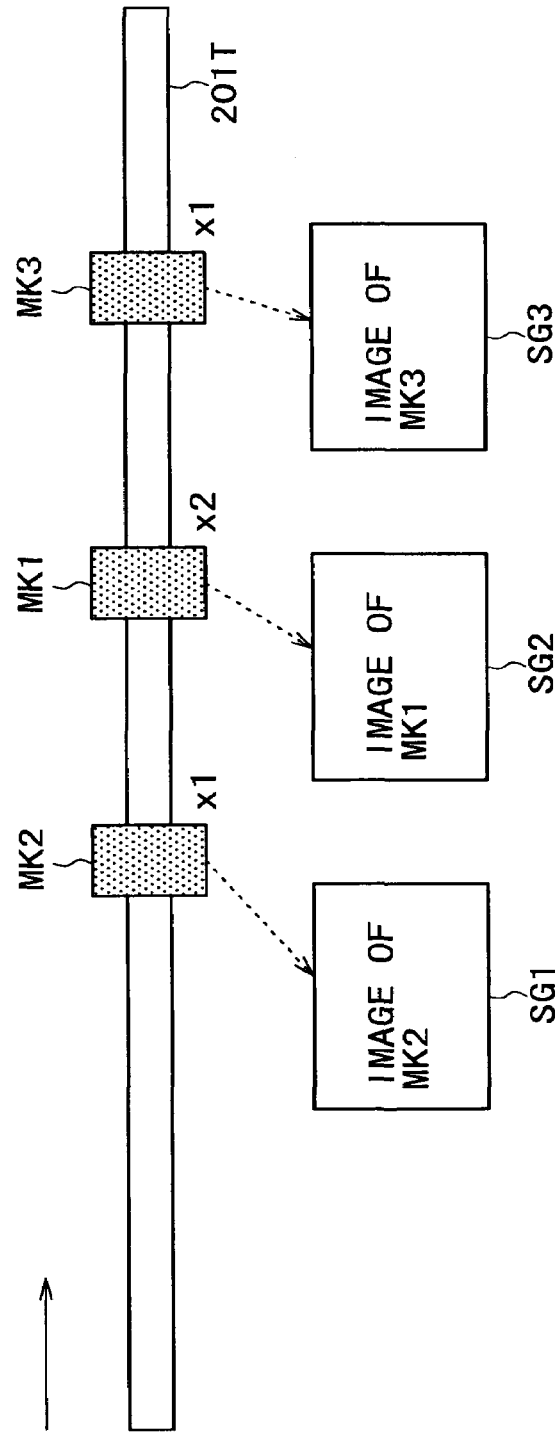

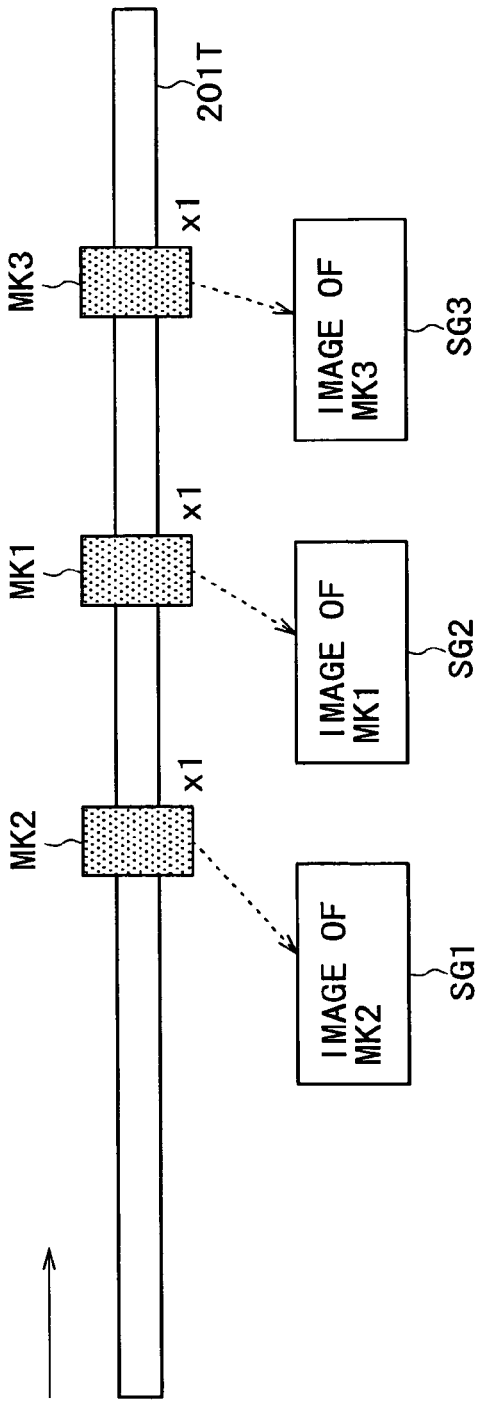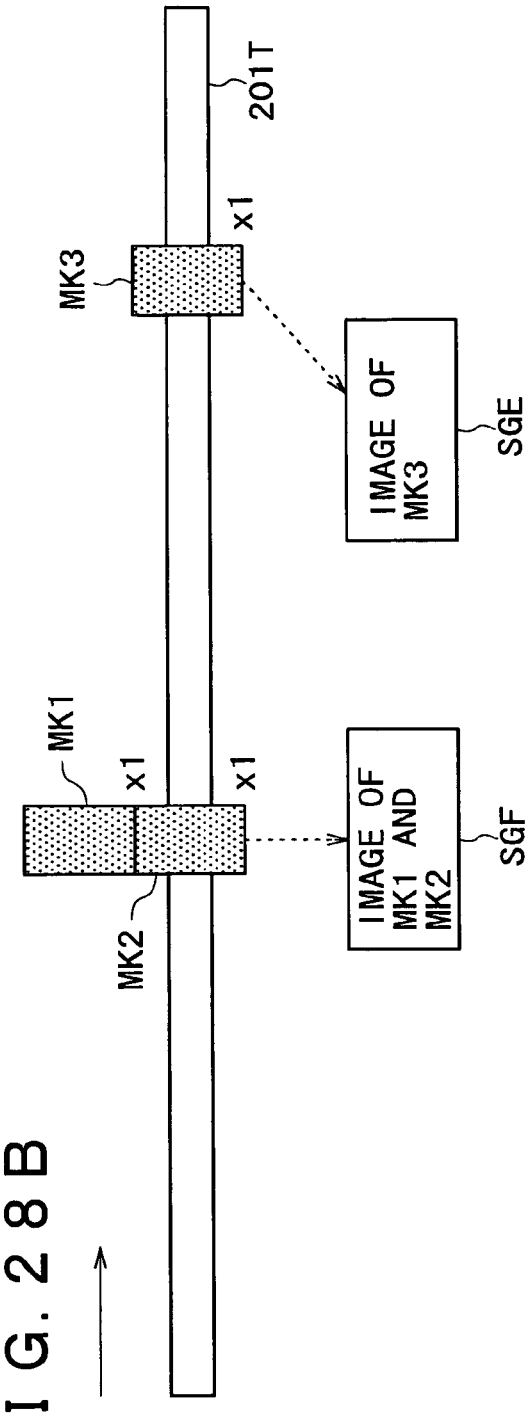

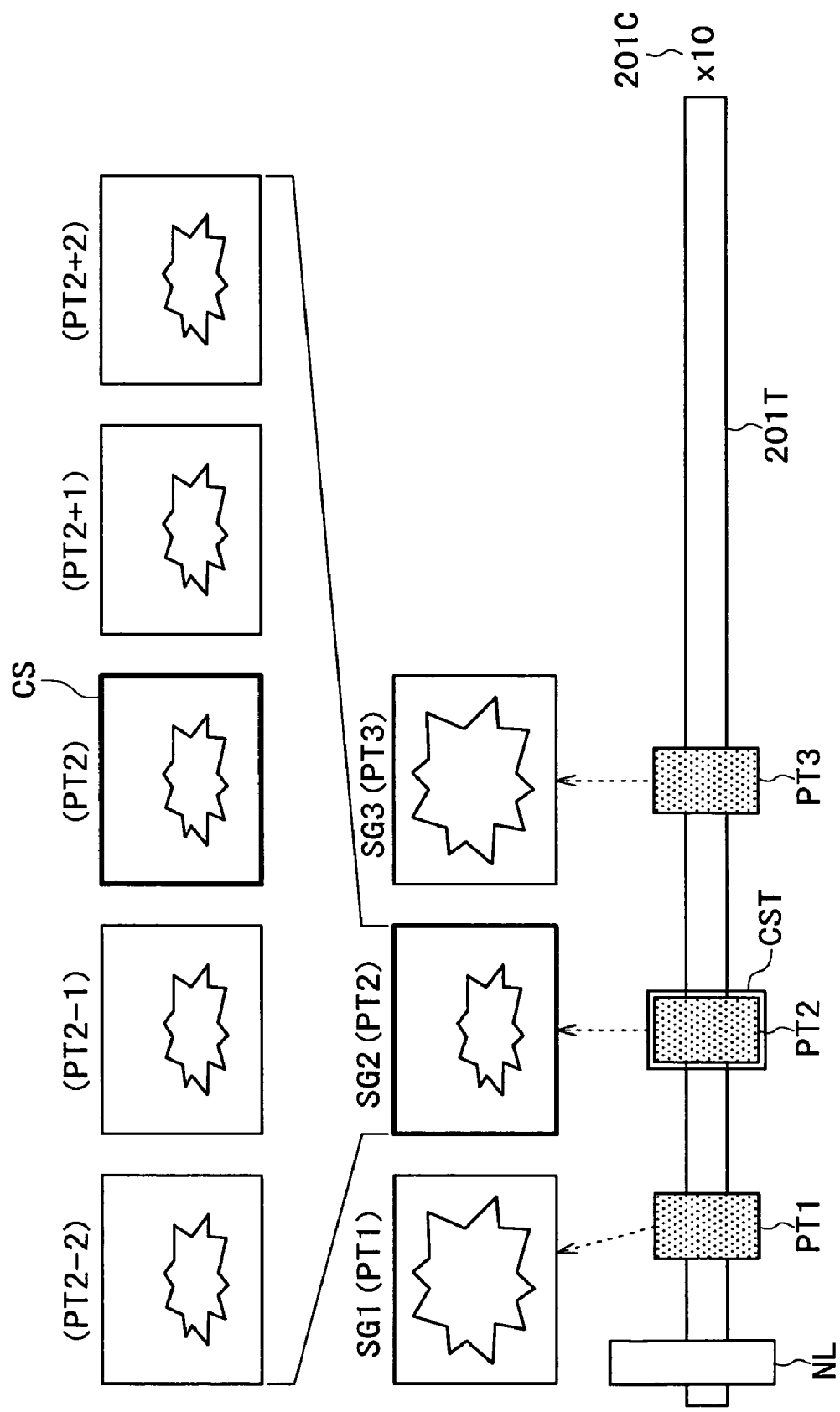

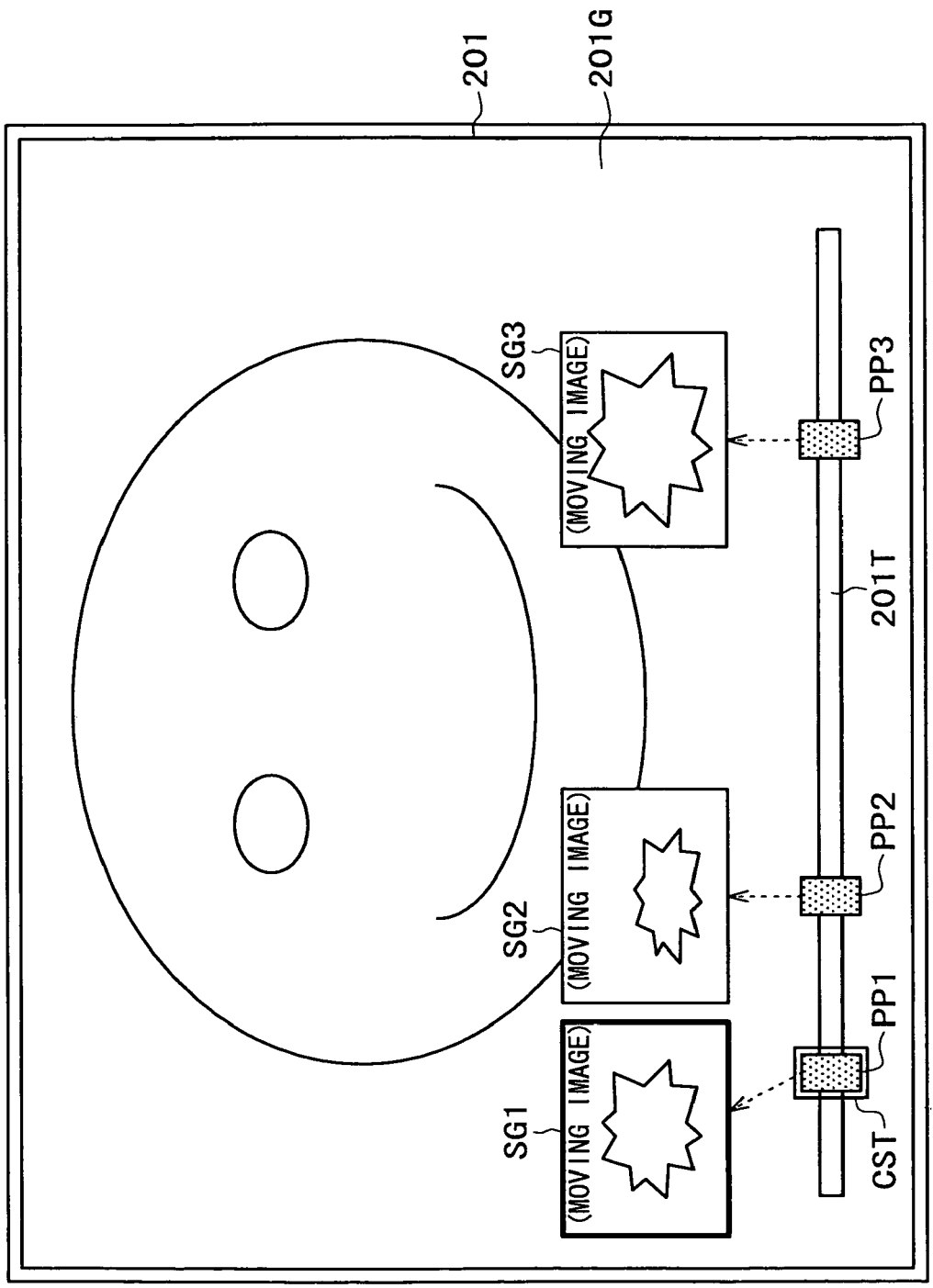

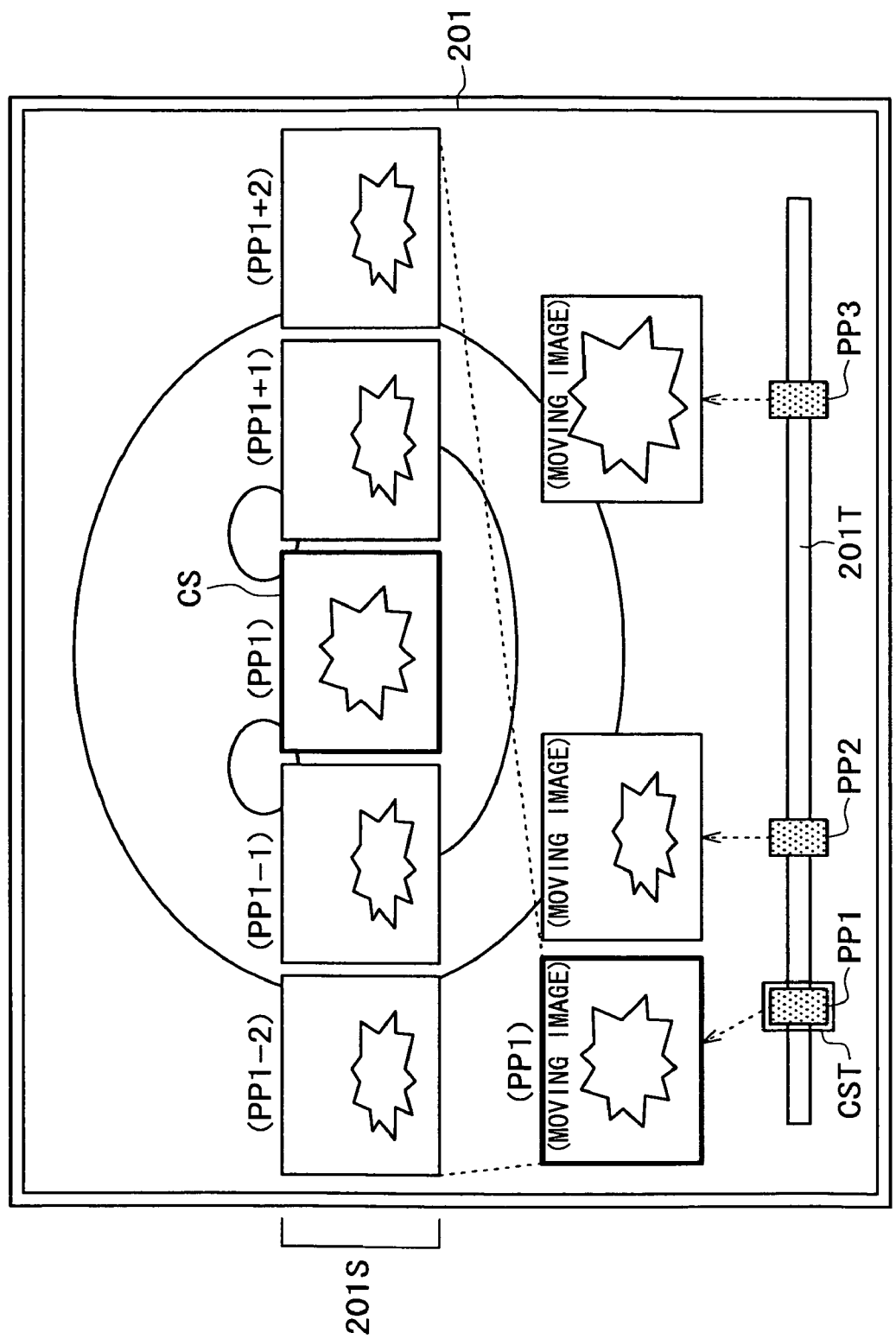

IMAGE PROCESSING APPARATUS, IMAGE PROCESSING METHOD, AND IMAGE PROCESSING PROGRAM

BACKGROUND OF THE INVENTION

The present invention relates to an image detecting apparatus included in a digital recorder, for example, for detecting a target image from image information recorded on a recording medium, an image detecting method and an image detecting program applied to the image detecting apparatus.

Some existing digital recorders for home use include an edit function. When a digital recorder for home use including an edit function performs an editing operation, such as deleting an unnecessary scene or extracting only a necessary scene from a recorded television program, for example, the editing operation is performed by changing the digital recorder to an edit mode.

Specifically, a user of the digital recorder for home use first changes the digital recorder to the edit mode, and then reproduces the recorded television program to be edited. While checking the reproduced image, the user searches for an edit point of a target scene by operating a "reproducing key," a "fast forward key," a "fast reverse key," a "stop key," a "pause key," and the like provided on a remote control of the digital recorder.

Then, a desired editing operation is performed by operating editing operation keys such as a "chapter division key," a "start point specifying key," an "end point specifying key," a "deleting key," an "extracting key," and the like provided on the same remote control. Incidentally, when the user is to specify an edit point as accurately as possible, the user searches for a frame image considered most appropriate as the edit point by making full use of a "slow reproduction key" and a "frame advance key."

Incidentally, by enabling operation of the editing operation keys used only at a time of editing, such as the "chapter division key," the "start point specifying key," the "end point specifying key," the "deleting key," the "extracting key," and the like, after changing to the edit mode, erroneous operation of these editing operation keys can be prevented.

In editing recorded data as described above by the conventional digital recorder for home use having an edit function as described above, since the remote control receiving instruction inputs from the user is provided with many operating keys, the user may have to check the positions of the operating keys on the remote control at hand frequently.

Therefore, the user may miss a scene in which a target edit point is present while checking the positions of the operating keys on the remote control, or the user may erroneously operate the remote control while checking the reproduced image.

In addition, when searching for an edit point, the user cannot specify an image in a specifiable unit, for example, a frame unit. Therefore, a target edit point cannot be specified accurately and easily, so that trouble and time may be required before specifying the target edit point.

Furthermore, while editing operations on the recorded data are enabled after changing to the edit mode, as described above, some users may not know the operation for changing to the edit mode and thus take time before editing the recorded data.

Further, with the increase in capacity of recording media, the recording time during which moving images recordable on recording media are recorded is also increased. When setting an edit point in a program recorded for a long time, for example, it takes a considerable time to find the edit point by reproducing the program from the start. Even if the program is reproduced from the middle, a skipped portion may include a desired edit point, so that the appropriate edit point may not be detected. Thus, there is a desire for a means to enable a target scene to be detected quickly and accurately from image information having a long reproduction time reaching several hours.

SUMMARY OF THE INVENTION

In order to solve the above problems, there is provided an image detecting apparatus as set forth in claim 1, the image detecting apparatus including: extracting means for extracting one or more frame images from a plurality of frame images forming a moving image; display controlling means for controlling display of the frame image extracted and a predetermined number of frame images temporally preceding and succeeding the frame image; and specifying means for selecting and specifying a desired frame image from the plurality of frame images whose display is controlled by the display controlling means.

With the image detecting apparatus as set forth in claim 1, the extracting means extracts a frame image specified by a user, for example, from a plurality of frame images forming a moving image, and the display controlling means controls display such that the extracted frame image and a predetermined number of frame images preceding and succeeding the frame image are displayed simultaneously.

The specifying means then specifies a target frame image from the plurality of frame images displayed by the display controlling means. Thus, edit points such as a start point and an end point of a target scene and the like can be detected quickly, accurately, and easily from the plurality of frame images forming the moving image.

Further, there is provided an image detecting apparatus according to an invention as set forth in claim 5, the image detecting apparatus including: first extracting means for extracting a predetermined number of frame images from a plurality of frame images forming a moving image; first display controlling means for controlling display of a predetermined number of moving images with the predetermined number of frame images extracted by the first extracting means as initial images; first specifying means for selecting and specifying a desired moving image from the predetermined number of moving images whose display is controlled by the first display controlling means; second extracting means for extracting an arbitrary frame image from the moving image specified by the first specifying means; second display controlling means for controlling display of the frame image extracted by the second extracting means and a predetermined number of frame images temporally preceding and succeeding the frame image; and second specifying means for selecting and specifying a desired frame image from the frame images whose display is controlled by the second display controlling means.

With the image detecting apparatus as set forth in claim 5, the first extracting means extracts frame images specified by a user, for example, from a plurality of frame images forming a moving image, and the first display controlling means controls display such that a predetermined number of moving images are displayed simultaneously with the extracted frame images as initial images.

The first specifying means then specifies a desired moving image from the plurality of moving images displayed by the first display controlling means. The second extracting means thereafter extracts an arbitrary frame image from the specified moving image.

The second display controlling means displays the frame image extracted by the second extracting means and frame images preceding and succeeding the frame image. Of the displayed images, a desired frame image can be specified via the second specifying means.

Thus, edit points such as a start point and an end point of a target scene and the like can be detected quickly, accurately, and easily from the plurality of frame images forming the moving image.

BRIEF DESCRIPTION OF THE DRAWINGS

FIG. 1 is a diagram of assistance in explaining an image processing system formed by using a recording and reproducing apparatus to which an image detecting apparatus according to the present invention is applied;

FIG. 7 is a diagram of assistance in explaining an example of items displayed on the display screen;

FIG. 13 is a diagram of assistance in explaining a second embodiment of the recording and reproducing apparatus to which the image detecting apparatus according to the present invention is applied;

FIG. 14 is a diagram of assistance in explaining an example of a displayed image formed by the recording and reproducing apparatus shown in FIG. 13;

FIG. 15 is a diagram of assistance in explaining another example of a displayed image formed by the recording and reproducing apparatus shown in FIG. 13;

FIG. 16 is a diagram of assistance in explaining another example of a displayed image formed by the recording and reproducing apparatus shown in FIG. 13;

FIG. 27A and FIG. 27B are diagrams of assistance in explaining a case of a reproducing point ahead being overtaken by a succeeding reproducing point, and the like;

FIG. 28A and FIG. 28B are diagrams of assistance in explaining a case of a reproducing point ahead being overtaken by a succeeding reproducing point, and the like;

FIG. 29A to 29C are diagrams of assistance in explaining a case of a reproducing point ahead being overtaken by a succeeding reproducing point, and the like;

FIG. 32 is a diagram of assistance in explaining the automatic setting of reproducing points when the user sets the reproduction speed;

FIG. 33 is a diagram of assistance in explaining an image in which edit candidate point information is displayed by using past edit point information; and FIG. 34 is a diagram of assistance in explaining an image in which the edit candidate point information is displayed by using the past edit point information.

DETAILED DESCRIPTION

Figure 2:
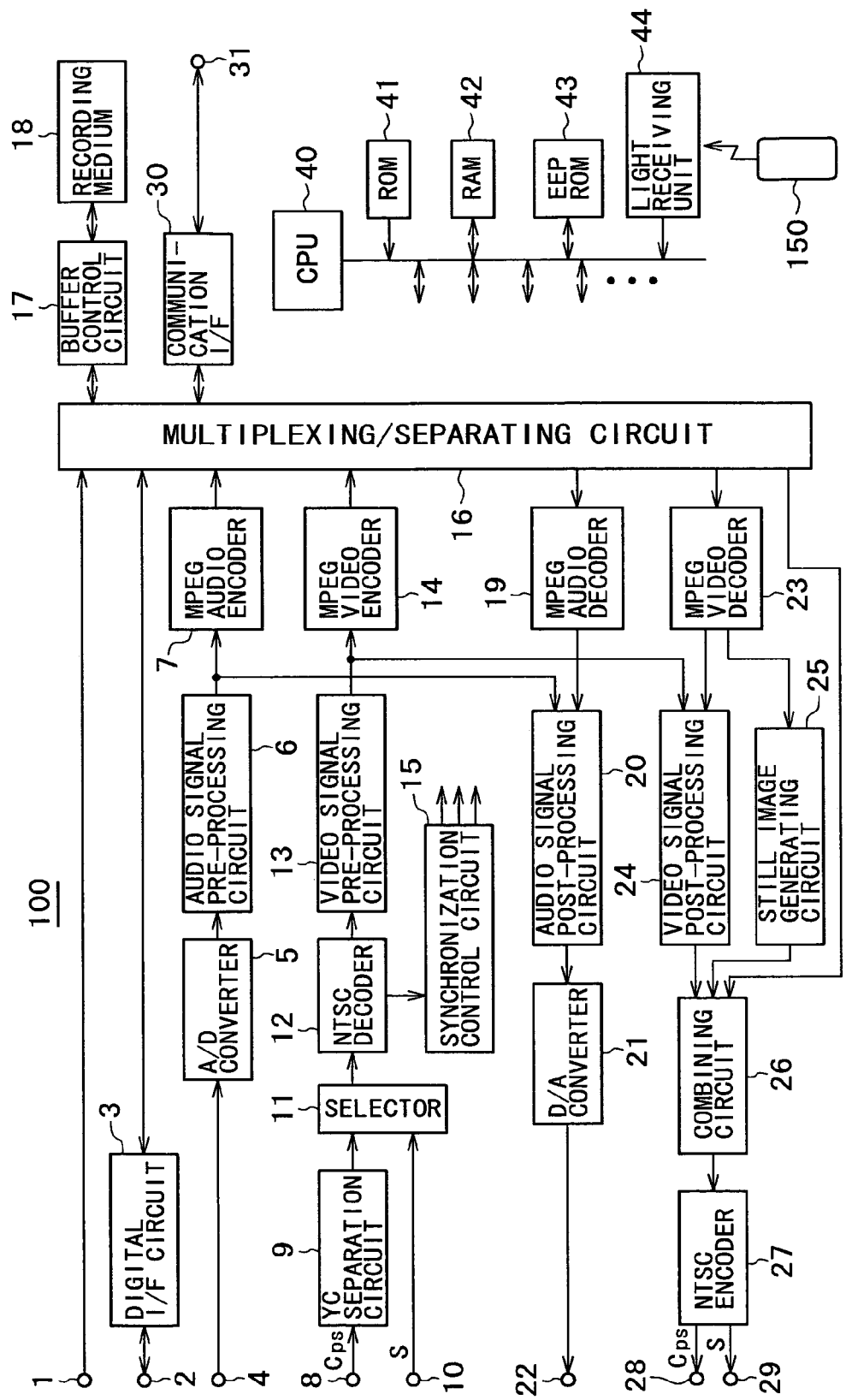
FIG. 2 is a block diagram of assistance in explaining the configuration of the recording and reproducing apparatus to which the image detecting apparatus according to the present invention is applied.

An embodiment of an image detecting apparatus, an image detecting method, and an image detecting program according to the present invention will hereinafter be described. The description below of the embodiment will be made by taking as an example a case where the present invention is applied to a recording and reproducing apparatus using a hard disk as a recording medium.

FIRST EMBODIMENT

[Example of Mode of Using Recording and Reproducing Apparatus]

FIG. 1 is a diagram of assistance in explaining a recording and reproducing apparatus 100 to which an image detecting apparatus, an image detecting method, and an image detecting program according to the present invention are applied. The recording and reproducing apparatus 100 is connected to a monitor receiver 200 to which a reproduced image signal formed in the recording and reproducing apparatus 100 is supplied, as well as various digital devices and analog devices for supplying information, including image information, whereby an image processing system can be constructed.

FIG. 1 is a diagram of assistance in explaining the image processing system constructed using the recording and reproducing apparatus 100 according to the present embodiment. As shown in FIG. 1, the recording and reproducing apparatus 100 is connected to a BS/CS tuner 300 as a digital device, a terrestrial television tuner 400 as an analog device, and a video camera 500 as a digital device.

It is to be noted that devices connectable to the recording and reproducing apparatus 100 are not limited to those shown in FIG. 1. For example, various reproducing devices and recording and reproducing devices, such as DVD (Digital Versatile Disk) players, VTRs (Video Tape Recorders), recording and reproducing devices using a hard disk as a recording medium, and the like, are connectable to the recording and reproducing apparatus 100.

The recording and reproducing apparatus 100 in the present embodiment can be supplied with a digital signal or an analog signal including image information, such as a broadcast signal from the BS/CS tuner 300 or the terrestrial television tuner 400, recorded information from the video camera 500, or the like, and can record the signal as a digital signal onto a recording medium (hard disk) included in the recording and reproducing apparatus 100.

Also, the recording and reproducing apparatus 100 can read image information recorded on the recording medium of the recording and reproducing apparatus 100, reproduce an image signal for displaying an image on a display screen of the monitor receiver 200 as a display element, and supply the image signal to the monitor receiver 200. Thereby, the image corresponding to the image information recorded on the hard disk of the recording and reproducing apparatus 100 can be displayed on the display screen of the monitor receiver 200 to be viewed by a user.

The case of recording and reproducing image information has been mainly described above. However, both a broadcast signal for providing a television broadcast program and recorded information from the video camera include sound information as well as image information. In addition to image information, the recording and reproducing apparatus 100 can record sound information supplied together with the image information onto the recording medium, and reproduce the recorded information. Incidentally, though not shown, the reproduced sound information is supplied to a speaker or the like provided to the monitor receiver, for example.

Further, various instructions can be given to the recording and reproducing apparatus 100 by operating an operating key group of an operating panel 45 provided on the front panel of the main body of the recording and reproducing apparatus 100, or by operating an operating key group of a remote control commander (remote control) 150 for the recording and reproducing apparatus 100.

Incidentally, an infrared remote control signal corresponding to an operation of the operating key group of the remote control 150 is output from a remote control signal output unit 151 of the remote control 150. The infrared remote control signal is received by a remote control signal receiving unit 44 provided on the front panel of the main body of the recording and reproducing apparatus 100. Thereby, information corresponding to the operation of the operating key group of the remote control 150 is notified to the recording and reproducing apparatus 100.

Specifically, ordinary operating instructions to start and stop recording, start and stop reproduction, start and stop fast forward, start and stop fast reverse, pause and cancel the pause, and edit instructions to put a mark referred to as a chapter mark around a target scene of image information being reproduced and delete or move an image section provided with chapter marks, for example, as will be described later in detail, can be input to the recording and reproducing apparatus 100 through the operating key group of the operating panel 45 provided on the front panel of the recording and reproducing apparatus 100 or through the operating key group of the remote control 150.

[Configuration of Recording and Reproducing Apparatus]

FIG. 2 is a block diagram of assistance in explaining the configuration of the recording and reproducing apparatus 100 according to the present embodiment. A CPU (Central Processing Unit) 40 in FIG. 2 controls all circuit blocks that will be described later. The CPU 40 accesses a ROM (Read Only Memory) 41, a RAM (Random Access Memory) 42, and an EEPROM (Electrically Erasable and Programmable ROM) 43 via a host bus as required, and controls the whole of the recording and reproducing apparatus (image detecting apparatus) 100.

As shown in FIG. 2, the host bus is connected to the light receiving unit 44 for receiving an infrared remote control signal. The light receiving unit 44 can receive an infrared remote control signal from the remote control 150, convert the infrared remote control signal into an electric signal, and then supply the electric signal to the CPU 40.

The CPU 40 can thereby control various parts to perform processing corresponding to an instruction supplied from a user via the remote control 150, and make various settings in the EEPROM 43, for example.

Various programs to be executed by the recording and reproducing apparatus 100 according to the present embodiment and various data necessary for processing are recorded in the ROM 41. The RAM 42 is mainly used as a work area for temporarily recording results of processing in progress and the like. The EEPROM 43 is a so-called nonvolatile memory for storing and retaining data that needs to be retained even after power is shut down, for example various setting data and the like.

The recording and reproducing apparatus 100 according to the present embodiment shown in FIG. 2 has a digital input terminal 1, a digital input/output terminal 2, an analog audio input terminal 4, and analog video input terminals 8 and 10 as an input terminal part. The analog video input terminal 8 is for a composite image signal (Cps). The analog video input terminal 10 is for a separate image signal (S).

The recording and reproducing apparatus 100 has the digital input/output terminal 2, an analog audio output terminal 22, and analog video output terminals 28 and 29 as an output terminal part. The analog video output terminal 28 is for a composite image signal (Cps). The analog video output terminal 29 is for a separate image signal (S).

The recording and reproducing apparatus 100 according to the present embodiment further includes a communication connection terminal 31 to send and receive various data through a communication network, such as, for example, the Internet, via a communication interface (hereinafter abbreviated as a communication I/F) 30.

The recording and reproducing apparatus 100 can record a video signal and an audio signal received via the above-mentioned input terminals and input/output terminal onto a recording medium 18 as a hard disk, and output the video signal and the audio signal via the above-mentioned output terminals and input/output terminal. Also, the recording and reproducing apparatus 100 can read and reproduce the video signal and the audio signal recorded on the recording medium 18, and output the video signal and the audio signal via each output terminal.

Further, the recording and reproducing apparatus 100 can record data received via the above-mentioned communication connection terminal 31 onto the recording medium 18, digitally output the data, and, when the received data is video data and audio data, convert these pieces of data into analog signals and then output the analog signals via the analog output terminals.

As shown in FIG. 1, the recording and reproducing apparatus 100 in the present embodiment is connected to the BS/CS tuner 300, the terrestrial television tuner 400, and the video camera 500. In this case, the description below will proceed supposing that the BS/CS tuner 300 is connected to the recording and reproducing apparatus 100 via the digital input terminal 1, the terrestrial television tuner 400 is connected to the recording and reproducing apparatus 100 via the analog audio input terminal 4 and the analog video input terminal 8 or the analog video input terminal 10, and the video camera 500 is connected to the recording and reproducing apparatus 100 via the digital input/output terminal 2.

[Use of Digital Input]

A description will now be made of the operation of the recording and reproducing apparatus 100 according to the present embodiment when the recording and reproducing apparatus 100 is supplied with information via the above-mentioned input terminals. A description will first be made of the operation of the recording and reproducing apparatus 100 when the recording and reproducing apparatus 100 is supplied with a BS digital broadcast signal or a CS digital broadcast signal from the BS/CS tuner 300 connected via the digital input terminal 1, records the BS digital broadcast signal or the CS digital broadcast signal onto the recording medium 18, and outputs the BS digital broadcast signal or the CS digital broadcast signal in an analog form.

A parabolic antenna for receiving a digital broadcast signal from a satellite is connected to the digital BS/CS tuner 300. The digital BS/CS tuner 300 receives and selects a target digital broadcast signal on the basis of a channel selection control signal corresponding to a channel selection instruction from the user, and then supplies the received and selected digital broadcast signal to the recording and reproducing apparatus 100 via the digital input terminal 1. The digital broadcast signal supplied via the digital input terminal 1 is supplied to a multiplexing/separating circuit 16.

The digital broadcast signal is in a form of a so-called TS (Transport Stream) signal formed by packetizing image data (video data), sound data (audio data), and various other data for constructing a broadcast program for each channel as a program transmission path, together with various control data such as channel selection information referred to as PSI (Program Specific Information), EPG (Electronic Program Guide) data for forming an electronic program guide table and the like, and multiplexing the packetized data for transmission.

An identifier (ID) is added to each packet. The identifier makes it possible to extract PSI data and EPG data, and extract image packets and sound packets for constructing the same program.

The multiplexing/separating circuit 16 extracts PSI and EPG data from the TS signal received from the digital BS/CS tuner 300, and then supplies the PSI and EPG data to the CPU 40 to allow program selection. Also, the multiplexing/separating circuit 16 forms an electronic program guide table, and then outputs the electronic program guide table so as to be displayed in response to an instruction from the user, thus enabling program selection, unattended recording and the like through the electronic program guide table.

When an instruction to record a selected program is given, the multiplexing/separating circuit 16 extracts video packets and audio packets of the target program selected by the user from the TS signal received from the digital BS/CS tuner 300, and forms a new TS signal comprising the video packets and audio packets and necessary control data. The multiplexing/separating circuit 16 records the new TS signal onto the recording medium 18 via a buffer control circuit 17.

At the same time, the multiplexing/separating circuit unit 16 forms a video ES (Elementary Stream) from the video packets of the target program extracted from the TS signal received from the digital BS/CS tuner 300, and then supplies the video ES to an MPEG (Motion Picture Experts Group) video decoder 23. The multiplexing/separating circuit 16 also forms an audio ES (Elementary Stream) from the audio packets of the target program extracted from the TS signal received from the digital BS/CS tuner 300, and then supplies the audio ES to an MPEG audio decoder 19.

The MPEG audio decoder 19 decodes the audio ES supplied thereto, thereby obtaining baseband audio data, and then supplies the baseband audio data to an audio signal post-processing circuit 20. The MPEG decoder 23 decodes the video ES supplied thereto, thereby obtaining baseband video data, and then supplies the baseband video data to a video signal post-processing circuit 24.

The video signal post-processing circuit 24 performs switching between the video data from the MPEG video decoder 23 and video data from a video signal pre-processing circuit 13 to be described later, performs screen synthesis, filter processing and the like, and then supplies the video data after the processing to a combining circuit 26.

As will also be described later, the combining circuit 26 is supplied with the video data from the video signal post-processing circuit 24, video data of a reduced still image referred to as a thumbnail or the like from a still image generating circuit 25, graphics and text data for screen display formed by the CPU 40, and the like. The combining circuit 26 performs processing to combine these pieces of data, partly overlap a display, and the like, and then supplies the video data after the processing to an NTSC encoder 27.

The NTSC encoder 27 converts the video data (component digital signals) supplied thereto into a YC signal, performs D/A conversion, thereby generating an analog composite video signal (Cps) and an analog separate video signal (S), and then outputs the signals through the analog video output terminals 28 and 29.

In the meantime, the audio signal post-processing circuit 20 performs switching between the audio data from the MPEG audio decoder 19 and audio data from an audio signal pre-processing circuit 6, performs filter processing, fade processing, speech speed conversion processing and the like, and then supplies the audio data after the processing to an audio D/A converter 21. The audio D/A converter 21 converts the audio data supplied thereto into an analog audio signal, and then outputs the analog audio signal through the analog audio output terminal 22.

The monitor receiver 200 is connected in a stage succeeding the analog audio output terminal 22 and the analog video output terminals 28 and 29. Sound corresponding to the analog audio signal output through the analog audio output terminal 22 is emitted from the speaker provided to the monitor receiver 200. An image corresponding to the analog video signals output through the analog video output terminals 28 and 29 is displayed on the display screen of the monitor receiver.

Thus, the recording and reproducing apparatus 100 according to the present embodiment can extract video data and audio data of a target program from a digital broadcast signal supplied from the BS/CS tuner 300, record the video data and audio data onto the recording medium 18, and at the same time, form an analog video signal and an analog audio signal and output the analog video signal and the analog audio signal. That is, the recording and reproducing apparatus 100 makes it possible to view the target program provided as the digital broadcast signal while recording the program onto the recording medium 18.

[Use of Digital Input and Output]

Also, as described above, a TS signal newly formed in the multiplexing/separating circuit 16 can be output to an external device, such as, for example, another recording device or a personal computer, via a digital interface circuit (hereinafter abbreviated as a digital I/F circuit) 3 and the digital input/output terminal 2. In this case, the digital I/F circuit 3 converts the digital signal supplied thereto into a digital signal in a form adapted to the external device, and then outputs the digital signal.

Conversely, the recording and reproducing apparatus 100 can, for example, receive via the digital input/output terminal 2 a digital signal supplied from the digital video camera 500 or the like via a digital interface, such as an IEEE 1394 digital interface or the like, record the digital signal onto the recording medium 18, form an analog video signal and an analog audio signal, and then output the analog video signal and the analog audio signal.

Specifically, the digital signal is supplied through the digital input/output terminal 2 to the digital I/F circuit 3. The digital I/F circuit 3 subjects the digital signal supplied thereto to processing for format conversion or the like so that the digital signal is adapted to a system used by the recording and reproducing apparatus 100 according to the present embodiment, thereby generating a TS signal, and then supplies the TS signal to the multiplexing/separating circuit 16.

The multiplexing/separating circuit 16 further analyzes and generates a control signal and the like, and then forms a TS signal in a format for recording on the recording medium 18. The multiplexing/separating circuit 16 can record the TS signal onto the recording medium 18 via the buffer control circuit 17, as described above.

The multiplexing/separating circuit 16 forms a video ES and an audio ES from the TS signal supplied from the digital I/F circuit 3, and then supplies the video ES and the audio ES to the MPEG video decoder 23 and the MPEG audio decoder 19, respectively. Thereby, as described above, an analog video signal and an analog audio signal can be formed and then output.

[Use of Analog Input]

A description will next be made of the operation of the recording and reproducing apparatus 100 when the recording and reproducing apparatus 100 is supplied with a television broadcast signal from the terrestrial television tuner 400 connected to the recording and reproducing apparatus 100 via the analog audio input terminal 4 and, for example, the analog video input terminal 8, records the television broadcast signal onto the recording medium 18, and outputs the television broadcast signal in an analog form.

The terrestrial television tuner 400 receives, selects, and demodulates an analog terrestrial broadcast signal, thereby obtaining an analog composite video signal (Cps) and an analog audio signal, and then supplies the analog composite video signal and the analog audio signal to the recording and reproducing apparatus 100. The analog audio signal from the terrestrial television tuner 400 is supplied to an A/D converter 5 via the analog audio input terminal 4. The analog composite video signal (Cps) from the terrestrial television tuner 400 is supplied to a YC separation circuit 9 via the analog video input terminal 8. Incidentally, an analog separate video signal (S) is supplied to a selector 11 via the analog video input terminal 10.

The YC separation circuit 9 separates the analog composite video signal (Cps) supplied thereto into a luminance signal Y and a color-difference signal C (performs so-called YC separation), and then supplies the luminance signal Y and the color-difference signal C to the selector 11. The selector 11 is also supplied with the analog separate video signal (S) via the analog video input terminal 10.

The selector 11 selects one of the video signal from the YC separation circuit 9 and the video signal supplied as the separate video signal via the analog video input terminal 10 according to an instruction from the CPU 40, and then supplies the selected video signal to an NTSC (National Television System Committee) decoder 12.

The NTSC decoder 12 subjects the analog video signal input thereto to A/D conversion, chroma decode and other processing, thereby converting the analog video signal into digital component video data (video data), and then supplies the digital component video data to a video signal pre-processing circuit 13. Also, the NTSC decoder 12 supplies a synchronization control circuit 15 with a clock generated on the basis of a horizontal synchronizing signal of the video signal input thereto, and the horizontal synchronizing signal, a vertical synchronizing signal, and a field discrimination signal obtained by sync separation.

The synchronization control circuit 15 generates a clock signal and a synchronizing signal for providing timing necessary in each circuit block, using each signal supplied to the synchronization control circuit 15 as a reference, and then supplies the clock signal and synchronizing signal to each circuit block.

The video signal pre-processing circuit 13 subjects the video data input thereto to various video signal processing, such as prefilter processing and the like, and then supplies the video data to an MPEG video encoder 14 and the video signal post-processing circuit 24.

The MPEG video encoder 14 subjects the video data from the video signal pre-processing circuit 13 to encode processing, such as block DCT (Discrete Cosine Transform) and the like, thereby generating a video ES, and then supplies the video ES to the multiplexing/separating circuit 16.

In the meantime, the A/D converter 5 converts the audio signal supplied to the A/D converter 5 via the audio input terminal 4 into digital audio data, and then supplies the digital audio data to an audio signal pre-processing circuit 6. The audio signal pre-processing circuit 6 subjects the audio data supplied thereto to filter processing, and then supplies the audio data to an MPEG audio encoder 7.

The MPEG audio encoder 7 compresses the audio data supplied thereto in accordance with an MPEG format, thereafter generating an audio ES, and then supplies the audio ES to the multiplexing/separating circuit 16 as in the case of the video data.

At a time of recording, the multiplexing/separating circuit 16 multiplexes the video ES from the MPEG video encoder 14, the audio ES from the MPEG audio encoder 7, and various control signals. Specifically, the multiplexing/separating circuit 16 at the time of recording subjects the MPEG video ES and the MPEG audio ES input thereto to multiplexing processing together with the various control signals, and thereby generates a TS signal for an MPEG system, for example. The TS signal generated in the multiplexing/separating circuit 16 is recorded on the recording medium 18 via the buffer control circuit 17.

As shown in FIG. 2, the audio data from the audio signal pre-processing circuit 6 is supplied to the MPEG audio encoder 7, and also is supplied to the audio signal post-processing circuit 20. The video data from the video signal pre-processing circuit 13 is supplied to the MPEG video encoder 14, and also is supplied to the video signal post-processing circuit 24.

The audio signal post-processing circuit 20 and the D/A converter 21 function to form an analog audio signal and output the analog audio signal via the audio output terminal 22. The video signal post-processing circuit 24, the combining circuit 26, and the NTSC encoder 27 function to form an analog video signal and output the analog video signal via the analog video output terminals 28 and 29.

Thus, in parallel with processing for converting the analog signals supplied via the analog audio input terminal 4 and the analog video input terminal 8 or 10 into digital signals and recording the digital signals onto the recording medium 18, the video data and audio data being recorded can be reproduced and output.

Further, the video signal and the audio signal input in the analog form can also be multiplexed as video data and audio data and then output to the external digital device via the digital I/F circuit 3 and the digital input/output terminal 2.

[Reproduction from Recording Medium]

A description will next be made of the operation of the recording and reproducing apparatus 100 according to the present embodiment when the recording and reproducing apparatus 100 reproduces video data and audio data recorded on the recording medium 18 as described above. The CPU 40 effects control to read a target TS signal to be reproduced from the recording medium 18 and supply the TS signal to the multiplexing/separating circuit 16 via the buffer control circuit 17.

The multiplexing/separating circuit 16 at the time of reproduction separates a video ES and an audio ES from the TS signal read from the recording medium 18, and then supplies the separated audio ES to the MPEG audio decoder 19 and the video ES to the MPEG video decoder 23.

The processing of the circuit units from the MPEG audio decoder 19 on down and the processing of the circuit units from the MPEG video decoder 23 on down are as described above regarding the use of digital input. Specifically, an analog audio signal is formed from the audio ES supplied to the MPEG audio decoder 19 and then output, and an analog video signal is formed from the video ES supplied to the MPEG video decoder 23 and then output.

Thereby, an image and sound corresponding to the video data and the audio data read from the recording medium 18 can be output for viewing via the monitor receiver 200 connected in a stage succeeding the analog audio output terminal 22 and the analog video output terminals 28 and 29.

[Use of Communication Connection Terminal and Communication Interface]

The recording and reproducing apparatus 100 according to the present embodiment has the communication I/F 30 and the communication connection terminal 31, as described above, so that, for example, the recording and reproducing apparatus 100 can be connected to a network, such as the Internet or the like, via a telephone line or the like to obtain various data via the network and send various data to the network.

The various data that can be sent and received includes not only video data and audio data, but also various programs, text data and the like. The video data and audio data can be recorded on the recording medium 18 via the multiplexing/separating circuit 16.

Also, video data and audio data obtained via the communication network can be reproduced and used by utilizing the multiplexing/separating circuit 16, an audio signal reproducing system comprising the MPEG audio decoder 19, the audio signal post-processing circuit 20, the D/A converter 21, and the audio output terminal 22, and a video signal reproducing system comprising the MPEG video decoder 23, the video signal post-processing circuit 24, the still image generating circuit 25, the combining circuit 26, the NTSC encoder 27, and the video output terminals 28 and 29.

Further, a program, control data and the like for use in the recording and reproducing apparatus 100 according to the present embodiment can be provided via the network, recorded and retained in the EEPROM 43 or the like, and used as required.

For example, it is possible via the communication network to upgrade the functions of the recording and reproducing apparatus according to the present embodiment and obtain EPG data and the like for BS digital broadcast and CS digital broadcast in advance to create an electronic program guide table in advance.

It is to be noted that while in the present embodiment, video data and audio data are compressed by the MPEG system, it is possible to use another compression system and process non-compressed video data and audio data without data compression.

[Edit Function]

The recording and reproducing apparatus 100 according to the present embodiment has an edit function so that while reproducing a broadcast program or the like recorded on the recording medium 18 and checking the reproduced image, a chapter mark can be put as a mark around an image forming a target scene by a simple operation.

Reduced still images are displayed in a scrollable mode with reference to the image provided with the chapter mark. A start and an end of the target scene are determined accurately in a frame unit, that is, in an image unit, thereby precisely specifying a start and an end of a signal section to be edited, so that target editing can be performed on the specified image section.

In this case, a part for forming an image signal for displaying the reduced still images is the still image generating circuit 25 shown in FIG. 2. The still image generating circuit 25 has a buffer memory of about 4 Mbytes, for example. Under control of the CPU 40, the still image generating circuit 25 obtains target image data from image data recorded on the recording medium 18 via the MPEG video decoder 23, and then forms an image signal for displaying the reduced image.

The recording and reproducing apparatus 100 according to the present embodiment performs the edit function without the need for switching the recording and reproducing apparatus to an edit mode each time as with the edit function of a conventional recording and reproducing apparatus. As will be described later in detail, the recording and reproducing apparatus 100 according to the present embodiment enables various edit functions to be used in the reproduction mode, making it possible to change from a reproduction operation to an edit operation without interruption of the operation, or in a so-called seamless manner.

The edit function of the recording and reproducing apparatus 100 according to the present embodiment will be described in the following. As described above, the recording medium 18 of the recording and reproducing apparatus 100 is a hard disk, and is able to record a large amount of data. Supposing that one set of information of one television program or the like is referred to as a title, for example, the recording medium 18 can store and retain sets of information including image information for a plurality of titles.

That is, in the present specification, a title is a set of image information, sound information and the like handled as one set (one piece) of information of one broadcast program, one movie or the like. As described above, the recording medium 18 is able to record information for a plurality of titles.

When a title to be reproduced is selected from among titles recorded and retained on the recording medium 18 and an instruction to reproduce the title is given, a set of information (TS signal), including image information of the title, is read from the recording medium 18, and is reproduced by the function of the multiplexing/separating circuit 16 and the functions of the MPEG video decoder 23, the video signal post-processing circuit 24, the combining circuit 26, and the NTSC encoder 27, as described above. The reproduced image information is supplied to the monitor device 200, and the reproduced image is displayed on the display screen 201 of the monitor device 200.

Figure 3:
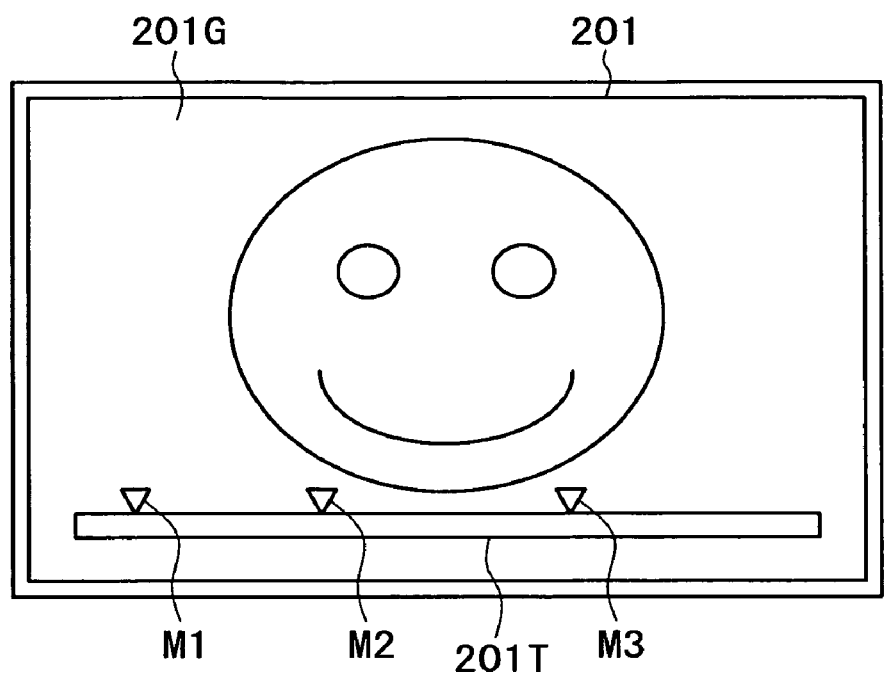
FIG. 3 is a diagram of assistance in explaining an example of an image displayed on a display screen 201 immediately after an operation of putting a chapter mark.

Then, when an image of a target scene is displayed on the display screen 201 and a user recognizes the image, the user presses a chapter mark key 154 of the remote control 150 to put a so-called chapter mark to the image of the target scene. FIG. 3 is a diagram of assistance in explaining an example of a displayed image 201G on the display screen 201 immediately after an operation for putting a chapter mark.

When the chapter mark key 154 is pressed, since the CPU 40 of the recording and reproducing apparatus 100 knows which image is currently being reproduced by the time code or the frame number of the image, the CPU 40 obtains the time code information or the frame number as information for identifying the image being displayed on the display screen 201 of the monitor receiver 200 at a point in time when the chapter mark key 154 is pressed, and, for example, records the information together with information for identifying the title being reproduced as chapter mark information in a file provided on the recording medium 18.

Further, when the CPU 40 detects that the chapter mark key 154 is pressed, as shown in FIG. 3, the CPU 40 displays a time line 201T indicating a total reproduction time corresponding to a total amount of data of the title being reproduced at that time, and also displays triangular marks M1, M2, M3, . . . indicating positions of images provided with chapter marks in the total reproduction time of the title.

That is, a chapter mark is attached to image data in a unit of one frame, and a triangular mark is displayed for indicating the position of the image provided with the chapter mark.

The time line 201T and the triangular marks M1, M2, M3, . . . are erased after being displayed for a certain time after the pressing of the chapter mark key 154, to return to display of only the original displayed image 201G. As shown in FIG. 3, the chapter mark key 154 can be pressed any number of times as required within one title, so that a plurality of chapter marks can be provided within one title.

Thus, during reproduction of a target title, it is possible to specify, for example, only one or more necessary scenes occurring at random within the title, or conversely, specify only one or more unnecessary scenes.

Then, using an image provided with a chapter mark as a reference image (edit point), it is possible to perform reproduction from the position (image) provided with the chapter mark; editing such as deleting, moving, or extracting of the image provided with the chapter mark or images of a section interposed between images provided with a chapter mark; and division of image information with reference to the position provided with the chapter mark.

However, since a chapter mark provided by pressing the chapter mark key 154 during reproduction of a target title is roughly put to an image of a target scene, the chapter mark is not necessarily put precisely to a start image or an end image of the target scene.

Accordingly, after at least one chapter mark is provided, the recording and reproducing apparatus 100 is changed to a mode for receiving operations regarding the chapter mark by operating a predetermined operating key on the remote control 150 or by displaying a predetermined menu and selecting an item, such as, for example, "edit marks", from the menu. In this case, an image displayed on the display screen 201 is paused. That is, the image displayed on the display screen 201 becomes a still image.

Thereafter, as shown in FIG. 3, the CPU 40 of the recording and reproducing apparatus 100 forms image information for displaying the time line 201T and triangular marks indicating the position of images provided with chapter marks, and then displays the image information on the monitor receiver 200 to allow selection of an image provided with a chapter mark.

Immediately after the recording and reproducing apparatus 100 is changed to the mode for receiving operations regarding the chapter marks, a triangular mark corresponding to the position of a predetermined image, such as, for example, an image provided with an immediate chapter mark or an image provided with a first chapter mark, is selected from among the plurality of images already provided with chapter marks.

A target triangular mark on the time line 201T can be selected by operating a left arrow key 152L or a right arrow key 152R on the remote control 150.

When the target triangular mark is selected by operating the left arrow key 152L or the right arrow key 152R on the remote control 150 and a predetermined operation is performed, such as, for example, pressing an up arrow key 152U on the remote control 150, the CPU 40 of the recording and reproducing apparatus 100 determines from the position of the triangular mark what chapter mark information corresponds to the triangular mark, and referring to the chapter mark information recorded and retained on the recording medium 18, identifies an image at the position indicated by the selected triangular mark.

Then, the CPU 40 obtains image information for forming the identified image (the image at the position indicated by the selected triangular mark) and image information for forming images adjacent to the identified image from the recording medium 18, and supplies the obtained image information to the still image generating circuit 25 via the MPEG video decoder 23. The CPU 40 controls the still image generating circuit 25 to form an image signal for displaying reduced still images S1, S2, S3, S4, and S5 referred to as thumbnails or the like.

The image signal for displaying the plurality of reduced still images generated by the still image generating circuit 25, or at least five reduced still images in the present embodiment, is supplied to the combining circuit 26, where the image signal is combined with an image signal from the video signal post-processing circuit 24. The resulting image signal is output via the NTSC encoder 27, and supplied to the monitor receiver 200, whereby the images are displayed on the display screen 201 of the monitor receiver 200.

Figure 4:
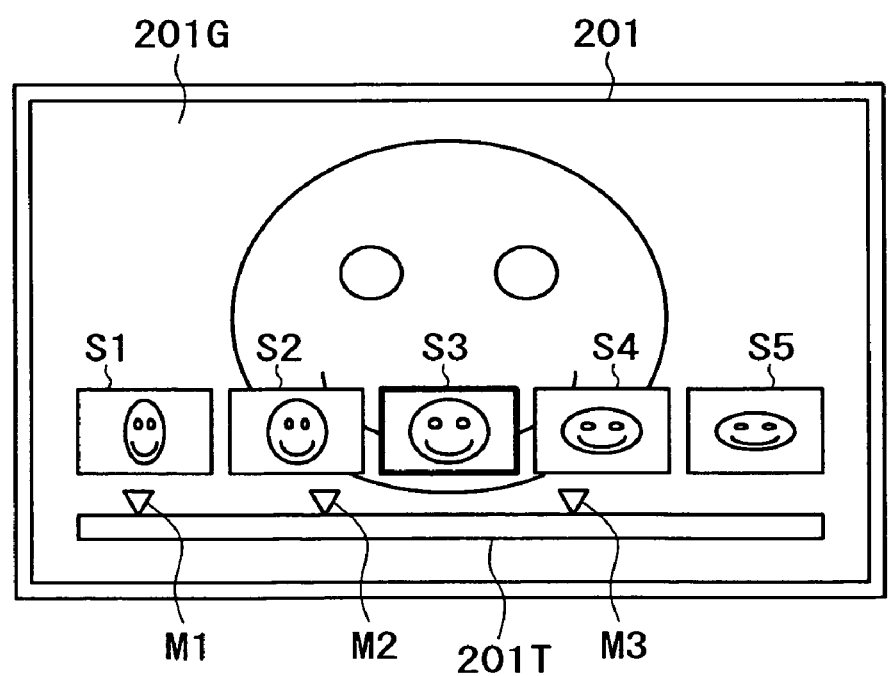
FIG. 4 is a diagram of assistance in explaining an example of image display when reduced still images (thumbnails) are displayed.

In an example shown in FIG. 4, the triangular mark M1 is selected, and the reduced still images for five frames are displayed, that is, with reference to the image at the position indicated by the triangular mark (S3), the images (S1 and S2) for two frames preceding the image S3 and the images (S4 and S5) for two frames succeeding the image S3 are displayed.

In the example shown in FIG. 4, an outer frame of the reduced still image S3 currently provided with the chapter mark is displayed in a thick line, that is, a so-called cursor is positioned at the reduced still image S3, indicating that the reduced still image S3 is to be manipulated.

By operating the left arrow key 152L or the right arrow key 152R when the reduced still images S1, S2, S3, S4, and S5 are displayed, the cursor is moved to sequentially change the reduced still image to be manipulated.

Figure 5A:
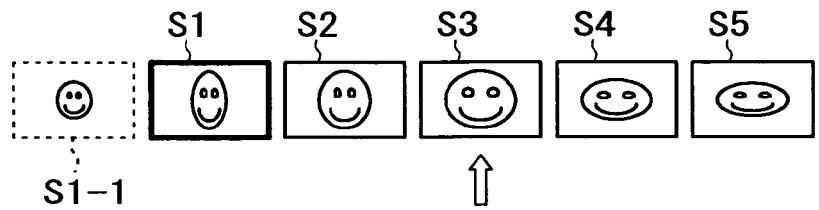
FIGS. 5A to 5C are diagrams of assistance in explaining the selection of a reduced still image, scroll display, and the display of a menu for a reduced still image.
Figure 5B:
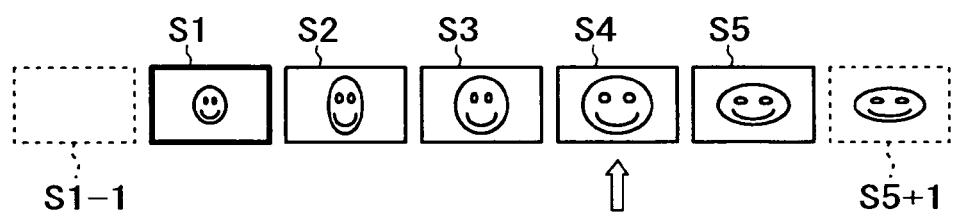
Figure 5C:
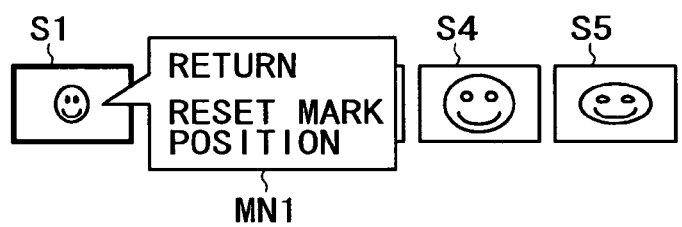

FIGS. 5A to 5C are diagrams of assistance in explaining an example of changing the reduced still image to be manipulated when the reduced still images S1 (to be manipulated), S2, S3, S4, and S5 are displayed. Pressing the left arrow key 152L can sequentially move the cursor to the left.

Thus, pressing the left arrow key 152L twice when the cursor is positioned at the reduced still image S3 can position the cursor to the reduced still image S1 at the leftmost part of the display screen 201, as shown in FIG. 5A. The reduced still image (the reduced still image at which the cursor is positioned) having an outer frame displayed in a thick line is to be manipulated. Incidentally, the image provided with the chapter mark in the state shown in FIG. 5A is displayed as the reduced still image S3, as indicated by an arrow in FIG. 5A.

When the left arrow key 152L is further pressed, the reduced still images are scrolled in the direction to the right of the display screen 201, as shown in FIG. 5B. An image (S1-1) not displayed in the state of FIG. 5A and one frame before the reduced still image S1 is displayed as the reduced still image S1. At this time, the image provided with the chapter mark is displayed as the reduced still image S4, as indicated by an arrow in FIG. 5B.

Thus, pressing the left arrow key 152L can scroll the reduced still images by one frame in a direction of going back to the past to select a target image.

Similarly, pressing the right arrow key 152R can move the cursor in the direction to the right of the display screen 201. Further pressing the right arrow key after moving the cursor to the reduced still image S5 at the rightmost part of the display screen 201 can scroll the reduced still images by one frame in a direction of advancing time to select a target image.

Then, an enter key 153 on the remote control 150 is pressed to display a menu MN1 for selecting a manipulation on the reduced display image to be manipulated, as shown in FIG. 5C. In this case, a selection can be made to either return to selection of a reduced still image or reset the chapter mark.

The resetting of the chapter mark is processing that attaches a new chapter mark to an original image of the selected reduced still image and deletes the chapter mark attached to the image serving as the reference image this time.

Thus, when the chapter mark is reset in the state shown in FIG. 5B and FIG. 5C, an original image of the reduced still image S1 in FIG. 5B and FIG. 5C is provided with a chapter mark, while the chapter mark attached to an original image of the reduced still image S4 is deleted.

Specifically, in the case of the example shown in FIG. 5B and FIG. 5C, of the chapter mark information recorded and retained on the recording medium 18, the information for identifying the original image of the reduced still image S4 in FIG. 5B and FIG. 5C is changed to information for identifying the original image of the reduced still image S1 in FIG. 5B and FIG. 5C.

Then, the triangular mark indicating the position of the image whose chapter mark has been deleted is erased, and a new triangular mark indicating the position of the image provided with the new chapter mark is displayed.

Thus, the recording and reproducing apparatus 100 according to the present embodiment makes it possible to attach a chapter mark roughly to an unnecessary scene part, for example, while reproducing and viewing a television broadcast program or the like recorded on the recording medium 18, and to check the roughly attached chapter mark as appropriate and reattach the chapter mark accurately to a target image.

Then, when an operation is performed to return the processing after a chapter mark has been accurately attached to a first image and a last image of a target scene, the reduced still images S1, S2, S3, S4, and S5 are hidden to return to the display of the still image 201T, the time line 201T, and the triangular marks M1, M2, M3, . . . as shown in FIG. 3 so that reproduction and various editing can be performed with reference to the images provided with chapter marks.

Figure 6:
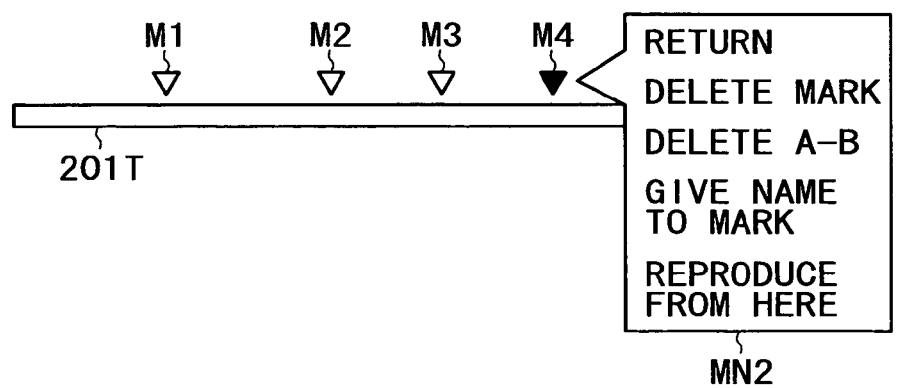
FIG. 6 is a diagram of assistance in explaining the use of a time line and triangular marks.

FIG. 6 is a diagram of assistance in explaining reproduction and various editing performed with reference to the images provided with chapter marks. When selecting a triangular mark and performing a predetermined operation after returning to the display of the still image 201G, the time line 201T, and the triangular marks M1, M2, M3, . . . , a menu MN2 is displayed for selecting processing that can be performed with reference to the image provided with the selected triangular mark.

By selecting an intended process from the menu MN2, it is possible to perform processing such as deletion of the selected triangular mark, reproduction from the image at the position of the selected triangular mark, specifying two triangular marks and deleting a scene section between the two triangular marks (A-B deletion), naming the selected triangular mark, and the like.

Various other edit processes can be performed, such as specifying two triangular marks and moving the scene section between the two triangular marks, dividing image information of a television program or the like with reference to the image of the selected triangular mark, or the like.

Thus, the recording and reproducing apparatus 100 according to the present embodiment makes it possible to set a chapter mark at the time of reproduction for viewing and eventually perform editing with reference to the chapter mark, rather than switching the recording and reproducing apparatus 100 to an edit mode and then performing editing as with the conventional recording and reproducing apparatus.

That is, the reproduction mode and the edit mode are not distinctly different modes, and various edit functions can be used as functions performable in the reproduction mode. Thus, ordinary operation for reproduction and viewing and operation for editing can be performed seamlessly, and therefore a usable recording and reproducing apparatus is realized.

The operation of the recording and reproducing apparatus 100 according to the present embodiment at the time of reproduction will next be described further with reference to the diagram of FIG. 7 showing an example of displayed items, and the flowcharts of FIGS. 8 to 10. The operation of the recording and reproducing apparatus 100 according to the present embodiment at the time of reproduction is an application of an image detecting method according to the present invention, and is performed by executing an image detecting program at the CPU 40, for example.

FIG. 7 is a diagram of assistance in explaining an example of items displayed on the display screen 201 of the monitor receiver 200 by the recording and reproducing apparatus 100 according to the present embodiment. As described above, the recording and reproducing apparatus 100 according to the present embodiment reads and reproduces image information recorded on the recording medium 18 to thereby form and output an analog image signal to be supplied to the monitor receiver 200, and display an image 201G on the display screen 201 of the monitor receiver 200.

At the time of reproduction (reproduction mode), an image signal is formed in predetermined timing to display a state display G1, a remote control operable key display G2, a time line 201T, triangular marks M1, M2, M3, . . . , a start point display ST, an end point display ED, a reduced still image (thumbnail) S, and menus MN1, MN2, and MNS, as shown in FIG. 7. These items are displayed on the display screen of the monitor receiver 200.

The state display G1 identifies the state of operation of the recording and reproducing apparatus 100, such as the recording mode, the reproduction mode or the like. The remote control operable key display G2 identifies remote control operating keys operable at that time.

As described above, the time line 201T indicates the total reproduction time of the title currently being reproduced (the total amount of data of the title). The triangular marks M1, M2, M3, . . . displayed in the vicinity of the time line 201T indicate positions of images provided with chapter marks.

The start point ST indicates the start point of a range-specified section. The end point ED indicates the end point of the range-specified section. Both points are specified in correspondence with a triangular mark. The section between the start point ST and the end point ED is to be edited, for example, deleted or moved.

As is also shown in FIG. 3 and FIG. 4, the reduced still image S in the present embodiment comprises five reduced still images S1, S2, S3, S4, and S5, or comprises reduced still images of an image selected by a user from among images provided with chapter marks and images adjacent to the image selected by the user.

The menu MN1 is provided to select processing on a selected reduced still image. The menu MN2 is provided to select processing on a triangular mark displayed so as to correspond to a chapter mark. The menu MNS is provided to select processing performable in the reproduction mode.

During the operation at the time of reproduction to be described with reference to FIGS. 8 to 10, the recording and reproducing apparatus 100 according to the present embodiment performs various processes performable in reproduction processing and the reproduction mode while displaying the display items shown in FIG. 7 as appropriate.

Figure 8:
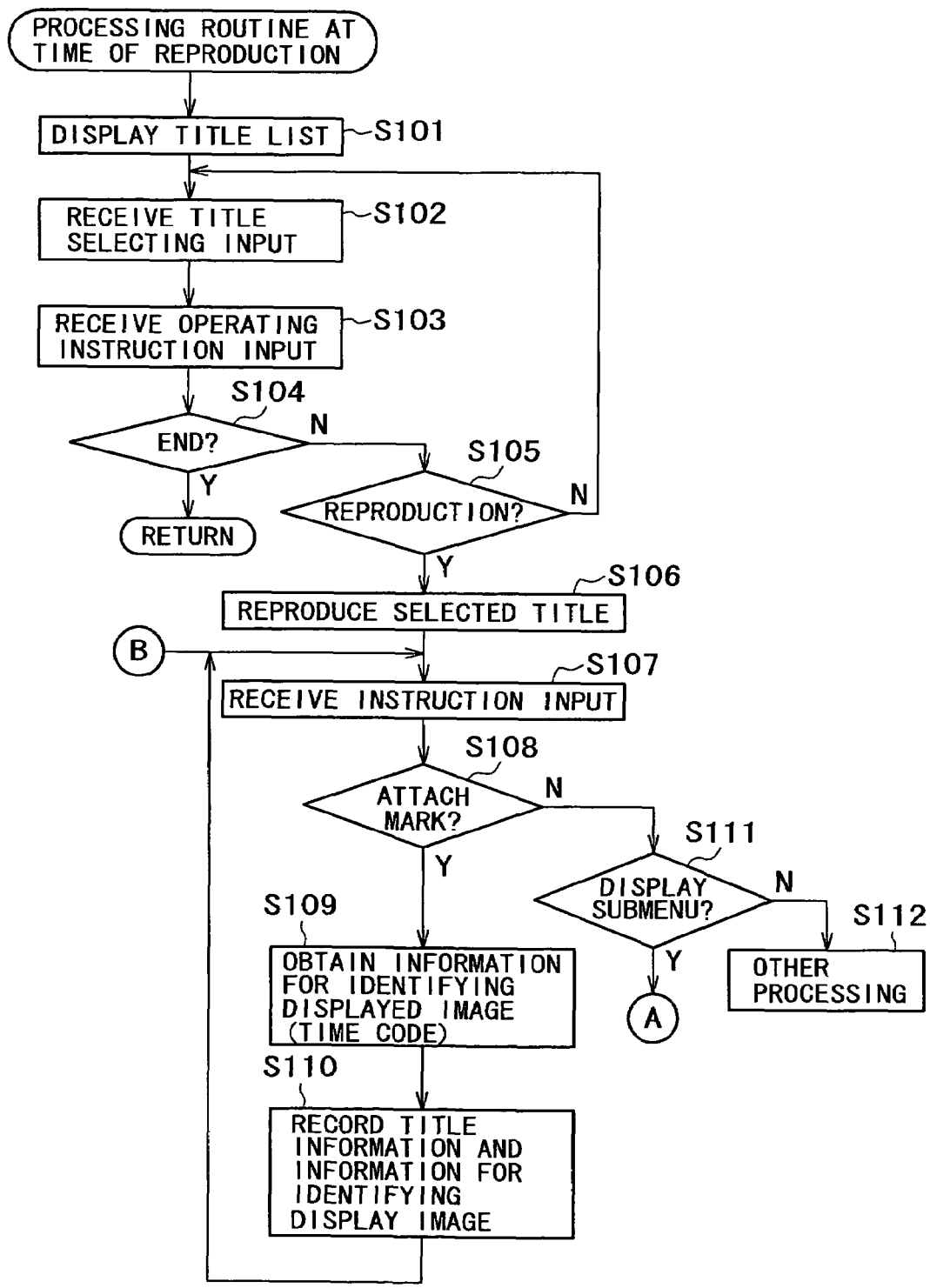
FIG. 8 is a flowchart of assistance in explaining the operation during reproduction.

As shown in FIG. 8, when the recording and reproducing apparatus 100 according to the present embodiment is turned on and an instruction is input to display a list of titles, such as television programs or the like, recorded on the recording medium 18, the CPU 40 refers to, for example, a directory of the recording medium 18 via the buffer control circuit 17, forms an image signal for displaying the list of titles recorded on the recording medium 18, and then supplies the image signal to the combining circuit 26 via the multiplexing/separating circuit 16, whereby the title list is displayed on the monitor receiver 200 in combination with the displayed image 201G (step S101).

Then, the CPU 40 of the recording and reproducing apparatus 100 receives a title selecting input from the user via the remote control 150 or the operating panel provided on the front panel of the recording and reproducing apparatus 100 (step S102). The CPU 40 also receives an operating instruction input from the user via the remote control 150 or the operating panel (step S103).

Then, the CPU 40 determines whether an end instruction has been input from the user as the operating instruction (step S104). When the CPU 40 determines in the determination process at step S104 that an end instruction has been input, the CPU 40 ends the processing represented in FIGS. 8 to 10, and goes into a so-called initial input wait state for receiving a recording mode selecting input, a title list display instruction input or the like.

When the CPU 40 determines in the determination process at step S104 that an end instruction has not been input, the CPU 40 determines whether an input for selecting a target title and an instruction input for reproducing the selected title have been input (step S105). When the CPU 40 determines in the determination process at step S105 that no title has been selected or that no reproduction instruction has been input, the CPU 40 repeats the processing from step S102 to receive a title selecting input and an operating instruction input.

When the CPU 40 determines in the determination process at step S105 that an instruction to reproduce a selected title has been input, the CPU 40 controls each of the buffer control circuit 17, the multiplexing/separating circuit 16, the MPEG audio decoder 19, the audio signal post-processing circuit 20, the D/A converter 21, the MPEG video decoder 23, the video signal post-processing circuit 24, the combining circuit 26, and the NTSC encoder 27 to start reproducing the title selected at step S102 (step S106).

Incidentally, the state display G1 and the remote control operable key display G2 described above with reference to FIG. 7 are displayed for a certain time at step S106, for example about a few seconds, to identify the reproduction mode and the usable operating keys on the remote control 150 and the operating panel.

The CPU 40 then receives an instruction input from the user via the remote control 150 or the operating panel (step S107). Instructions receivable at step S107 include an instruction for attaching a chapter mark by pressing the chapter mark key 154, an instruction for displaying a submenu, and other instructions to pause, fast forward, fast reverse, stop reproduction and the like.

The CPU 40 then determines whether the instruction received at step S107 is an instruction for attaching a chapter mark (step S108). When the CPU 40 determines in the determination process at step S108 that an instruction for attaching a chapter mark has been received, the CPU 40 obtains a time code or a frame number for identifying an image displayed on the display screen 201 of the monitor receiver 200 when the instruction was received (step S109).

After obtaining the time code or the like, the CPU 40 records on the recording medium 18 title information indicating the title currently being reproduced and the time code or the like of image information forming the title and provided with the chapter mark in association with each other (step S110). The processing from step S107 is then repeated to allow a chapter mark to be attached to a plurality of images (a plurality of positions) of the same title.

When the CPU 40 determines in the determination process at step S108 that the received instruction is not an instruction for attaching a chapter mark, the CPU 40 determines whether the instruction is an instruction to display a submenu MNS (step S111). When the CPU 40 determines in the determination process at step S111 that the instruction input is not an instruction to display a submenu, the CPU 40 performs other processes specified by the user, for example, processes to pause, fast forward, fast reverse, stop reproduction and the like (step S112). When the CPU 40 determines in the determination at step S111 that the instruction input is an instruction to display a submenu MNS, the CPU 40 proceeds to the processing represented in FIG. 9, and displays the submenu MNS (step S113). The submenu MNS is to select "mark editing" to edit chapter marks attached to images, "title protection" to prevent accidental deletion of the already recorded title, "title deletion" to delete the already recorded title, and the like.

The CPU 40 then receives a selecting input from the user via the remote control 150 or the operating panel provided on the front panel of the recording and reproducing apparatus 100 (step S114). The CPU 40 then determines whether the selecting input received at step S114 is an instruction to perform "mark edit" (step S115).

When the CPU 40 determines in the determination process at step S115 that the received selecting input is not an instruction to perform "mark edit," the CPU 40 performs selected processes such as "title protection," "title deletion" or the like (step S116).

When the CPU 40 determines in the determination process at step S115 that "mark edit" has been selected, the CPU 40 controls the multiplexing/separating circuit 16, the MPEG video decoder 23, the video signal post-processing circuit 24, the combining circuit 26, and the NTSC encoder 27 to pause the displayed image 201G (step S117).

Next, the CPU 40 forms an image signal for displaying a time line 201T and triangular marks M1, M2, M3, M4, . . . , and supplies the image signal to the multiplexing/separating circuit 16 and then to the combining circuit 26, to display the time line 201T and the triangular marks M1, M2, M3, . . . on the display screen 201 of the monitor receiver 200 with an immediate triangular mark in a selected state (step S118).

The CPU 40 then receives a key input from the user via the remote control 150 or the operating panel (step S119). With the recording and reproducing apparatus 100 according to the present embodiment, input keys operable at step S119 are the up arrow key 152U, the enter key 153, and the left and right arrow keys 152L and 152R.

The CPU 40 then determines the input key operated at step S119 (step S120). When the CPU 40 determines at step S120 that the operated input key was the up arrow key 152U, the CPU 40 determines that an instruction to display reduced still images (display thumbnails) was given. The CPU 40 extracts chapter mark information as information for identifying an image corresponding to the currently selected triangular mark. On the basis of the chapter mark information, the CPU 40 reads image data of the image corresponding to the currently selected triangular mark and images adjacent thereto from the recording medium 18. The CPU 40 forms the reduced still images (thumbnails) S. The CPU 40 supplies the reduced still images (thumbnails) S to the monitor receiver to display the reduced still images (thumbnails) S on the display screen of the monitor receiver (step S121).

The CPU 40 then receives a key input to the reduced still images displayed as thumbnails (step S122). Input keys operable at step S122 are a down arrow key 152D, the enter key 153, and the left and right arrow keys 152L and 152R.

The CPU 40 determines the input key received at step S122 (step S123). When the CPU 40 determines that the down arrow key 152D was operated, the CPU 40 determines that an instruction to hide the displayed thumbnails S was given, and hides the displayed thumbnails (step S124). The CPU 40 then repeats the processing from step S119.

When the CPU 40 determines in the determination process at step S123 that the received input key was the enter key, the CPU 40 forms an image signal for displaying the menu MN1, and then supplies the image signal to the monitor receiver for display (step S125).

When the CPU 40 determines in the determination process at step S123 that the received input key was the left key 152L or the right key 152R, the CPU 40 selects a displayed reduced still image as described above with reference to FIG. 4 and FIGS. 5A to 5C (step S126). The CPU 40 thereafter repeats the processing from step S122.

When the CPU 40 determines in the determination process at step S120 that the key input received at step S119 was the enter key 153, the CPU 40 forms an image signal for displaying the menu MN2, and then supplies the image signal to the monitor receiver for display (step S127). After the processing at step S125 and the processing at step S127, the CPU 40 proceeds to processing represented in FIG. 10 as described later.

When the CPU 40 determines in the determination process at step S120 that the key input received at step S119 was the left key 152L or the right key 152R, the CPU 40 selects a triangular mark corresponding to an image at the target position on the display already displaying the time line 201T and the triangular marks M1, M2, M3, . . . (step S128). The CPU 40 thereafter repeats the processing from step S119.

Figure 9:
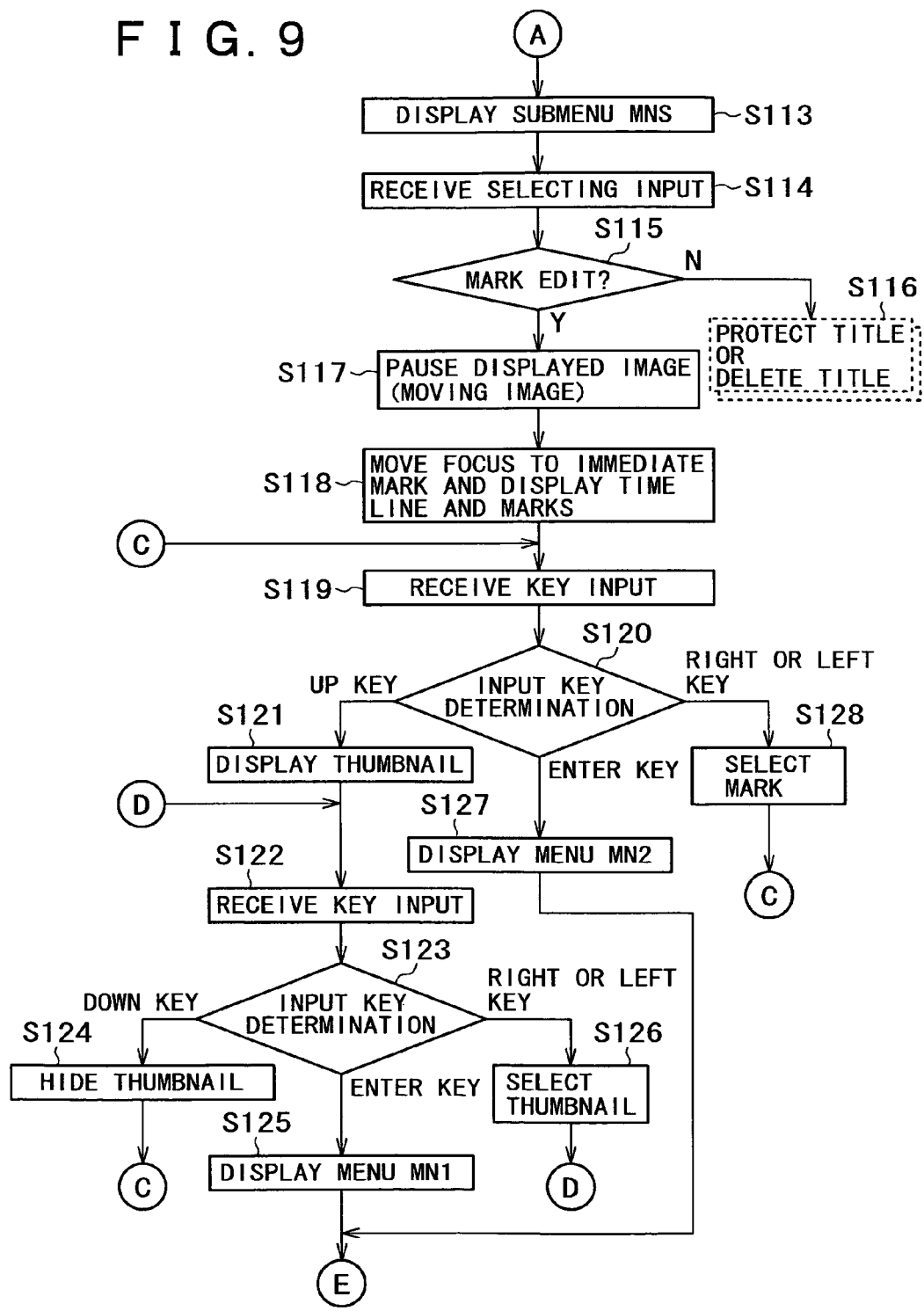
FIG. 9 is a flowchart continued from FIG. 8.
Figure 10:
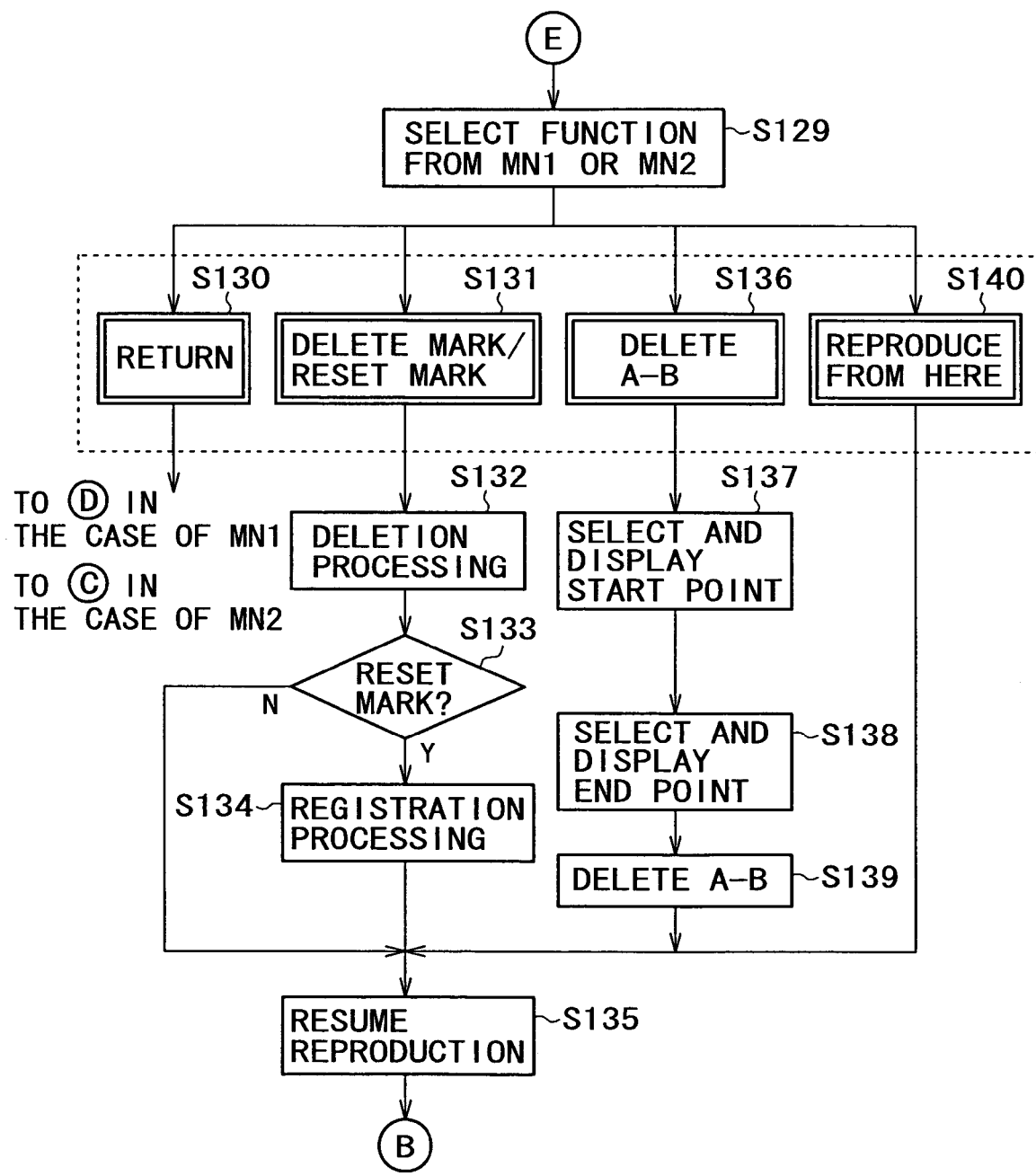
FIG. 10 is a flowchart continued from FIG. 9.

As shown in FIG. 9 and as described above, after step S125 and step S127, the CPU 40 proceeds to the processing represented in FIG. 10. The CPU 40 receives a selection of a function from the menu MN1 displayed at step S125 shown in FIG. 9 or the menu MN2 displayed at step S127 (step S129).

At step S129, when the displayed menu is the menu MN1, the menu is for the reduced still image, and therefore "return" and "reset mark" can be selected, as shown in FIG. 5C. When the displayed menu is the menu MN2, the menu is for the time line and the triangular mark, and therefore "return," "delete mark," "delete A-B," and "reproduce from here" can be selected, as shown in FIG. 6.

When the CPU 40 determines at step S129 that "return" was selected (step S130), in the case of the menu MN1 being displayed, the CPU 40 repeats the processing from step S122 shown in FIG. 9 to receive a key input to the reduced still images again, and in the case of the menu MN2 being displayed, the CPU 40 repeats the processing from step S119 shown in FIG. 9 to receive a key input to the triangular marks corresponding to chapter marks again.

When the CPU 40 determines at step S129 that mark resetting was selected from the menu MN1 or the CPU 40 determines at step S129 that mark deletion was selected from the menu MN2 (step S131), the CPU 40 first deletes from the recording medium 18 the chapter mark information attached to the image corresponding to the selected triangular mark (step S132).

The CPU 40 then determines whether an instruction for mark resetting was given (step S133). When an instruction for mark resetting was given, the instruction is an instruction input to the menu MN1 for the selected reduced still image, as shown in FIG. 7. Therefore, the CPU 40 obtains a time code, for example, as information for identifying an image corresponding to the selected reduced still image, and then registers (records) the new time code as chapter mark information on the recording medium 18 (step S134).

After the processing at step S134, or when the CPU 40 determines at step S133 that mark resetting was not selected (deletion of the triangular mark was selected in the menu MN2), the CPU 40 resumes the reproduction of the displayed image 201G, which reproduction was stopped at step S117 (step S135). The CPU 40 repeats the processing from the step S107 shown in FIG. 8.

When the CPU 40 determines at step S129 that "delete A-B" was selected from the menu MN2 (step S136), the CPU 40 receives an input for selecting a start point using a displayed triangular mark as a processing unit, as shown by the start point ST in FIG. 7, and displays its position (step S137). Similarly, the CPU 40 receives an input for selecting an end point using a displayed triangular mark as a processing unit, as shown by the end point ED in FIG. 7, and displays its position (step S138).

The CPU 40 then deletes images from the start point selected at step S137 to the end point selected at step S138 (step S139). The CPU 40 thereafter resumes the reproduction of the displayed image 201G, which reproduction was stopped at step S117 (step S135). The CPU 40 then repeats the processing from step S107 shown in FIG. 8.

When the CPU 40 determines at step S129 that "reproduce from here" was selected from the menu MN2 (step S140), the CPU 40 resumes the reproduction of the title being processed from the image corresponding to the currently selected triangular mark (step S135). The CPU 40 then repeats the processing from step S107 shown in FIG. 8.

Thus, the recording and reproducing apparatus 100 according to the present embodiment can perform editing as required basically in the reproduction mode, without the need for properly using two different modes, that is, the reproduction mode and the edit mode as with the conventional recording and reproducing apparatus. Therefore, the recording and reproducing apparatus 100 according to the present embodiment obviates the inconvenience of not knowing an operation for shifting to the edit mode, taking time to shift to the edit mode, or the like.

In addition, editing operations are very easy because operations related to editing can be performed by using a very limited number of operating keys of the operating device, such as the remote control or the like, for example, the up arrow key 152U, the down arrow key 152D, the left arrow key 152L, the right arrow key 152R, the enter key 153, and the chapter mark key 154. Therefore, the recording and reproducing apparatus 100 obviates the inconvenience of frequently causing erroneous operation, missing a target scene while being distracted with operation, or the like.

Further, a chapter mark is attached to an image of a target scene, and the image provided with the chapter mark and images adjacent thereto can be checked simultaneously as reduced images and displayed in a scrollable manner. Therefore, without making a lot of use of conventional functions such as fast forward, fast reverse, frame advance and the like, editing can be performed by accurately specifying an image of the target scene with reference to the image provided with the chapter mark.

Thus, the recording and reproducing apparatus 100 according to the present embodiment makes it possible to perform editing operations quickly and easily, and hence, to concentrate on the screen (reproduced image) without being distracted with the operation of the remote control. Further, it is not necessary at all to be aware of the mode, such as the reproduction mode or the edit mode. In addition, precise editing in a frame unit can be performed, and searching for an edit point, changing of an edit point and the like can be performed easily with a frame as the smallest unit while checking images in a frame unit.

Incidentally, when a chapter mark is reset, it is possible to display an image newly provided with the chapter mark on the display screen 201 of the monitor receiver 200, and resume reproduction from the image. Also, when A-B deletion is performed, it is possible to resume reproduction from an image next to the deleted image section or resume reproduction from an image at a position of a next triangular mark.

Further, in mark resetting, when a chapter mark is to be attached to an image already provided with another chapter mark, a warning display, such as, for example, "A chapter mark is already attached", is displayed or an alarm sound is emitted.

It is further possible to display a list of all images provided with chapter marks. This can be realized by reading all chapter mark information recorded and retained as a separate file on the recording medium 18, reading image data of the images provided with the chapter marks from the recording medium 18 on the basis of the chapter mark information, and reproducing the image data.

[First Modification]

The foregoing embodiment allows the attachment of a chapter mark to an image of a target scene at a time of reproduction without stopping the reproduced image displayed on the display screen 201 of the monitor receiver 200 while checking the reproduced image. Then, after at least one or more chapter marks are attached, various editing including the changing (resetting) of a chapter mark is performed with reference to an image provided with the chapter mark. However, the present invention is not limited to this.

For example, it may be desired to accurately attach a chapter mark to a target image first in some cases. In such cases, when the chapter mark key 154 is pressed during reproduction of a target title, an image 201G displayed on the display screen of the monitor receiver 200 is made to be a still image as an image provided with a chapter mark, as shown in FIG. 4, for example.

Then, with the image provided with the chapter mark as a center, reduced still images of five frame images including two frame images preceding and succeeding the image provided with the chapter mark are displayed for resetting of the chapter mark or the like. Also, a time line 201T and a triangular mark in the vicinity of the time line 201T, which mark corresponds to a position of the image provided with the chapter mark, are displayed for deletion of the chapter mark, range specification and the like.

When a predetermined operation is performed for resuming reproduction, such as pressing a reproduction key, the reproduction of the displayed image 201G is resumed, and the reduced still images S1, S2, S3, S4, and S5, the time line 201T, and triangular marks M1, M2, M3, . . . are erased.

Thus, each time the chapter mark key 154 is pressed, reduced still images, the time line, and triangular marks are displayed to allow resetting and deletion of a chapter mark, and section specification. It is thereby possible to perform accurate edit processing on a target title while reproducing and viewing the title.

Incidentally, also in the first modification, when a chapter mark is reset, it is possible to display an image newly provided with the chapter mark on the display screen 201 of the monitor receiver 200, and resume reproduction from the image. Also, when A-B deletion is performed, it is possible to resume reproduction from an image next to the deleted image section or from an image at the position of the next triangular mark.

Further, it is possible to include both the mode of adding chapter marks without stopping the reproduced image at the time of reproduction as described first and the mode of stopping the reproduced image and performing chapter mark resetting each time a chapter mark is added, as described in the first modification, so that the user selects and uses both modes.

[Second Modification]

Figure 11:
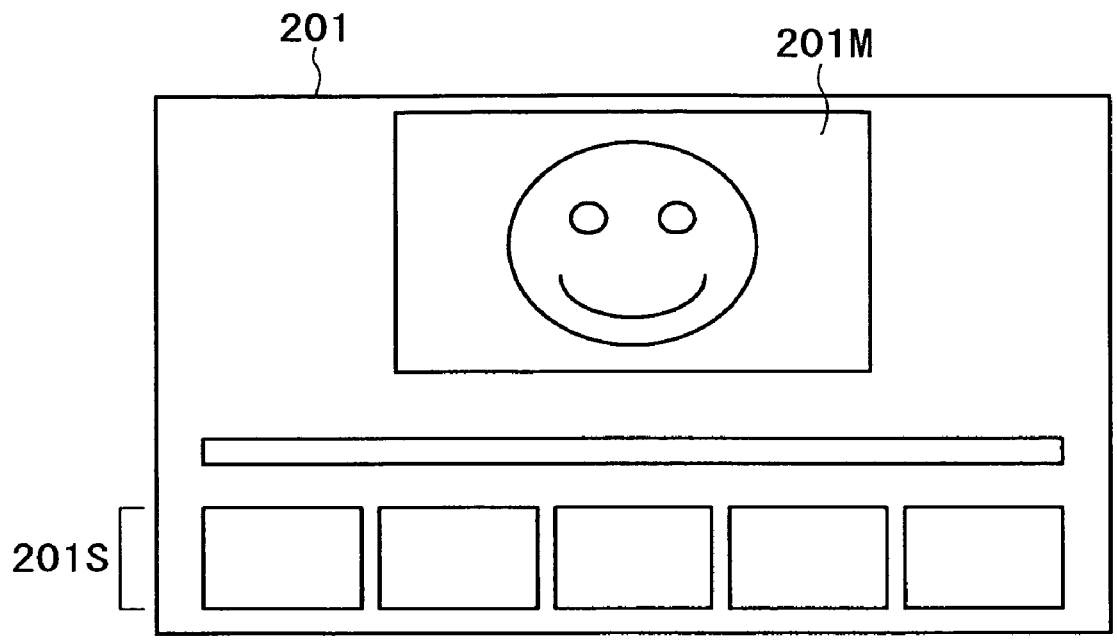
FIG. 11 is a diagram of assistance in explaining another example of a displayed image.

In the foregoing embodiment, reduced still images are displayed so as to overlap the display of a moving image on the display screen 201 of the monitor receiver 200. However, the present invention is not limited to this. For example, as shown in FIG. 11, a moving image display area 201M and a reduced image display area 201S may be separated from each other on the display screen 201 so as not to overlap each other.

In this case, the moving image display area 201M displays the reproduced image of a title recorded on the recording medium 18, while the still image display area 201S displays reduced still images referred to as thumbnails or the like. Thus, the whole of the reproduced image of the title can be viewed without being hidden by the reduced still images and the like.

Figure 12:
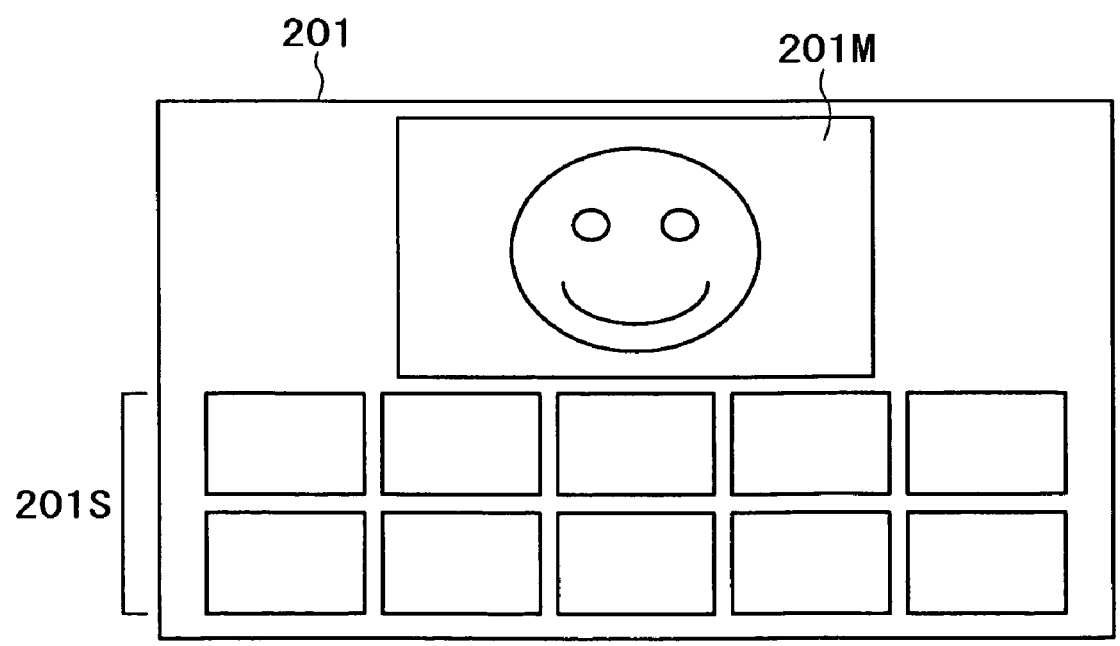
FIG. 12 is a diagram of assistance in explaining another example of a displayed image.

Incidentally, as shown in FIG. 12, the reduced image display area 201S may be made as large as possible to display more reduced still images. Also, the moving image display area may be disposed on a lower side of the display screen 201, and the still image display area may be disposed on an upper side of the display screen 201.

Further, the moving image display area may be disposed on a right side of the display screen 201, and the still image display area may be disposed on a left side of the display screen 201. Further, the moving image display area may be disposed on the left side of the display screen 201, and the still image display area may be disposed on the right side of the display screen 201. In short, the display screen 201 can be divided into the moving image display area and the still image display area as appropriate.

SECOND EMBODIMENT

The recording and reproducing apparatus according to the first embodiment as described above makes it possible to attach a chapter mark to a target scene or the vicinity thereof during the reproduction of the image information of a title (one information signal set of a broadcast program or the like) recorded on the recording medium, and to accurately specify an edit section with reference to the attached chapter marks for desired editing. It is thus possible to start edit operation seamlessly during the reproduction without being particularly aware of the reproduction mode and the edit mode.

There are cases, however, where a target scene is desired to be found as quickly as possible from a large amount of image information recorded on the recording medium. There are, for example, cases where a target scene for editing, such as deletion, extraction, movement or the like, is desired to be found from a broadcast movie program recorded on the recording medium and a target scene to be edited is desired to be found from image information taken by a video camera over a long period of time and recorded on the recording medium of the recording and reproducing apparatus.

In such cases, it takes time to find the target scene if reproduction is performed from the start of the image information recorded on the recording medium and the reproduced image is viewed until the target scene appears on the display screen of the monitor receiver. So-called fast forward reproduction to find the target scene is conceivable; this, however, increases a possibility of missing the target scene, and may thus lack reliability.

Accordingly, a recording and reproducing apparatus according to a second embodiment is provided with a plurality of small areas (sub-image display areas (child screens)) for displaying a moving image in a display screen so that a plurality of moving images of a title recorded on a recording medium are simultaneously reproduced from different points to enable quick finding of a target scene.

An image processing system of the second embodiment is configured so as to be similar to the image processing system of the first embodiment shown in FIG. 1. A recording and reproducing apparatus 600 forming the image processing system in this case is also configured so as to be substantially similar to the recording and reproducing apparatus 100 according to the first embodiment shown in FIG. 2, except for a display image forming circuit 50, as shown in FIG. 13. Hence, parts of the recording and reproducing apparatus 600 shown in FIG. 13 that are similar to those of the recording and reproducing apparatus 100 shown in FIG. 2 are identified by the same reference numerals, and detailed description thereof will be omitted.

In the recording and reproducing apparatus 600 according to the second embodiment, the speed of reading image data and the like of a target title from the recording medium 18 and the speed of processing by an MPEG video decoder 23 are sufficiently high. Also, the recording and reproducing apparatus 600 has the display image forming circuit 50 capable of simultaneously processing not only still images but also a plurality of moving images. The recording and reproducing apparatus 600 can thereby simultaneously reproduce a title selected to be reproduced from a plurality of different points.

FIRST EXAMPLE

A description will hereinafter be made of a few concrete examples of the recording and reproducing apparatus 600 according to the second embodiment that makes it possible to quickly detect an image of a target scene using a moving image display. FIG. 14 is a diagram of assistance in explaining a first example of the recording and reproducing apparatus 600 that makes it possible to quickly detect a target scene using a moving image display.

As shown in FIG. 14, a CPU 40 of the recording and reproducing apparatus 600 in this example can provide a first moving image display area 201M1, a second moving image display area 201M2, and a third moving image display area 201M3. The CPU 40 controls a buffer control circuit 17 to start reading image data from three points: a head point of a target title (one information signal set of a broadcast program or the like), a point ahead of the head point by 10 seconds in reproduction time, and a point ahead of the head point by 20 seconds in reproduction time. The CPU 40 supplies each piece of the read image data to the MPEG video decoder 23 via a multiplexing/separating circuit 16.

The MPEG video decoder 23 decodes each piece of the image data read from the three points as start points and supplied via the multiplexing/separating circuit 16. The MPEG video decoder 23 sequentially supplies each piece of the decoded image data to the display image forming circuit 50.

The display image forming circuit 50 forms image data for displaying a moving image on the basis of each piece of image data from the three pieces of image data read from the different start points and supplied to the display image forming circuit 50. The display image forming circuit 50 supplies the image data to a combining circuit 26.

The combining circuit 26 combines the image data so as to display a reproduced moving image corresponding to the image data from the head point of the target title in the first moving image display area 201M1, a reproduced moving image corresponding to the image data from the point 10 seconds in reproduction time after the head point of the target title in the second moving image display area 201M2, and a reproduced moving image corresponding to the image data from the point 20 seconds in reproduction time after the head point of the target title in the third moving image display area 201M3, as shown in FIG. 14.

The combined image data is supplied from the combining circuit 26 to an NTSC encoder 27. The NTSC encoder 27 generates an analog composite video signal (Cps) and an analog separate video signal (S), and then outputs these signals through analog video output terminals 28 and 29.

Thus, one title is reproduced from a plurality of points with time differences, and an image reproduced from each point is displayed, whereby a target scene can be detected without being missed. Specifically, images from points ahead of that of the first moving image display area 201M1 are displayed in the second moving image display area 201M2 and the third moving image display area 201M3. It is therefore possible to surely detect an image of a target scene and specify the image as an edit candidate point.

Further, by setting relatively long intervals between image reading start points, for example, intervals of a few minutes or a few tens of minutes, it is possible to detect a plurality of target signals concurrently.

Further, quick detection of a target scene can be facilitated by changing the reproduction speed (display speed) between the moving image displayed in the first moving image display area, the moving image displayed in the second moving image display area, and the moving image displayed in the third moving image display area, for example, by setting the reproduction speed of the moving image displayed in the second moving image display area and the moving image displayed in the third moving image display area at twice or three times faster than that of the moving image displayed in the first moving image display area.

The reproduction speed of the moving images is not defined by the speed of reading data from the recording medium or the speed of processing data, but by the display speed of the moving images. That is, in the present specification, the reproduction speed of moving images is synonymous with the display speed of moving images.

The time differences provided between the plurality of moving images may, of course, be different from each other. The number of moving image display areas provided is not limited to three; two moving image display areas may be provided or more than two moving image display areas may be provided.

Further, a reference moving image may be displayed in the first moving image display area 201M1, a moving image 10 seconds thereafter may be displayed in the second moving image display area 201M2, and a moving image 10 seconds thereafter may be displayed in the third moving image display area 201M3.

By thus reproducing the same title from a plurality of points with time differences and displaying an image reproduced from each point, it is possible to easily recognize a target image (an image of a target scene) to be displayed in the first moving image display area 201M1 in fast forward or fast reverse, for example, on the basis of moving images displayed in the second moving image display area 201M2 and the third moving image display area 201M3.

When a chapter mark is attached to the image displayed in the first moving image display area 201M1, as in the case of the recording and reproducing apparatus according to the first embodiment, for example, the image displayed in the first moving image display area 201M1 is made still and frame images (still images) preceding and succeeding the image displayed in the first moving image display area 201M1 are displayed in a reduced image display area 201S in FIG. 14, whereby precise selection and setting of an edit point can be performed as in the case of the first embodiment.

That is, the reduced image display area 201S is used in the same manner as in the foregoing recording and reproducing apparatus 100 according to the first embodiment. Also, when a chapter mark is set, a time line and a triangular mark indicating the position of an image provided with the chapter mark (edit candidate point) within the title can be displayed on the display screen as in the case of the recording and reproducing apparatus 100 according to the first embodiment.

The still images displayed in the reduced image display area 201S are also formed by the display image forming circuit 50. Thus, the display image forming circuit 50 can generate the data of the moving images displayed in the first moving image display area 201M1, the second moving image display area 201M2, and the third moving image display area 201M3, and also the plurality of still images displayed in the reduced image display area 201S.

In the description above, the display image forming unit 50 forms all the data of the images (the data of the moving images) displayed in the first moving image display area 201M1, the second moving image display area 201M2, and the third moving image display area 201M3. However, the present invention is not limited to this. For example, a video signal post-processing circuit 24 may form the moving image displayed as a reference image in the first moving image display area 201M1.

Incidentally, the CPU 40 controls the operation of each of the buffer control circuit 17, the multiplexing/separating circuit 16, the MPEG video decoder 23, the display image forming circuit 50, the combining circuit 26, the NTSC encoder 27 and the like to display the plurality of moving images within one screen, as shown in FIG. 14.

In the first example, audio data accompanying the reproduced video data, for example, audio data corresponding to the image displayed in the first moving image display area 201M1, can be read from the recording medium 18 via the buffer control circuit 17, and reproduced via an MPEG audio decoder 19, an audio signal post-processing circuit 20, and a D/A converter 21.

That is, it is possible to reproduce sound corresponding to the moving image displayed in the first moving image display area 201M1, sound corresponding to the moving image displayed in the second moving image display area 201M2, or sound corresponding to the moving image displayed in the third moving image display area 201M3.

SECOND EXAMPLE

The foregoing first example provides reading start points (reproducing points) at predetermined intervals to thereby prevent an image of a target scene from being missed and to realize quick detection of the image of the target scene. The second example makes it possible to quickly and easily detect an image of a target scene as an edit candidate point from image data recorded for a long period of time, for example.

FIG. 15 is a diagram of assistance in explaining an example of an image displayed on the display screen 201 of the monitor receiver by a recording and reproducing apparatus 600 in the second example of the second embodiment. When a title to be reproduced is selected from among titles (information signal sets of broadcast programs or the like) recorded on a recording medium 18, a CPU 40 of the recording and reproducing apparatus 600 first provides a main image display area 201M and displays a time line 201T corresponding to the total amount of image data of the title selected to be reproduced within the display screen 201, as shown in FIG. 15.

In this case, the main image display area 201M, the time line 201T, and a reproduction position specifying mark moving on the time line 201T are formed by the CPU 40 using data stored in a ROM 41, and are then supplied to a combining circuit 26 via a multiplexing/separating circuit 16, for example, whereby the main image display area 201M, the time line 201T, and the reproduction position specifying mark are displayed on the display screen of the monitor receiver 200 connected to the recording and reproducing apparatus 600.

A user of the recording and reproducing apparatus 600 moves the reproduction position specifying mark on the time line 201T by operating, for example, an arrow key on a remote control 150 using the time line 201T as a measure, and selects and inputs one or more moving image reproducing points.

The CPU 40 of the recording and reproducing apparatus 600 displays reproducing points MK1, MK2, MK3, . . . indicating moving image reproducing positions at the positions selected and input by the user. Incidentally, an input item for setting a moving image reproducing time may be provided to set one or more reproducing points by a moving image reproducing time, that is, a numerical value.

Further, the CPU 40 of the recording and reproducing apparatus 600 forms sub-image display areas as reproduced image display areas according to the number of input moving image reproducing points. The CPU 40 reads image data for one frame at a position corresponding to an input moving image reproducing point from the recording medium 18 and then displays a frame image (still image) based on the read image data in a sub-image display area.

In this case, as with the time line 201T, the reproducing points MK1, MK2, MK3, . . . are formed by the CPU 40, and supplied to the combining circuit 26, so that the reproducing points are displayed in the image. Image data for forming a frame image at a position corresponding to each reproducing point is read from the recording medium 18 by control of the CPU 40, and then supplied to an MPEG video decoder 23 via the multiplexing/separating circuit 16. The image data is subjected to MPEG decoding by the MPEG video decoder 23, and then supplied to the display image forming circuit 50.

Image data for displaying a frame image as a still image in each sub-image display area is formed by the display image forming circuit 50, and is then supplied to the combining circuit 26 to be combined, whereby the frame images at the positions corresponding to the reproducing points are displayed in the sub-image display areas provided within one screen.

When a plurality of sub-image display areas are provided, selection of a sub-image display area can be made, and the CPU 40 of the recording and reproducing apparatus 600 displays an image identical with an image of the sub-image display area at which a cursor is positioned in the main image display area 201M. The cursor for the sub-image display area is displayed and controlled in the display position by the CPU 40.

In the example shown in FIG. 15, three positions in an early stage, a middle stage, and a late stage of the title selected to be reproduced are selected as moving image reproducing points. The reproducing points MK1, MK2, and MK3 are displayed on the time line 201T, and three sub-image display areas SG1, SG2, and SG3 are provided.

Frame images (still images) at positions corresponding to the reproducing points MK1, MK2, and MK3 are each processed by the multiplexing/separating circuit 16, the MPEG video decoder 23, the display image forming circuit 50, the combining circuit 26, and an NTSC encoder 27 as described above, and are displayed in the respective sub-image display areas SG1, SG2, and SG3 formed on the display screen.

In the example shown in FIG. 15, the cursor CS for a sub-image display area is positioned at the sub-image display area SG1, and the same image as in the sub-image display area SG1 is displayed in the main image display area 201M.

Incidentally, in this example, the image displayed in the main image display area 201M is displayed on the basis of image data formed in a video signal post-processing circuit 24.

In the state shown in FIG. 15, the images displayed in the main image display area 201M and the sub-image display areas SG1, SG2, and SG3 are the frame images (still images) at the positions corresponding to the reproducing points specified by the user.

In this state, by operating the remote control 150, the position of a reproducing point can be changed or the cursor CS for the sub-image display area can be moved to be positioned at another sub-image display area. Incidentally, the cursor CS for the sub-image display area can be moved even after reproduction of the selected title is actually started, as will be described later.

When an instruction to start actual reproduction of the selected title is given by pressing a reproduction key of the remote control 150 or the like, the CPU 40 of the recording and reproducing apparatus 600 starts reproducing moving images in the main image display area 201M and the sub-image display areas SG1, SG2, and SG3.

FIG. 16 is a diagram of assistance in explaining an image displayed on the display screen 201 of the monitor receiver 200 at the time of moving image reproduction by the recording and reproducing apparatus 600 in the second example of the second embodiment. As described above, when an instruction to reproduce moving images is given, the CPU 40 sequentially reads image data at the positions corresponding to the reproducing points MK1, MK2, and MK3 from the recording medium 18.

As in displaying still images in the main image display area 201M and the sub-image display areas SG1, SG2, and SG3, the CPU 40 controls the multiplexing/separating circuit 16, the MPEG video decoder 23, the video signal post-processing circuit 24, the display image forming circuit 50, the combining circuit 26, and the NTSC encoder 27, and supplies the image data sequentially read from the recording medium 18 to the multiplexing/separating circuit 16, the MPEG video decoder 23, the video signal post-processing circuit 24, the display image forming circuit 50, the combining circuit 26, and the NTSC encoder 27, so that the main image display area 201M and the sub-image display areas SG1, SG2, and SG3 each display a moving image reproduced from the corresponding reproducing point, as shown in FIG. 16.

Further, the CPU 40 of the recording and reproducing apparatus displays the reproducing points MK1, MK2, and MK3 such that each of the reproducing points MK1, MK2, and MK3 moves in a direction of reproduction in such a manner as to be interlocked with the reproduction of the moving image, as indicated by an arrow in FIG. 16, so that the user can visually perceive the position in the title being reproduced of the image displayed in each of the sub-image display areas SG1, SG2, and SG3. Marks ST1, ST2, and ST3 indicated by dotted lines in FIG. 16 represent the respective start points of the reproducing points MK1, MK2, and MK3.

Incidentally, in the example shown in FIG. 16, since the cursor CS for the sub-image display area is positioned at the sub-image display area SG1, the main image display area 201M displays the same moving image as the moving image displayed in the sub-image display area SG1.

Thus, the user of the recording and reproducing apparatus 600 in the second example can detect an image of a target scene to be used as an edit candidate point through the moving images from the different reproducing points displayed in the three sub-image display areas SG1, SG2, and SG3.

When the image of the target scene or an image in the vicinity of the target scene is displayed in one of the sub-image display areas SG1, SG2, and SG3, the cursor CS is positioned to the sub-image display area displaying the image of the target scene or the image in the vicinity of the target scene.

Thereby, the same moving image as in the sub-image display area at which the cursor CS is positioned is displayed in the main image display area 201M, so that the image of the target scene to be used as an edit candidate point can be detected through the moving image displayed in the main image display area 201M, which has a display area larger than the sub-image display area.

Figure 17:
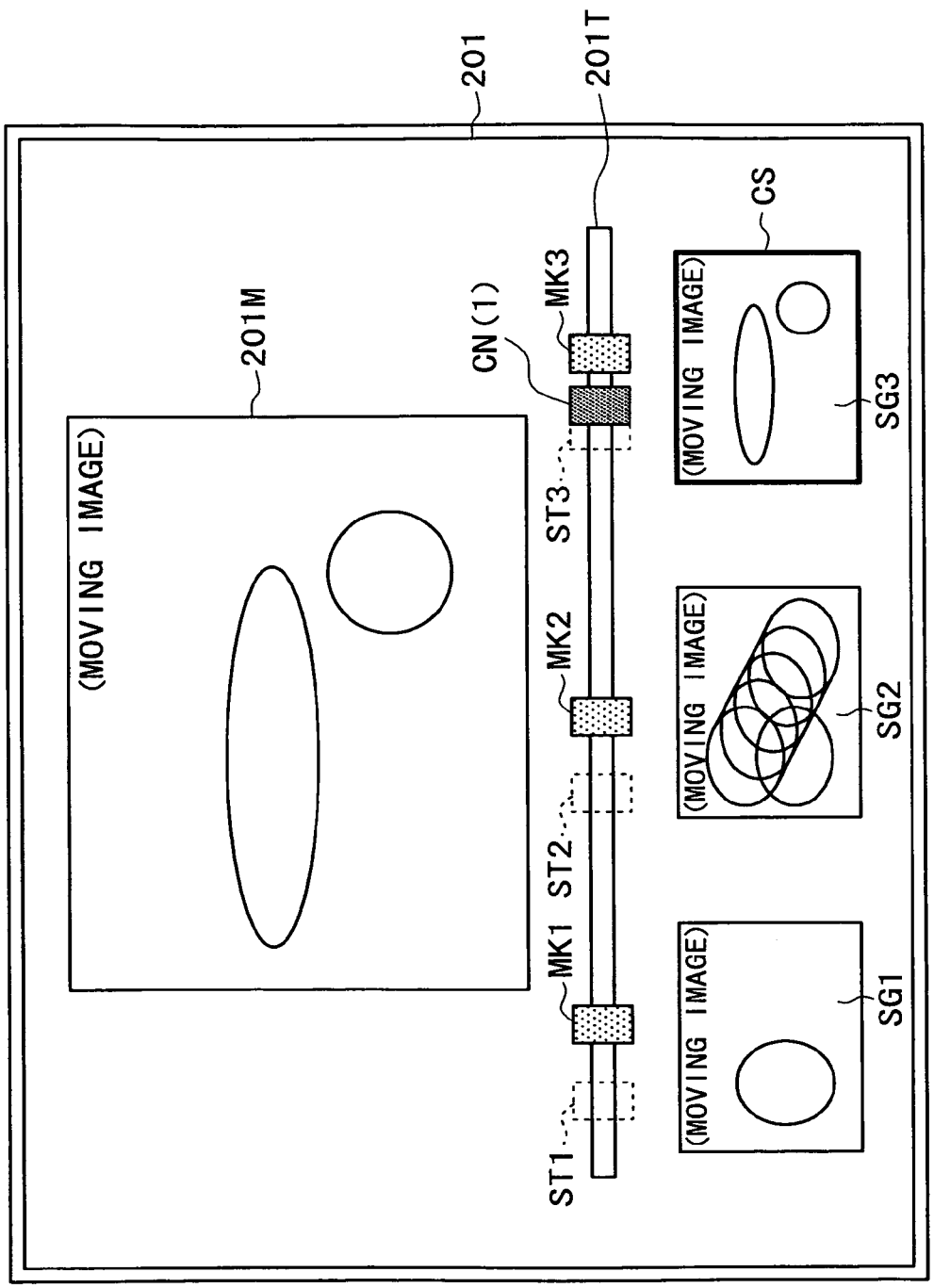
FIG. 17 is a diagram of assistance in explaining the operation of a user and the recording and reproducing apparatus 600 when an image to be used as an edit candidate point is selected from among images of a target scene.
Figure 18:
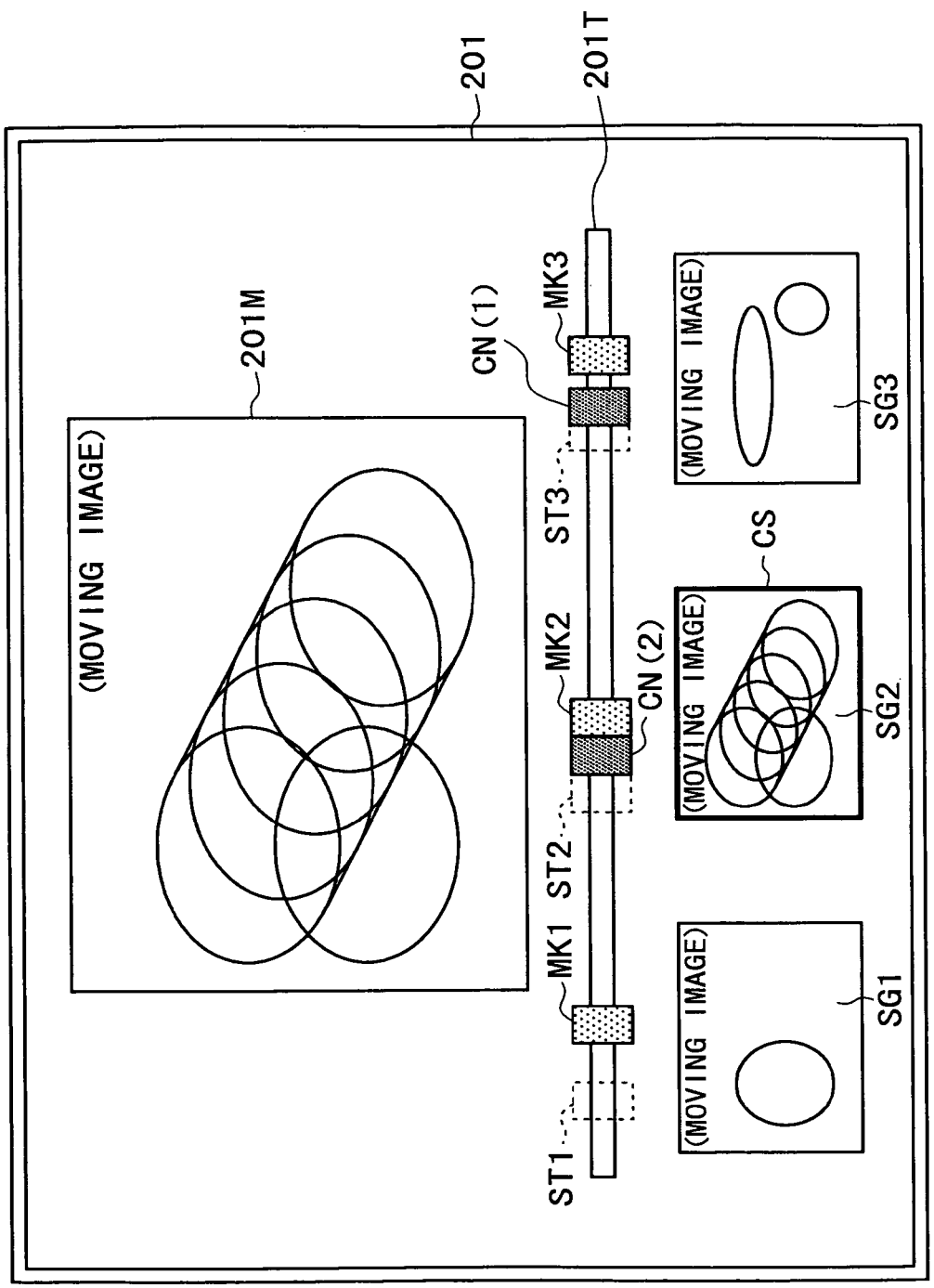
FIG. 18 is a diagram of assistance in explaining the operation of the user and the recording and reproducing apparatus 600 when an image to be used as an edit candidate point is selected from among images of a target scene.

FIG. 17 and FIG. 18 are diagrams of assistance in explaining operations of the user and the recording and reproducing apparatus 600 when an image to be used as an edit candidate point is selected from among images of target scenes.

Suppose that when, as described with reference to FIG. 16, moving image reproduction from the plurality of reproducing points MK1, MK2, and MK3 is started simultaneously and the cursor CS is positioned at the sub-image display area SG1, an image that appears to be in the vicinity of a target scene is displayed in the sub-image display area SG3. At this time, the user operates an arrow key on the remote control 150 to position the cursor positioned at the sub-image display area SG1 to the sub-image display area SG3.

In response to the instruction from the user through the remote control 150, the CPU 40 of the recording and reproducing apparatus 600 positions the cursor CS to the sub-image display area SG3, and displays the moving image displayed in the sub-image display area SG3 also in the main image display area 201M, as shown in FIG. 17.

When an image of the target scene is displayed in the main image display area 201M, the user of the recording and reproducing apparatus 600 presses a chapter mark key 154 provided on the remote control 150.

When it receives a signal indicating that the chapter mark key 154 has been pressed from the remote control 150, the CPU 40 of the recording and reproducing apparatus obtains a time code or a frame number, for example, as information capable of identifying the frame image displayed at that time in the main image display area 201M, and records the time code or the frame number onto the recording medium 18 as information indicating an edit candidate point.

At the same time, the CPU 40 displays an edit candidate point mark CN(1) on the time line 201T, indicating the position of the frame image in the title at the time the chapter mark key was pressed. The edit candidate point mark is displayed in a readily distinguishable form, having, for example, a color, a shape or the like different from that of a reproducing point mark.

As described above, even when the chapter mark key 154 is pressed, the display of the moving images displayed in the main image display area 201M and the sub-image display areas SG1, SG2, and SG3 is not stopped, but is continued.

Suppose that thereafter an image that appears to be in the vicinity of a target scene is displayed in the sub-image display area SG2. At this time, the user operates an arrow key on the remote control 150 to position the cursor CS positioned at the sub-image display area SG3, as shown in FIG. 17, to the sub-image display area SG2, as shown in FIG. 18.

In response to the instruction from the user through the remote control 150, the CPU 40 of the recording and reproducing apparatus 600 positions the cursor CS to the sub-image display area SG2, and displays the moving image displayed in the sub-image display area SG2 also in the main image display area 201M, as shown in FIG. 18.

When an image of the target scene is displayed in the main image display area 201M, the user of the recording and reproducing apparatus 600 presses the chapter mark key 154 provided on the remote control 150.

When it receives a signal from the remote control 150 indicating that the chapter mark key 154 has been pressed, the CPU 40 of the recording and reproducing apparatus 600 obtains a time code or a frame number, for example, capable of identifying the frame image displayed at that time in the main image display area 201M, and records the time code or the frame number onto the recording medium 18 as information indicating an edit candidate point together with title identifying information, for example.

At the same time, the CPU 40 displays an edit candidate point mark CN(2) on the time line 201T, indicating the position of the frame image in the title at the time the chapter mark key was pressed.

Thus, using the images reproduced from the plurality of different reproducing points and displayed in the different sub-image display areas, the user can quickly detect images of target scenes as edit candidate points, and register the images as edit candidate points on the recording medium 18.

When one edit candidate point is selected from among the registered edit candidate point marks CN(1), CN(2), . . . , as in the case of the recording and reproducing apparatus 100 according to the first embodiment as described above with reference to FIG. 4, FIGS. 5A to 5C and the like, frame images (still images) in the vicinity of the edit candidate point are displayed to determine a final edit point of the target scene and to record the final edit point on the recording medium 18. Using the final edit point as a reference point, various editing can be performed.

Figure 19:
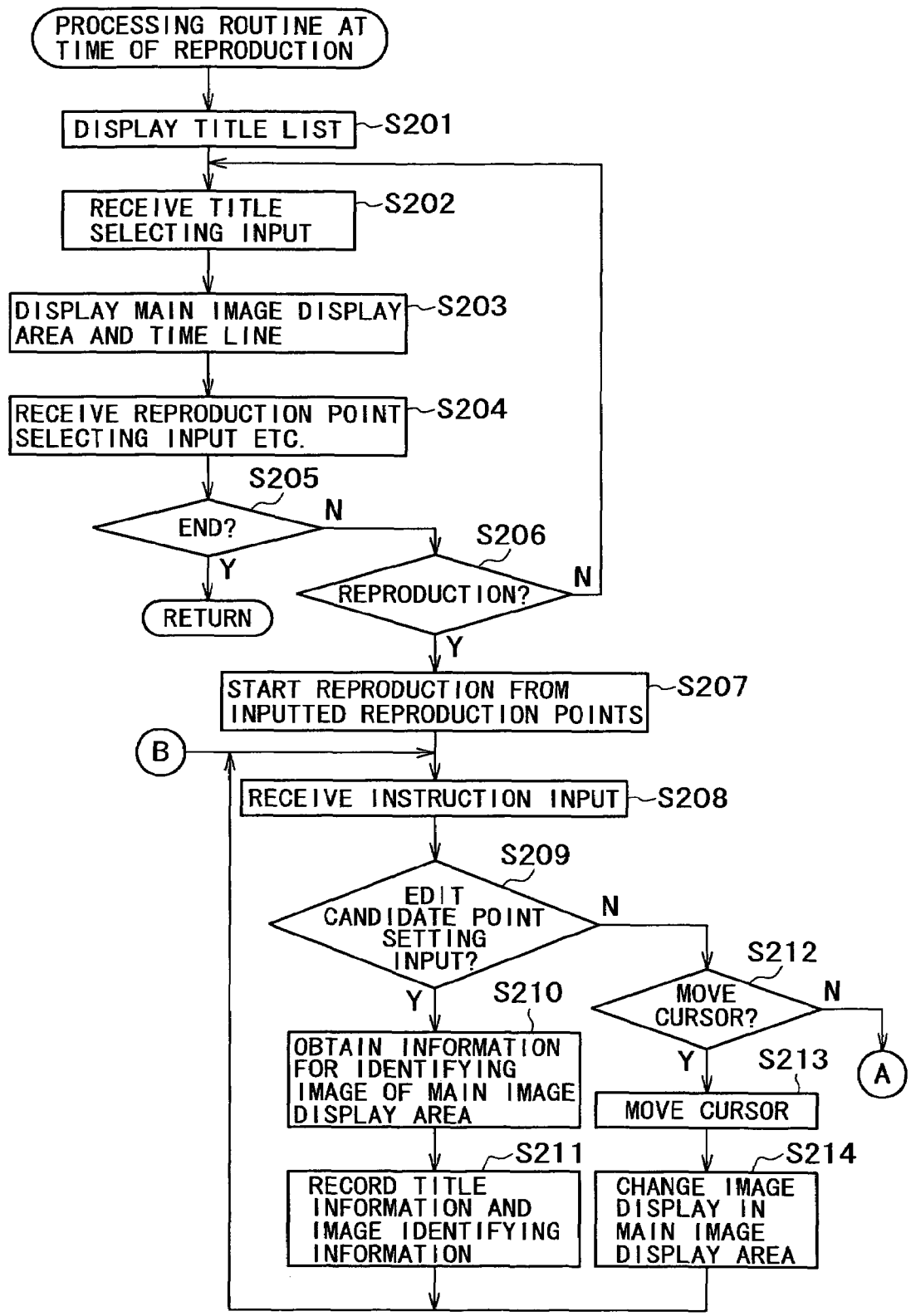
FIG. 19 is a flowchart of assistance in explaining the operation of the recording and reproducing apparatus according to the second embodiment shown in FIG. 13.

The operation of the recording and reproducing apparatus 600 in the second example of the second embodiment will next be described with reference to the flowcharts of FIG. 19 and FIG. 20. As shown in FIG. 19, when the recording and reproducing apparatus 600 according to the second embodiment is turned on and an instruction is input to display a list of titles such as television programs or the like recorded on the recording medium 18, the CPU 40 refers to, for example, a directory of the recording medium 18 via a buffer control circuit 17, forms an image signal for displaying the list of titles recorded on the recording medium 18, and then supplies the image signal to the combining circuit 26 via the multiplexing/separating circuit 16, whereby the title list is displayed in combination with a displayed image 201G on the monitor receiver 200 (step S201).

Then, the CPU 40 of the recording and reproducing apparatus 600 receives a title selecting input from the user via the remote control 150 or an operating panel provided on the front panel of the recording and reproducing apparatus 600 (step S202). The CPU 40 forms the main image display area 201M and the time line 201T, and displays the main image display area 201M and the time line 201T, as shown in FIG. 14 (step S203).

Next, the CPU 40 of the recording and reproducing apparatus 600 receives a reproducing point selecting input and an operating instruction input from the user via the remote control 150 or the like (step S204). Then, the CPU 40 determines whether the input from the user is an instruction to end reproduction (step S205).

When the CPU 40 determines in the determination process at step S205 that the input received from the user at step S204 is an instruction to end reproduction, the CPU 40 ends the processing represented in FIG. 19, and goes into a state of waiting for an input from the user, for example. When the CPU 40 determines in the determination process at step S205 that the input received from the user at step S204 is not an instruction to end reproduction, the CPU 40 determines whether the input from the user is an input for starting reproduction (step S206).

When the CPU 40 determines in the determination process at step S206 that the input from the user is not an input for starting reproduction, the CPU 40 in this example repeats the processing from step S202 to receive a title selecting input, a reproducing point selecting input, and an operating instruction input.

When the CPU 40 determines in the determination process at step S206 that the input received from the user at step S204 is an input for starting reproduction, the CPU 40 provides sub-image display areas according to the number of reproducing points selected and input by the user, and starts reproducing moving images from each of the reproducing points, as described above (step S207).

The CPU 40 then receives an instruction input from the user, such as an edit candidate point setting input, a cursor moving instruction input, an edit candidate point selecting input or the like (step S208). The CPU 40 determines whether the received instruction is an edit candidate point setting input(step S209).

When the CPU 40 determines in the determination process at step S209 that the instruction received from the user was an edit candidate point setting input, the CPU 40 obtains a time code, a frame number or the like as information for identifying the image displayed in the main image display area (step S210). The CPU 40 then records on the recording medium 18 the information obtained at step S210 for identifying the image and information for identifying the title being reproduced (title information) in association with each other (step S211). The processing from step S208 is then repeated.

When the CPU 40 determines in the determination process at step S209 that the instruction received from the user was not an edit candidate point setting input, the CPU 40 determines whether the instruction received from the user was an instruction for moving the cursor CS to a sub-image display area (step S212).

When the CPU 40 determines in the determination process at step S212 that the input received from the user at step S208 was an instruction for moving the cursor CS to a sub-image display area, the CPU 40 moves the cursor CS to the sub-image display area in response to the instruction from the user (step S213).

The CPU 40 then changes the image displayed in the main image display area 201M to the same image as in the sub-image display area at which the cursor CS is positioned (step S214). The processing from step S208 is thereafter repeated.

Figure 20:
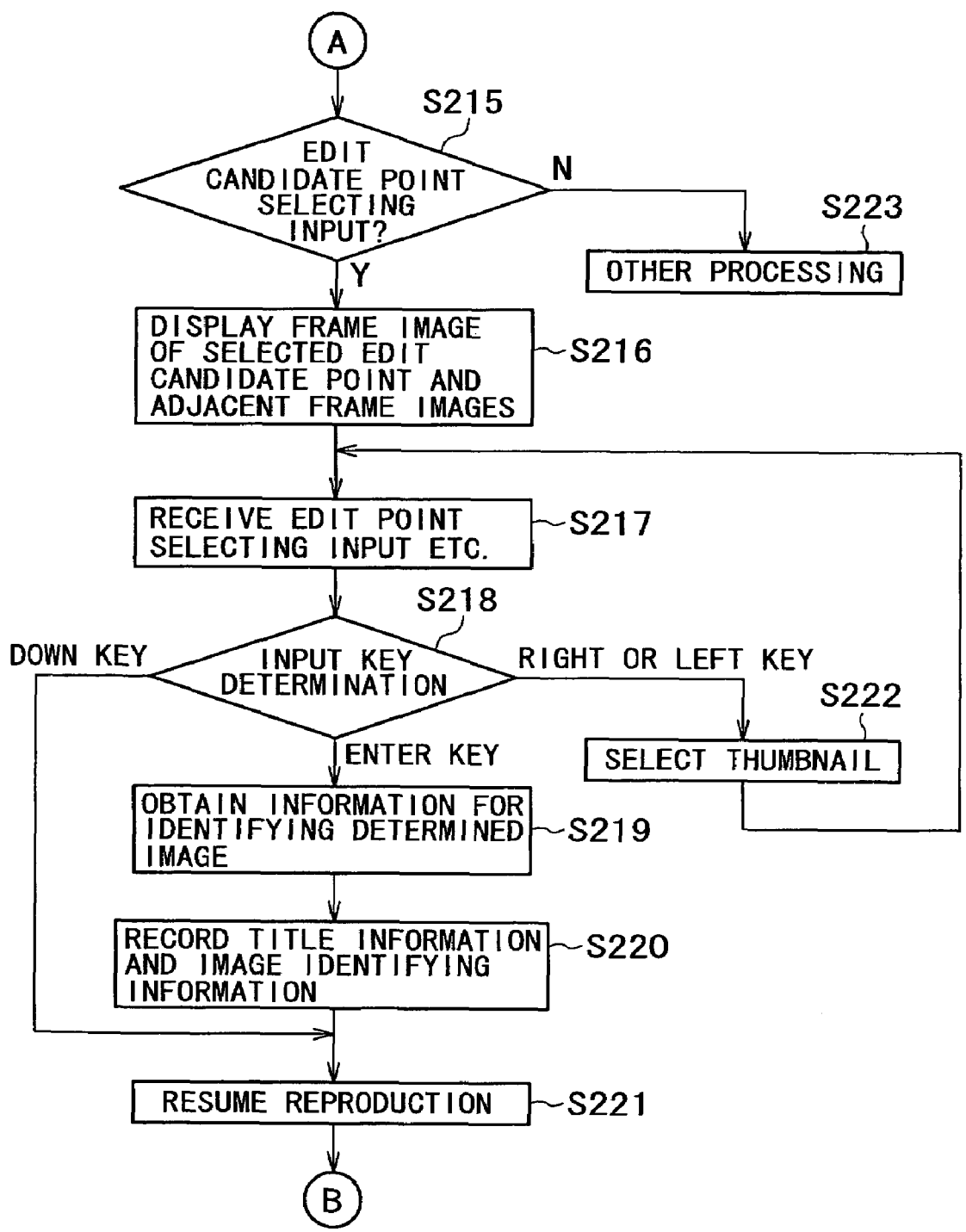
FIG. 20 is a flowchart continued from FIG. 19.

When the CPU 40 determines in the determination process at step S212 that the input received from the user at step S208 was not an instruction for moving the cursor CS to a sub-image display area, the CPU 40 proceeds to the processing represented in FIG. 20. The CPU 40 determines whether the input received from the user at step S208 was an input for selecting an edit candidate point registered in response to an instruction from the user (step S215).

When the CPU 40 determines in the determination process at step S215 that the input received from the user at step S208 was an input for selecting an edit candidate point, the CPU 40 stops the reproduction of the moving images, reads information from the recording medium 18 for identifying the frame image of the selected edit candidate point, reads image data for forming the frame image of the edit candidate point and image data for a plurality of frame images adjacent to the frame image of the edit candidate point from the recording medium 18, and displays the frame images as still images (step S216).

The processing at step S216 is performed via the multiplexing/separating circuit 16, the MPEG video decoder 23, the display image forming circuit 50, the combining circuit 26, and the NTSC encoder 27. The display image forming circuit 50 can form image data for displaying moving images in a plurality of sub-image display areas and also form image data for displaying still images (thumbnails), as shown in FIG. 4 and FIGS. 5A to 5C for the first embodiment.

As with the recording and reproducing apparatus 100 according to the first embodiment, the recording and reproducing apparatus 600 according to the second embodiment can display the still images in a scrollable manner, as shown in FIG. 4, for example. The CPU 40 then receives an input for selecting the frame image to be used as a final edit point from the plurality of still images displayed with reference to the selected edit candidate point (step S217).

In the selecting input at the step S217, as in the case of the recording and reproducing apparatus according to the first embodiment, a still image selecting cursor positioned at one of the plurality of still images displayed with reference to the selected edit candidate point is moved in response to an instruction from the user, whereby an image of the final edit point can be selected.

The CPU 40 determines the input key received at step S217 (step S218). When the CPU 40 determines in the determination process at step S218 that the received input key was a down key (down arrow key), the CPU 40 determines that edit point selection has not been made, and resumes the display of moving images in the main image display area and the sub-image display areas, which display was stopped at step S216 (step S221). The CPU 40 then repeats the processing from step S208 shown in FIG. 19.

When the CPU 40 determines in the determination process at step S218 that the input key received at step S217 was an enter key, the CPU 40 sets the frame image selected this time as an edit point in place of the edit candidate point selected at step S215, and obtains information for identifying the frame image (step S219).

The CPU 40 then records the title information and the information for identifying the frame image obtained at step S219 as edit point information onto the recording medium 18 (step S220). Then, the CPU 40 resumes the display of moving images in the main image display area and the sub-image display areas, which display was stopped at step S216 (step S221). The CPU 40 then repeats the processing from step S208 shown in FIG. 19.

When the CPU 40 determines in the determination process at step S218 that the input key received at step S217 was a left or right key (a left arrow key or a right arrow key), the CPU 40 determines that an instruction to change the selected still image, that is, an instruction to move the cursor positioned at the still image, was given. The CPU 40 selects a displayed still image (thumbnail) by moving the cursor (step S222). The CPU 40 thereafter repeats step S217.

When the CPU 40 determines in the determination process at step S215 that the input received from the user at step S208 was not an input for selecting an edit candidate point, the CPU 40 performs processing corresponding to the instruction received from the user (step S223). At step S223, of various processes such as pause, fast forward, fast reverse, stop reproduction and the like, the process corresponding to the request from the user is performed.

Thus, the recording and reproducing apparatus 600 in the second example of the second embodiment makes it possible to quickly find (detect) an image of a target scene by specifying a plurality of different reproducing points for one title and starting reproduction of moving images simultaneously from the plurality of different reproducing points.

When the user detects an image of the target scene, the image is specified as an image of an edit candidate point, and the image of the edit candidate point and images adjacent to the image of the edit candidate point are displayed as still images to enable selection of an accurate edit point. Then, information for identifying an image of the selected edit point is obtained and thereafter recorded on the recording medium 18 as edit candidate point information. Using the selected edit point, various editing of a section between edit points, such as deletion, movement, extraction and the like, can be performed.

[First Modification of Second Example]

The recording and reproducing apparatus in the second example simultaneously reproduces a plurality of moving images from a plurality of different reproducing points, as shown in FIGS. 15 to 18. It is therefore conceivable that a proceeding reproducing point may catch up with an edit candidate point set at a position temporally ahead of the proceeding reproducing point. In this case, reproduction after a succeeding reproduction start point is performed for a second time.

Directing attention to this point, a recording and reproducing apparatus as a modification of the second example simultaneously reproduces portions yet to be reproduced and selects an edit point with reference to an edit candidate point that a proceeding reproducing point has caught up with.

Figure 21:
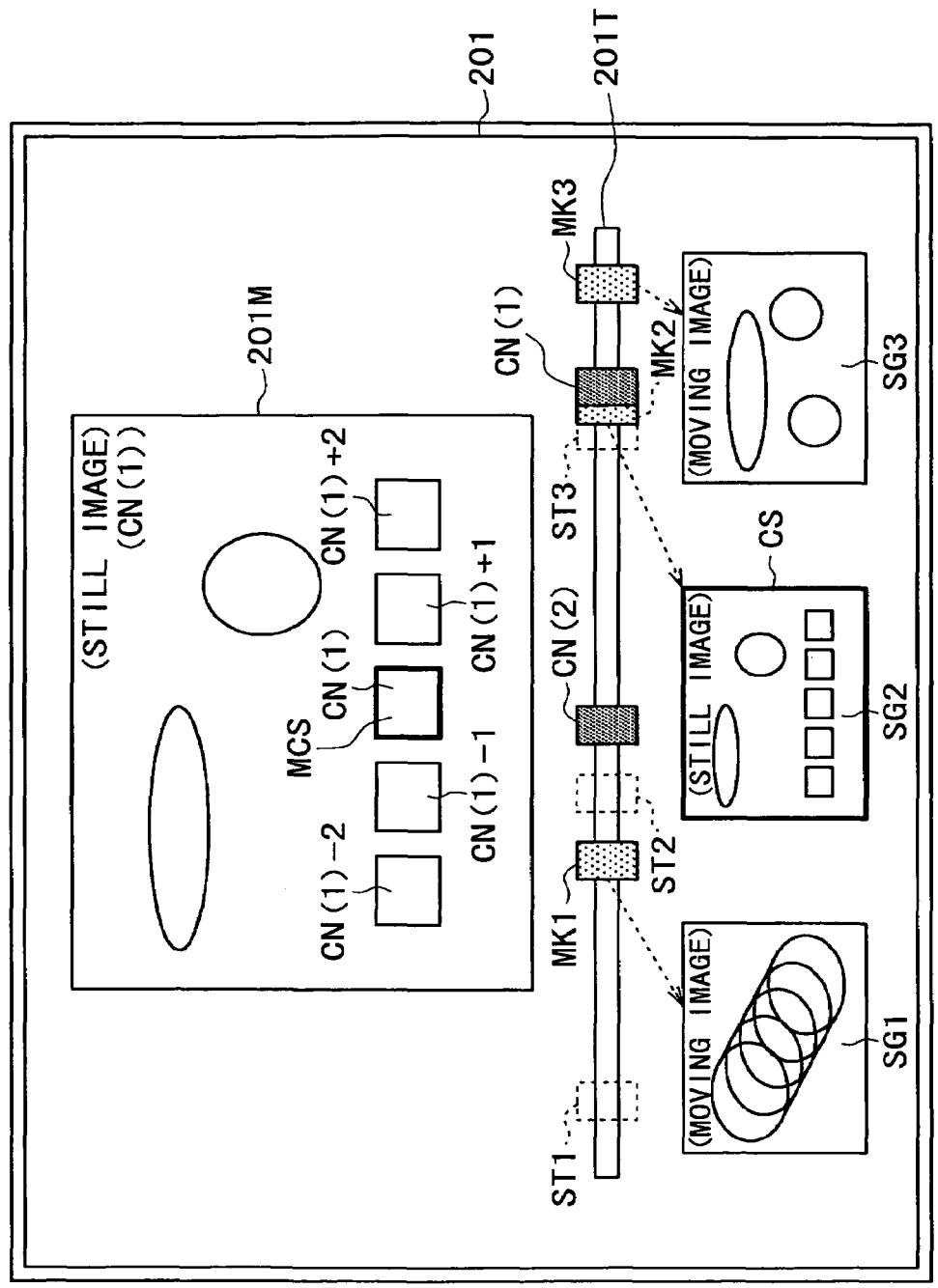
FIG. 21 is a diagram of assistance in explaining the processing when a succeeding reproducing point catches up with an edit candidate point set ahead of the succeeding reproducing point in the recording and reproducing apparatus in a second example of the second embodiment.

FIG. 21 is a diagram of assistance in explaining processing when a proceeding reproducing point catches up with an edit candidate point set ahead of the proceeding reproducing point in the recording and reproducing apparatus in the second example of the second embodiment. As in the example described with reference to FIG. 17 and FIG. 18, suppose that three reproducing points MK1, MK2, and MK3 with reproduction start points ST1, ST2, and ST3 are specified and then reproduction is started.

Then, the cursor CS is positioned at the sub-image display area SG3, and an edit candidate point CN(1) is set after ST3. Further, the cursor CS is positioned at the sub-image display area SG2, and an edit candidate point CN(2) is set after ST2. Suppose that reproduction processing is continued with the cursor CS positioned at the sub-image display area SG2, and that the reproducing point MK2 has caught up with the edit candidate point CN(1) set ahead, as shown in FIG. 21.

The CPU 40 of the recording and reproducing apparatus 600 can determine whether the proceeding reproducing point has thus caught up with the edit candidate point set ahead, for example, by monitoring time codes or frame numbers of frame images of the edit candidate point and the reproducing point and determining that the time codes or frame numbers of the frame images of the edit candidate point and the reproducing point coincide with each other.

In the example shown in FIG. 21, when detecting that the proceeding reproducing point MK2 has caught up with the edit candidate point CN(1) set ahead, the CPU 40 displays an image of the edit candidate point CN(1) and images adjacent to the edit candidate point CN(1) as a still image in the sub-image display area SG2. Incidentally, moving image reproduction is continued in the sub-image display areas SG1 and SG3 other than the sub-image display area SG2 displaying the image corresponding to the reproducing point MK2.

When the cursor CS is positioned at the sub-image display area displaying the moving image corresponding to the reproducing point that has caught up with the edit candidate point, the still image displayed in the sub-image display area is also displayed in the main image display area 201M. In the example shown in FIG. 21, the still image displayed in the sub-image display area SG2 is also displayed in the main image display area 201M.

In the example shown in FIG. 21, the edit candidate point is CN(1). Image data for forming four frame images of two frames preceding the edit candidate point CN(1) and two frames succeeding the edit candidate point CN(1) is read. As shown in the main image display area 201M in FIG. 21, the image CN(1) of the edit candidate point and the images CN(1)−2, CN(2)−1, CN(1)+1, and CN(1)+2 adjacent to the image CN(1) are displayed as thumbnails.

As shown in FIG. 21, in a first stage, a cursor MCS is positioned at a display area for the image CN(1) of the edit candidate point displayed in the main image display area 201M, and the image at which the cursor MCS is positioned is also displayed in a large size in the entire surface of the main image display area 201M.

As in the case of the foregoing first embodiment, the cursor MCS can be moved by operating the left arrow key or the right arrow key on the remote control 150, for example, and a frame image at which the cursor MCS is positioned can be selected and registered as an edit point.

Hence, as shown in FIG. 21, when the down arrow key is pressed or no operation is performed for more than a predetermined time after the still images are displayed without pressing the enter key for selecting an edit point, the left arrow key, or the right arrow key, moving image reproduction is resumed in the sub-image display area SG2 and the main image display area 201M displaying the still images.

Figure 22:
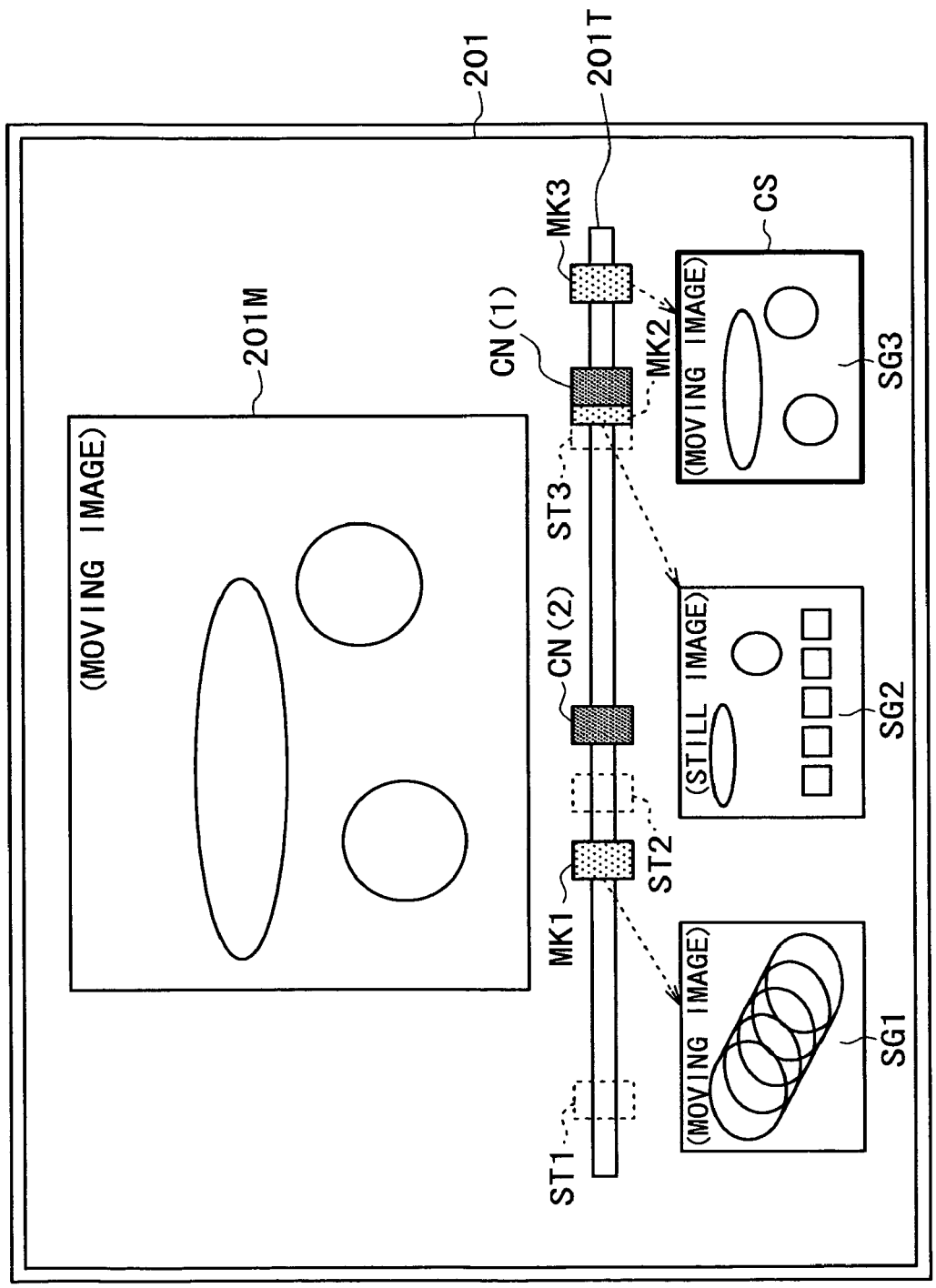
FIG. 22 is a diagram of assistance in explaining a case in which a cursor CS is not positioned at a sub-image display area SG2.

FIG. 22 is a diagram of assistance in explaining a case where the cursor CS is not positioned at the sub-image display area SG2 displaying the moving image corresponding to the reproducing point MK2 that has caught up with the edit candidate point CN(1). In this case, the image at the position corresponding to the edit candidate point CN(1), the image of the edit candidate point CN(1), and the adjacent images are displayed as thumbnails only in the sub-image display area SG2.

However, since, as described above, an edit point can be determined by selecting a still image only through the main image display area 201M, edit point selection cannot be made unless the cursor CS is positioned at the sub-image display area SG2, and after passage of a predetermined time, moving image reproduction is resumed in the sub-image display area SG2, for example.

Incidentally, in this example, since edit point selection and registration can be performed only through the main image display area 201M, it is not necessary to display images of an edit candidate point and the vicinity thereof as so-called thumbnails in a sub-image display area as in the display example of FIG. 22.

Figure 23:
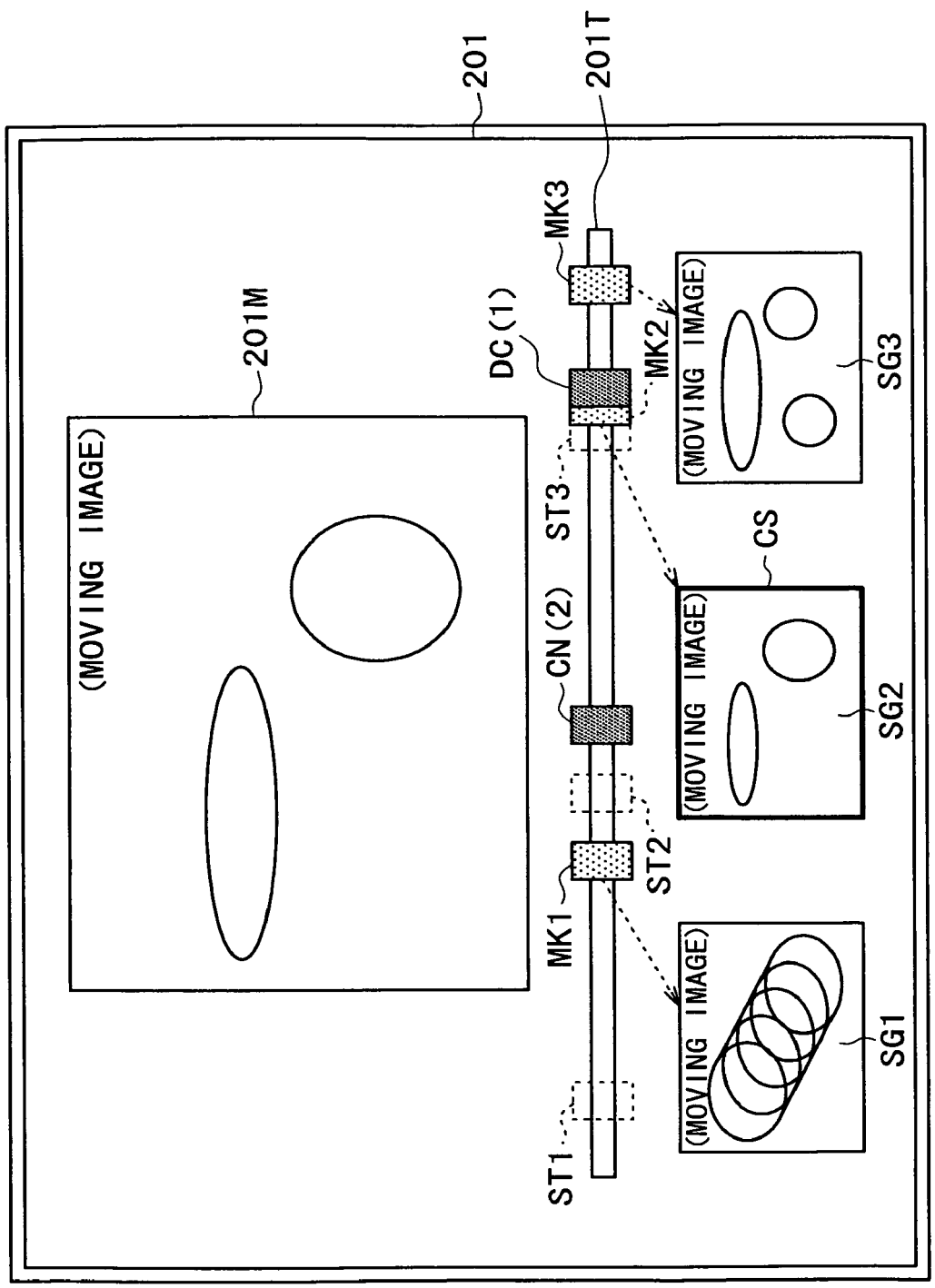
FIG. 23 is a diagram of assistance in explaining the operation of the recording and reproducing apparatus after an edit point is set with reference to the reproducing point that has caught up with the edit candidate point.

FIG. 23 is a diagram of assistance in explaining the operation of the recording and reproducing apparatus after an edit point is registered with reference to the reproducing point that has caught up with the edit candidate point. In the state shown in FIG. 21, an edit point is selected and registered by positioning the cursor MCS to a target still image of the five still images displayed as thumbnails in the main image display area 201M by operating the left arrow key or the right arrow key on the remote control 150, and pressing the enter key.

In this case, an edit point DC(1) is set on the recording medium 18 in place of the immediate edit candidate point CN(1). Then, as shown in FIG. 23, the determined edit point DC(1) is shown on the time line 201T, and thereafter moving image reproduction from the reproducing point MK2 is resumed.

While the edit point is registered to replace the edit candidate point in this case, both the edit candidate point and the edit point can be displayed in a distinguishable manner, by, for example, displaying marks indicating the edit candidate point CN(1) and the edit point DC(1) in different colors.

Also, the CPU 40 monitors the time interval between the reproducing point and the edit candidate point, and displays the message "◯◯ seconds to go to edit candidate point," for example, before the reproducing point catches up with the edit candidate point. The user can thereby set the cursor CS to a corresponding sub-image display area in advance.

Incidentally, marks indicating the positions of reproducing points, edit candidate points, and edit points displayed on the time line 201T may be changed in color by making the marks indicating reproducing points green, the marks indicating edit candidate points blue, and the marks indicating edit points red, for example, changed in shape by making the marks indicating reproducing points triangular marks, the marks indicating edit candidate points square marks, and the marks indicating edit points circular marks, for example, or shifted from each other in display position, whereby the positions of the marks can be clearly indicated to the user.

[Second Modification of Second Example]

In the foregoing recording and reproducing apparatus 600 in the second example, when a plurality of reproducing points are specified, speeds of reproduction of moving images from the reproducing points are all equal to each other. However, the reproduction speed may be changed for each reproducing point.

Figure 24:
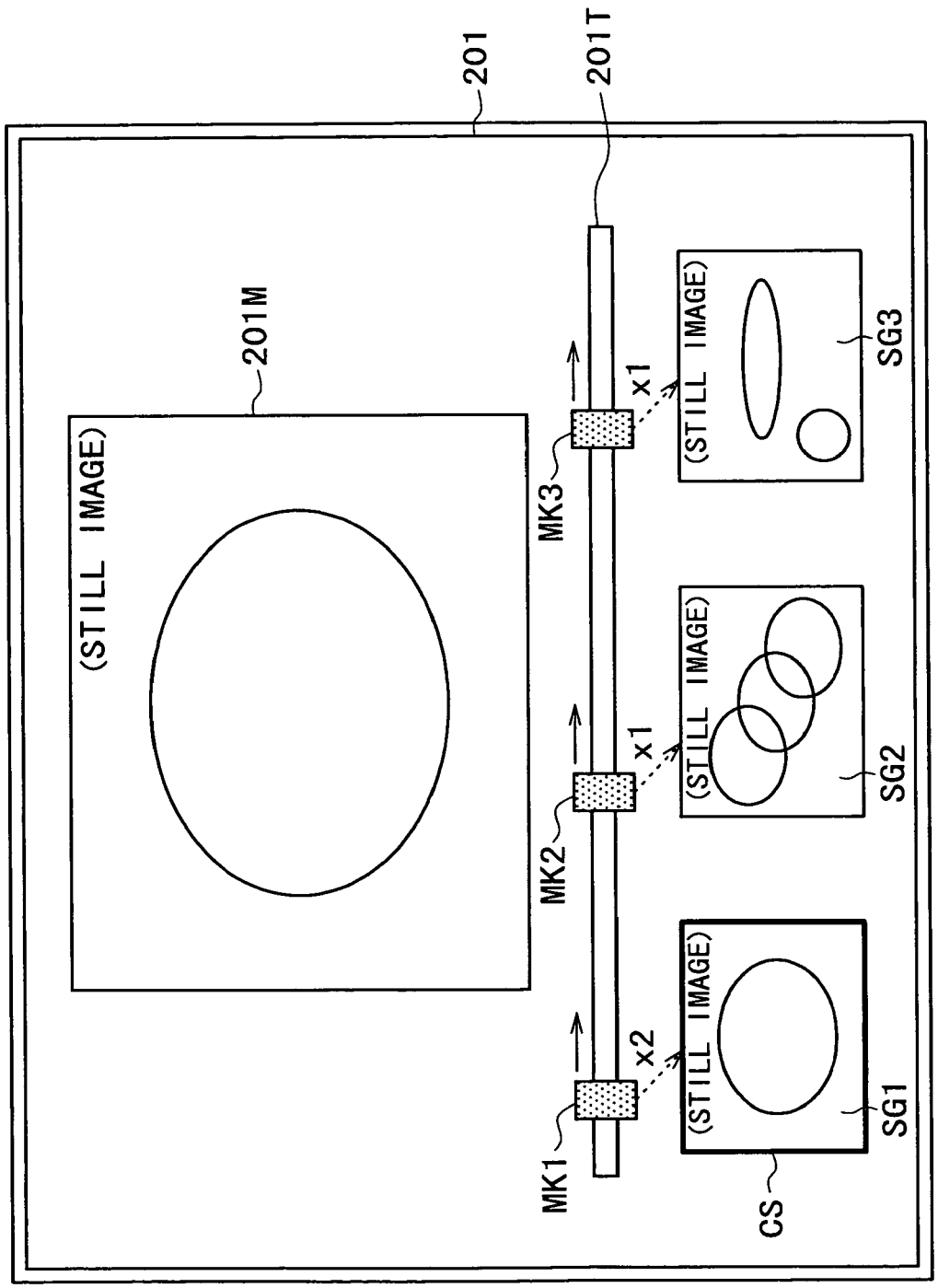
FIG. 24 is a diagram of assistance in explaining an example where the reproduction speed is changed according to the position of the reproducing point.
Figure 25:
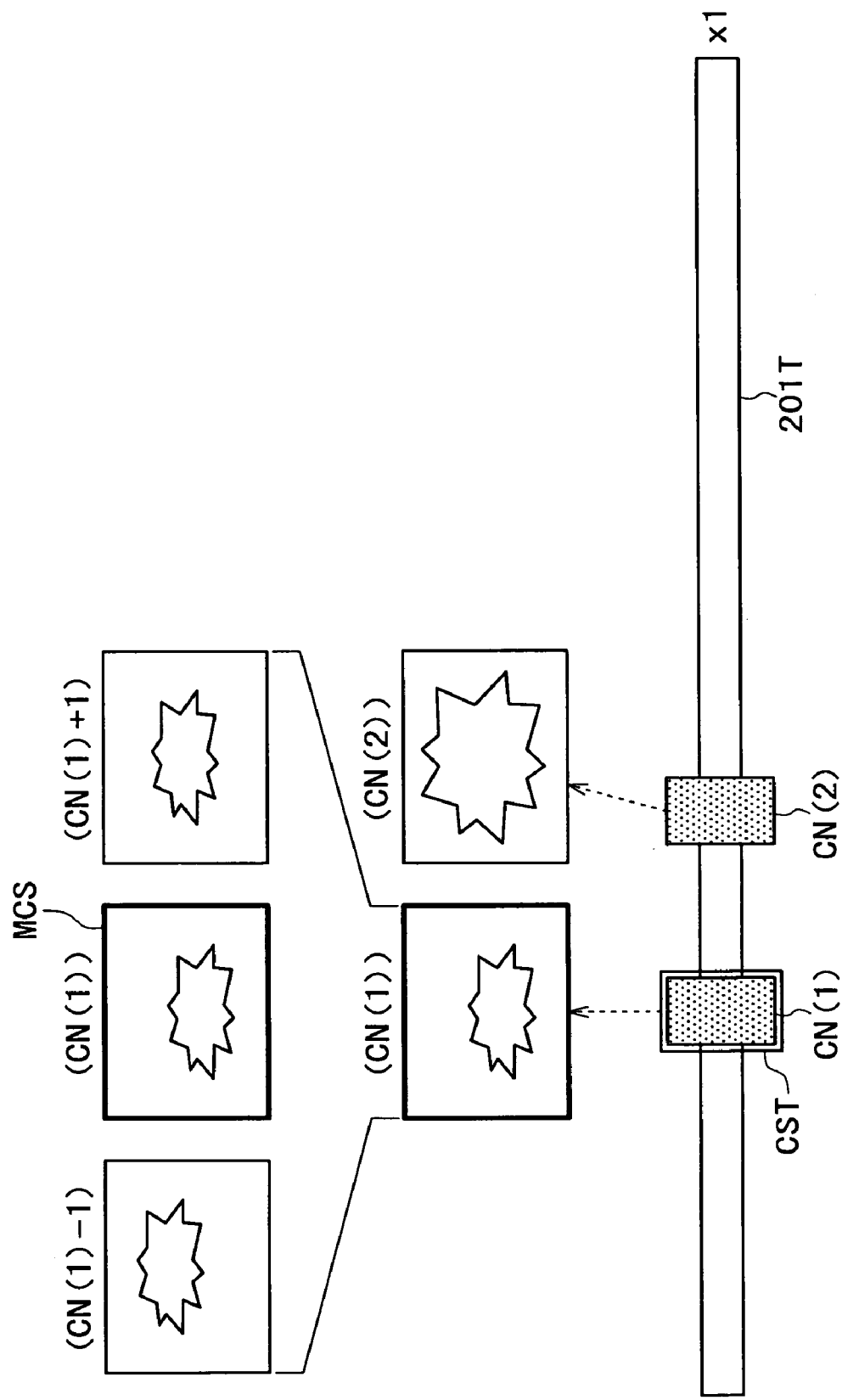
FIG. 25 is a diagram of assistance in explaining an example where the reproduction speed is changed according to the position of the reproducing point.
Figure 26:
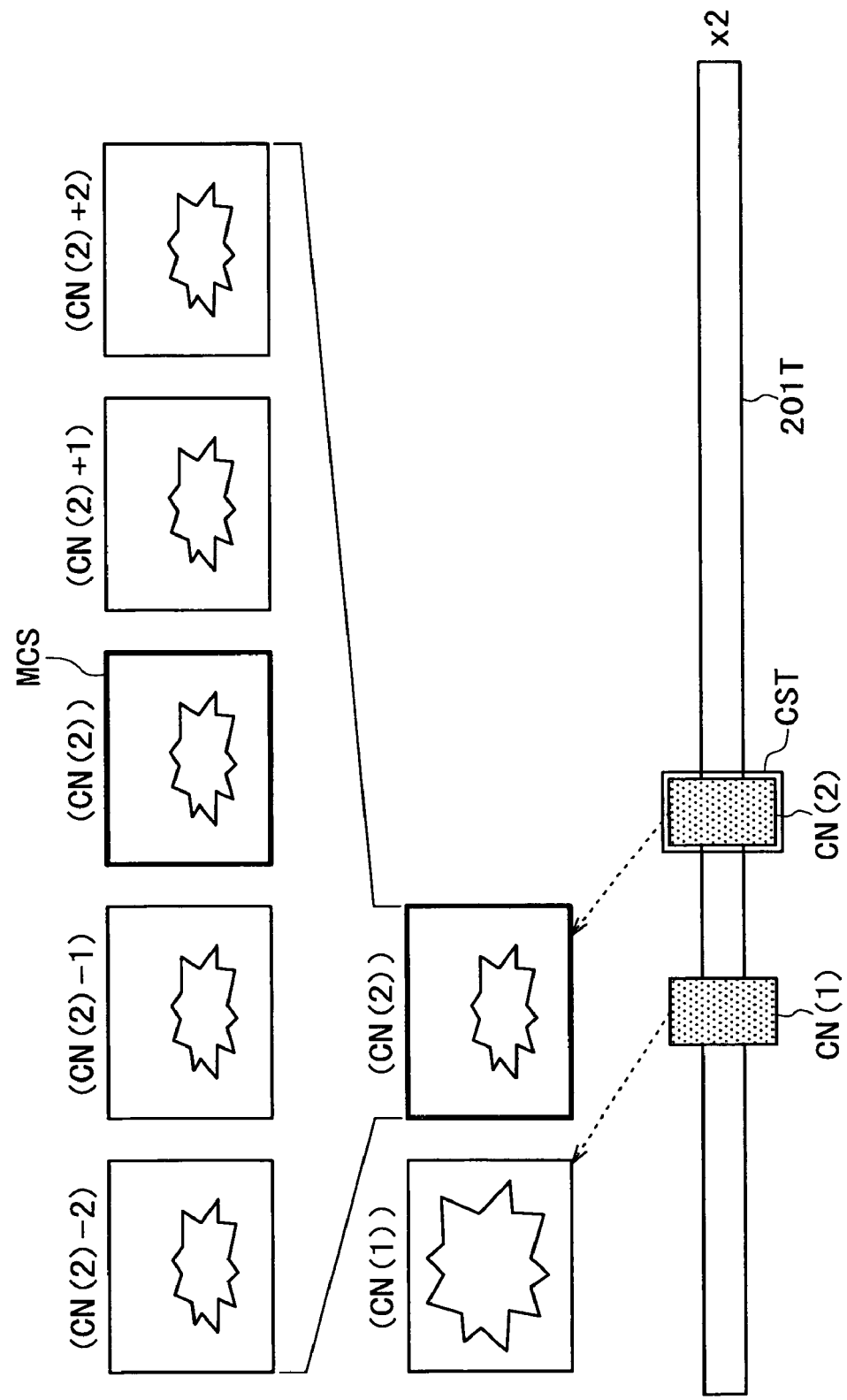
FIG. 26 is a diagram of assistance in explaining an example where the reproduction speed is changed according to the position of the reproducing point.

FIGS. 24 to 26 are diagrams of assistance in explaining an example where a plurality of reproducing points are set and in simultaneous reproduction from each of the plurality of reproducing points, the reproduction speed is changed according to the position of the reproducing point.

FIG. 24 shows a case where three reproducing points MK1, MK2, and MK3 are selected, and in simultaneous reproduction of moving images from the three reproducing points, the moving image reproduced from the reproducing point MK1 is performed at a double speed (described as "×2" in the figure) and the moving image reproduced from the reproducing points MK2 and MK3 is performed at a single speed (described as "×1" in the figure).

In the example of FIG. 24, single-speed reproduction is performed in a middle stage part and a late stage part of the title, whereas double-speed reproduction is performed in an early stage of the title. Therefore, in the middle stage part and the late stage part of the title, an image of a target scene can be found at the normal reproduction speed, whereas in the early stage of the title, the double-speed reproduction is performed and hence an image of a target scene can be detected more quickly.

When the reproduction speed is thus changed according to the plurality of selected reproducing points, high-speed reproduction is performed in a part where a target scene is less likely to occur, and single-speed or low-speed reproduction is performed in a part where a target scene is more likely to occur, for example. Thus, the reproduction speed can be set for each selected reproducing point according to the purpose of the user.

The reproduction speed for each reproducing point can be set via the remote control 150. The CPU 40 can change the moving image reproduction speed for each reproducing point by changing the speed of reading data from the recording medium 18 or adjusting the processing speed of the MPEG video decoder 23 and the display image forming circuit 50 for each selected reproducing point.

Also in the second modification, as in the second example of the second embodiment, when a plurality of edit candidate points are set, one edit candidate point is selected from the plurality of edit candidate points. An image (still image) at a position corresponding to the edit candidate point and images (still images) adjacent to the position corresponding to the edit candidate point are displayed in a scrollable mode to allow setting of a final edit point to be used at the time of editing.

In this case, for edit candidate points in sections of different reproduction speeds, the number of still images displayed is made to differ. FIG. 25 and FIG. 26 are diagrams of assistance in explaining processing when receiving a selection of an edit point with reference to edit candidate points in sections with different reproduction speeds.

One edit candidate point can be selected from a plurality of edit candidate points by moving a cursor CST to a unit of an edit candidate point on the time line 201T by operating the left arrow key or the right arrow key on the remote control 150, and pressing the enter key 154, as shown in FIG. 25, for example.

When the selected edit candidate point is present in a section where single-speed reproduction is performed, as shown in FIG. 25, an image of the selected edit candidate point (edit candidate point CN(1) in the case of FIG. 25) and images of one frame preceding the image of the selected edit candidate point and one frame succeeding the image of the selected edit candidate point are displayed as thumbnails in the main image display area 201M to select an edit point.

Similarly, when the selected edit candidate point is present in a section where double-speed reproduction is performed, as shown in FIG. 26, an image of the selected edit candidate point (edit candidate point CN(2) in the case of FIG. 26) and images of two frames preceding the image of the selected edit candidate point and two frames succeeding the image of the selected edit candidate point are displayed as thumbnails in the main image display area 201M to select an edit point. Thus, more thumbnails for edit point selection are displayed in a section of higher reproduction speed than in a section of lower reproduction speed.

The number of so-called thumbnail images for edit point selection is thus changed according to the reproduction speed because when the user marks an edit candidate point on a screen of high reproduction speed, the edit candidate point is very likely to be distant from the desired edit point. That is, the higher the reproduction speed, the higher the probability that the distance between the actually marked edit candidate point and the desired edit point is increased. Therefore, the number of displayed still images adjacent to an edit candidate point is increased in proportion to the reproduction speed. It is thus possible to select an edit point more quickly.

When, at the time of recording information for identifying an image of an edit candidate point on the recording medium 18 in response to an instruction from the user, information is recorded indicating the reproduction speed of a section to which the edit candidate point belongs the information indicating the reproduction speed can be used, to set the number of still images for edit point selection according to the reproduction speed by control of the CPU 40.

Incidentally, in FIG. 25 and FIG. 26, CN(n)+1 denotes an image one frame after an edit candidate point CN(n), and CN(n)−1 denotes an image one frame before the edit candidate point CN(n). Similarly, in FIG. 26, CN(n)+2 denotes an image two frames after the edit candidate point CN(n), and CN(n)−2 denotes an image two frames before the edit candidate point CN(n).

[Third Modification of Second Example]

When the reproduction speed can be set for each reproducing point as described above, a reproducing point ahead may be overtaken by a preceding reproducing point. In this case, the correspondence between the reproducing points and sub-image display areas are changed on the screen, so that it may be difficult to see information displayed on the screen.

FIGS. 27A to 29C are diagrams of assistance in explaining a case of a reproducing point ahead being overtaken by a preceding reproducing point and the like. As shown in FIG. 27A, suppose that three reproducing points MK1, MK2, and MK3 are selected, that double-speed reproduction is performed for the reproducing point MK1, and that single-speed reproduction is performed for the reproducing points MK2 and MK3.

When some time passes after reproduction is started in the state shown in FIG. 27A, the reproducing point MK2 is overtaken by the reproducing point MK1, as shown in FIG. 27B. In this case, the CPU 40 of the recording and reproducing apparatus 600 changes the moving images displayed in the sub-image display areas SG1, SG2, and SG3 according to the positions of the reproducing points MK1, MK2, and MK3 on the time line 201T.

In the example shown in FIGS. 27A and 27B, at a point in time when the reproducing point MK1 has overtaken the reproducing point MK2, the CPU 40 changes (switches) display areas so as to display the image of the reproducing point MK2 in the sub-image display area SG1, and the image of the reproducing point MK1 in the sub-image display area SG2, as shown in FIG. 27B.

Thereby, the sequence in which the reproducing points MK1, MK2, and MK3 are arranged on the time line 201T coincides with the sequence in which the sub-image display areas SG1, SG2, and SG3 are arranged, thus eliminating confusing relations between the reproducing points and the sub-image display areas, and therefore preventing difficulty in seeing displayed information, a mistake in handling and the like.

Incidentally, the case of a preceding reproducing point overtaking a reproducing point ahead is not limited to cases of different reproduction speeds. For example, as shown in FIG. 28A, suppose that when single-speed reproduction is performed for each of the selected reproducing points MK1, MK2, and MK3 (described as "×1" in the figure), the reproducing point MK2 catches up with an edit candidate point registered during the reproduction from the reproducing point MK3 and the reproducing point MK2 stops to determine an edit point, as described above.

In such a state, the reproducing points MK1 and MK3 do not stop, and therefore the reproducing point MK1 overtakes the reproducing point MK2 while the reproducing point MK2 is stopped. Also in such a case, at the point in time when the reproducing point MK1 has overtaken the reproducing point MK2, the CPU 40 changes display areas so as to display the image of the reproducing point MK2 in the sub-image display area SG1, and the image of the reproducing point MK1 in the sub-image display area SG2, as shown in FIG. 28A.

Thereby, the sequence in which the reproducing points MK1, MK2, and MK3 are arranged on the time line 201T coincides with the sequence in which the sub-image display areas SG1, SG2, and SG3 are arranged, thus eliminating confusing relations between the reproducing points and the sub-image display areas, and therefore preventing difficulty in seeing displayed information, a mistake in handling and the like.

As shown in FIG. 28B, after the reproducing point MK1 catches up with the reproducing point MK2, the reproducing points MK1 and MK2 reproduce the same moving image, and therefore the reproducing points MK1 and MK2 are integrated into one reproducing point, and the sub-image display areas are also integrated into two sub-image display areas, that is, a sub-image display area SGF and a sub-image display area SGE.

The image of the reproducing point resulting from the integration of the reproducing points MK1 and MK2 is displayed in the sub-image display area SGF, and the image of the reproducing point MK3 is displayed in the sub-image display area SGE. It is thereby possible to prevent display of the same moving image in a plurality of sub-image display areas and thus prevent difficulty in detecting an image of a target scene and the like.

[Fourth Modification of Second Example]

As in the processing when a reproducing point ahead is overtaken by a preceding reproducing point as described above in the third modification of the second example, processing when a reproducing point ahead completes reproduction to an end of the title is also a problem. In this case, three methods are considered.

Figure 29A:
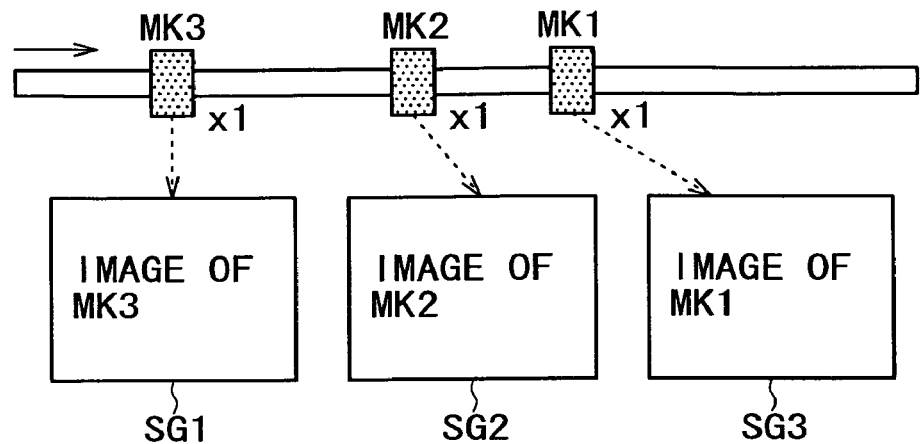
Figure 29B:
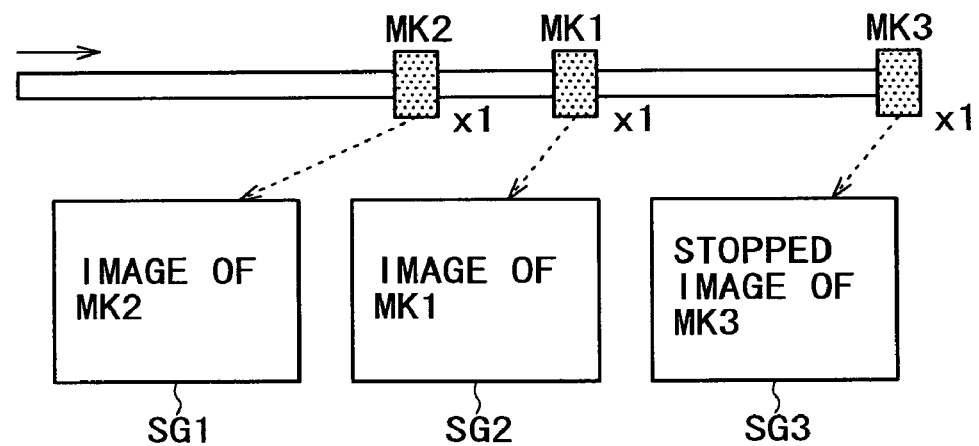
Figure 29C:
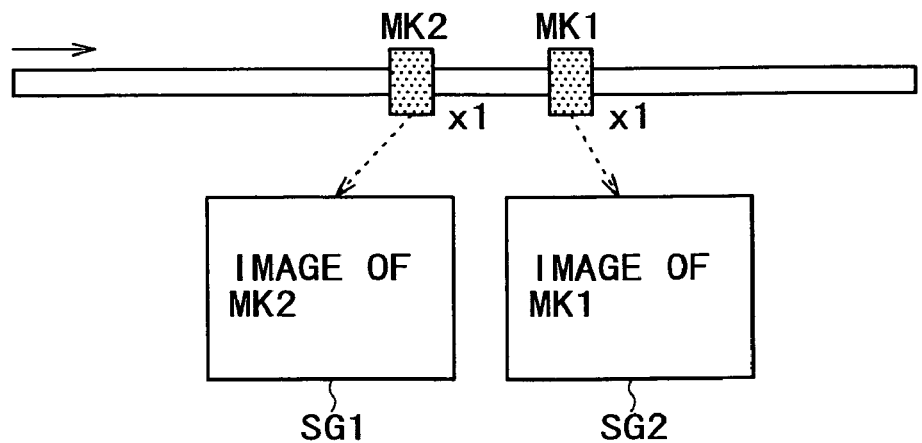

FIGS. 29A to 29C are diagrams of assistance in explaining the processing when a reproducing point ahead completes reproduction to an end of the title. First, FIG. 29A shows a case where, when a reproducing point MK3 reproducing from a late stage part of the title completes reproduction to an end of the title, the reproducing point MK3 becomes a reproducing point from the beginning of the title to continue reproduction, and the images displayed in the sub-image display areas SG1, SG2, and SG3 are correspondingly interchanged with each other.

Further, FIG. 29B shows a case where, when a reproducing point MK3 reproducing from a late stage part of the title completes reproduction to an end of the title, the movement of the reproducing point MK3 is stopped at the end of the title, and that state is maintained. Hence, in the case of FIG. 29B, when both reproducing points MK1 and MK2 complete reproduction to the end of the title, the same image is displayed in the sub-image display areas SG1, SG2, and SG3.

Further, FIG. 29C shows a case where, when a reproducing point MK3 reproducing from a late stage part of the title completes reproduction to an end of the title, the reproducing point MK3 and the sub-image display area SG3 displaying a reproduced image at a position corresponding to the reproducing point MK3 are erased, and only reproducing points MK1 and MK2 yet to complete reproduction to the end and the sub-image display areas SG1 and SG2 displaying images corresponding to the reproducing points MK1 and MK2 are left.

By using any one of the methods of FIGS. 29A to 29C, it is possible to prevent difficulty in seeing or understanding information displayed on the screen or the like, and thus relatively easily find an image of a target scene.

THIRD EXAMPLE

Instead of the user setting the number and position of reproducing points as in the foregoing second example, a recording and reproducing apparatus in the third example effects automatic control to change the number and position of reproducing points according to image reproduction speed, thereby making it possible to quickly and accurately detect a target image of a target scene from a series of titles. Incidentally, the recording and reproducing apparatus in the third example is the same as the recording and reproducing apparatus 600 shown in FIG. 13.

Figure 30:
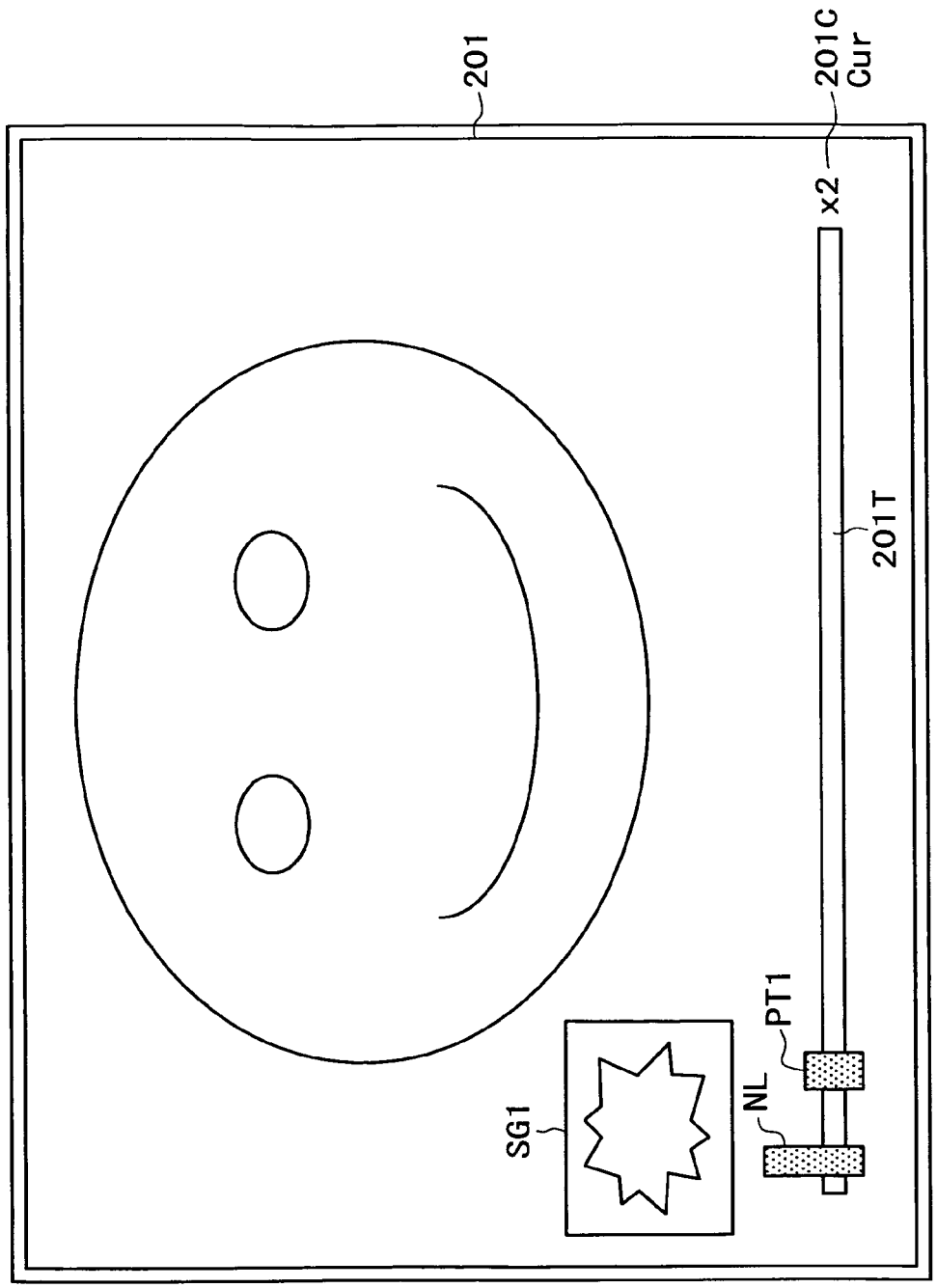
FIG. 30 is a diagram of assistance in explaining the automatic setting of reproducing points when the user sets the reproduction speed.

The recording and reproducing apparatus 600 in the third example allows free setting of speed of title reproduction at the time of title reproduction. The reproduction speed can be set via the remote control 150. At the time of reproduction, a reproduced image is displayed on the entire surface of the display screen 201, as shown in FIG. 30. At the same time, a sub-image display area SG1 is provided in a lower portion of the display screen 201 to display a read image ahead.

In this case, a reproducing point in the title of the image displayed on the entire surface of the display screen 201 is indicated by a current reproduction position mark NL on a time line 201T, and a reproducing point in the title of the image displayed in the sub-image display area SG1 is indicated by a read-ahead point PT1 on the time line 201T.

Figure 31A:
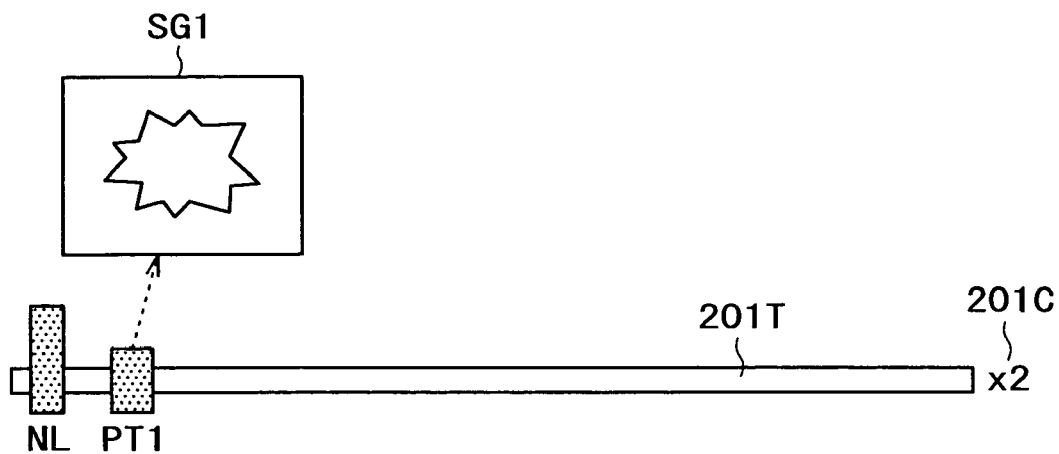
FIGS. 31A to 31C are diagrams of assistance in explaining the automatic setting of reproducing points when the user sets the reproduction speed.

In the example of FIG. 30, as indicated by a reproduction speed 201C, reproduction is performed at a double speed (described as "×2" in FIG. 30). The state shown in FIG. 30 is the same as the state shown in FIG. 31A. When the reproduction speed is the double speed or so, for example, inconveniences of missing an image of a target scene and the like because the speed is too high are less likely to occur.

Figure 31B:
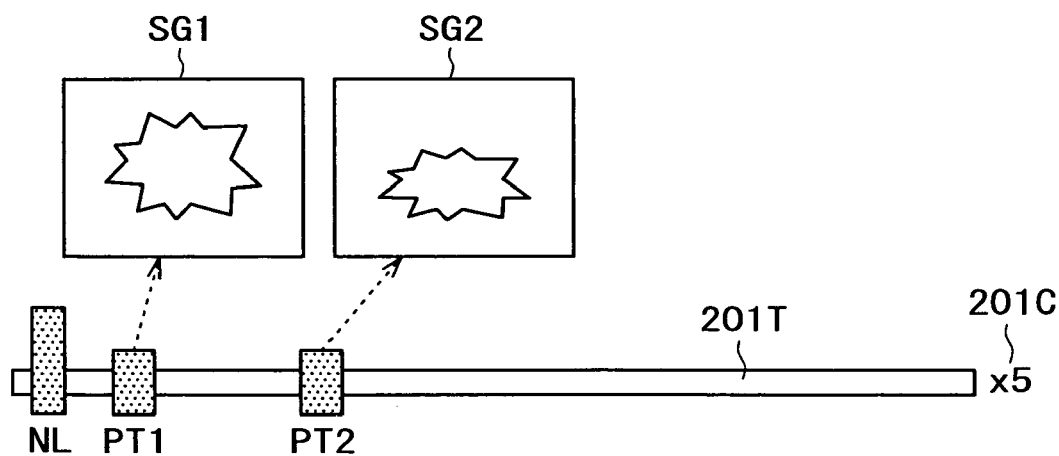

However, when reproduction is performed at a relatively high speed, for example 5× speed, the possibility of missing an image of a target scene is increased. Accordingly, as shown in FIG. 31B, when the 5× speed reproduction is performed, for example, two sub-image display areas SG1 and SG2 are provided, and images reproduced from positions corresponding to read-ahead points PT1 and PT2 separated at a predetermined interval are displayed in the sub-image display areas SG1 and SG2.

Figure 31C:
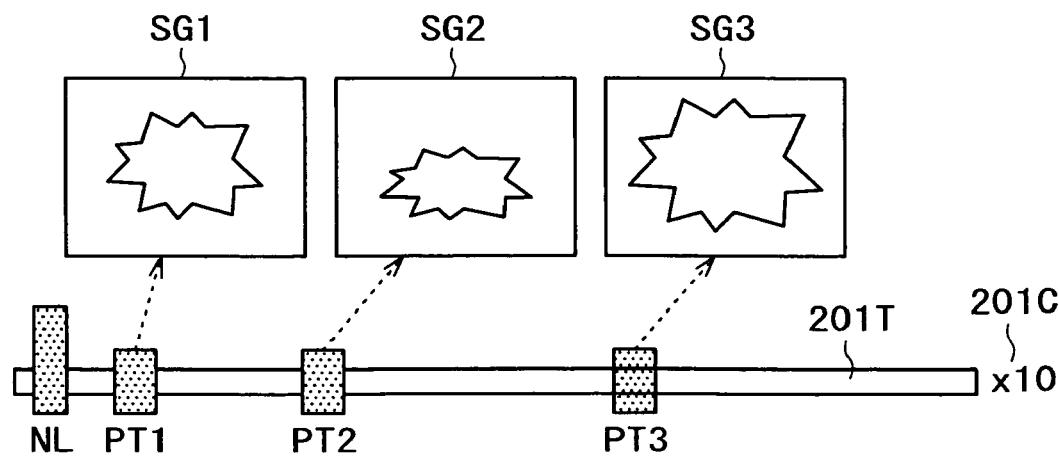

As shown in FIG. 31C, when 10× speed reproduction is performed, for example, three sub-image display areas SG1, SG2 and SG3 are provided, and images reproduced from positions corresponding to read-ahead points PT1, PT2, and PT3 separated at predetermined intervals are displayed in the sub-image display areas.

Thus, by increasing the number of sub-image display areas for displaying images read ahead as the reproduction speed becomes higher, it is possible to check the images read ahead from a plurality of different reproducing points via the plurality of sub-image display areas when the reproduction speed is high, and thus detect a target image of a target scene without missing the target image.

Incidentally, in the third example, the image displayed on the entire surface of the display screen 201 is formed by the multiplexing/separating circuit 16, the MPEG video decoder 23, and the video signal post-processing circuit 24. The images displayed in the sub-image display areas SG1, SG2, SG3, . . . are formed by the multiplexing/separating circuit 16, the MPEG video decoder 23, and the display image forming circuit 50.

Then, the image from the video signal post-processing circuit 24 and the image from the display image forming circuit 50 displayed in one or more sub-image display areas are combined with each other by the combining circuit 26, and the result is output via the NTSC encoder 27.

As described above, the images based on image data from the plurality of reproducing points including the current reproduction position are reproduced simultaneously. The image data sequentially read from the different reproducing points of the recording medium 18 by the buffer control circuit 17 controlled by the CPU 40 is combined and processed as continuous image data from the reproducing points.

When an image of a target scene is displayed in a sub-image display area, a cursor CST movable so as to correspond to each of the reproducing points PT1, PT2, PT3, . . . on the time line 201T is positioned at the target reproducing point, as shown in FIG. 32. Thereby, frame images for setting an edit point are displayed on the display screen with reference to the image of the reproducing point at which the cursor CST is positioned (the image of the reproducing point PT2 in the example of FIG. 32).

In the example of FIG. 32, a total of five frame images including two frames preceding the image of the reproducing point PT2 at which the cursor CST is positioned and two frames succeeding the image of the reproducing point PT2, that is, five frame images PT2−2, PT2−1, PT2, PT2+1, and PT2+2, are displayed in a scrollable mode. Then, a cursor CS movable on the five displayed frame images is moved to thereby select a final edit point and register the final edit point on the recording medium 18.

It is to be noted that while in the description above with reference to FIG. 31, one sub-image display area is used when the reproduction speed is double speed, two sub-image display areas are used when the reproduction speed is 5× speed, and three sub-image display areas are used when the reproduction speed is 10× speed, the present invention is not limited to this.

For example, the number of sub-image display areas to be used according to the reproduction speed may be set arbitrarily, and the intervals between the reproducing points may be set arbitrarily. Further, when two or more sub-image display areas are used, the intervals between the reproducing points including the current reproduction position may be made different from each other by, for example, making the interval between the current reproduction position and the first reproducing point different from the interval between the first reproducing point and the second reproducing point. Of course, the intervals between the reproducing points including the current reproduction position can all be made equal to each other.

FOURTH EXAMPLE

The fourth example reuses edit points registered in the past to thereby enable quick detection and registration of edit points of a title to be edited this time.

In the case of television broadcast programs of a serial drama, for example, though contents of each broadcast program are changed, a commercial is inserted at substantially the same time in many cases. In another case, a segment broadcast at a fixed time in a program broadcast every week may be unnecessary.

In a case where a scene to be subjected to editing, such as movement, deletion and the like, is thus broadcast at a substantially fixed time in a target program, when the recording and reproducing apparatus according to the second embodiment records the program on the recording medium 18 and registers edit points for editing, the information indicating the edit points can be reused because the information indicating the edit points is registered on the recording medium 18.

Specifically, in edit point information recorded on the recording medium 18, a title and one or more edit points are stored in association with each other. A main information signal referred to as a title of a broadcast program or the like recorded on the recording medium 18 is provided with title identifying information.

Hence, when reproducing a title recorded on the recording medium, the CPU 40 determines whether there is edit point information having the same title identifying information, and when there is edit point information having the same title identifying information, the CPU 40 uses the edit point information to form information indicating edit candidate points, and displays the information indicating edit candidate points in combination with a reproduced image.

FIG. 33 and FIG. 34 are diagrams of assistance in explaining an image in which edit candidate point information is displayed by using past edit point information in the fourth example. As shown in FIG. 33, a reproduced image of a title being reproduced is displayed on the entire surface of the display screen 201.

In this case, when edit point information having the same title identifying information as that of the title being reproduced is already present on the recording medium 18, edit candidate points PP1, PP2, and PP3 are displayed on a time line 201T on the basis of the edit point information, and moving images corresponding to the positions indicated by the edit candidate points are displayed in sub-image display areas SG1, SG2, and SG3.

However, even in the case of a serial program broadcast at a fixed time every week, for example, it is difficult to assume that an edit point for a program broadcast last time is exactly the same as an edit point for a program broadcast this time. Even with the same program, an error of a few seconds can occur.

Accordingly, as in the foregoing first to third examples, frame images adjacent to an edit candidate point are displayed in a scrollable mode, and an edit point is determined from among the displayed frame images. FIG. 34 shows a state in which frame images adjacent to an edit candidate point are displayed.

Specifically, in FIG. 34, a cursor CST is positioned at the first edit candidate point PP1 of the three edit candidate points PP1, PP2, and PP3 being displayed. Frame images of two preceding frames and two succeeding frames with reference to the image of the edit candidate point PP1 are displayed in a scrollable mode as images for edit point selection.

In this state, a cursor CS is positioned to a target frame image, a determining operation such as pressing the enter key or the like is performed to thereby determine the edit point, and the determined image position as the edit point is registered in edit point information on the recording medium.

Incidentally, when the left arrow key on the remote control 150 is pressed to position the cursor CS to the leftmost frame image of the five frame images displayed in the frame image display area 201S and thereafter the left arrow key is further pressed, the frame images are scrolled by one frame in the right direction.

When the right arrow key on the remote control 150 is pressed to position the cursor CS to the rightmost frame image of the five frame images displayed in the frame image display area 201S and thereafter the right arrow key is further pressed, the frame images are scrolled by one frame in the left direction.

Incidentally, also in the fourth example, the image displayed on the entire surface of the display screen 201 is formed by the multiplexing/separating circuit 16, the MPEG video decoder 23, and the video signal post-processing circuit 24. The images displayed in the sub-image display areas SG1, SG2, SG3, . . . and the frame images displayed in the frame image display area 201S are formed by the multiplexing/separating circuit 16, the MPEG video decoder 23, and the display image forming circuit 50.

Then, the image from the video signal post-processing circuit 23 and the images from the display image forming circuit 50 are combined with each other by the combining circuit 26, and the result is output via the NTSC encoder 27.

As described above, images based on image data from a plurality of reproducing points are reproduced simultaneously. The image data sequentially read from the different reproducing points of the recording medium 18 by the buffer control circuit 17 controlled by the CPU 40 is combined and processed as continuous image data from the reproducing points.

By thus enabling use of the edit point information registered in the past, it is possible to quickly and accurately set and register an edit point for a broadcast program of a serial drama or the like recorded regularly.

Incidentally, in the description above of the fourth embodiment, a correspondence between the edit point information already registered and a title newly recorded is established by using title identifying information for identifying each title. The title identifying information in this case includes, for example, not only a title name, a title number or the like input by the user or the like, but also information comprising a recording date and time, a day of the week, a broadcasting channel and the like.

Edit candidate points and edit points may be managed throughout using positional information or temporal information with respect to moving images as a whole, such as time codes (time stamps), frame numbers or the like as described above, recording time information, or positional information with respect to the recording medium as a whole.

It is to be noted that while in the embodiments described above, information on chapter marks, information on edit candidate points, and information on edit points are recorded in a separate file provided on the recording medium 18, the present invention is not limited to this. The information on chapter marks, the information on edit candidate points, and the information on edit points may be recorded in a memory of the recording and reproducing apparatus 100.

In this case, when the recording medium 18 is removable, information for identifying the recording medium, information for identifying a title, and information on chapter marks, information on edit candidate points or information on edit points are recorded in association with each other. It is thereby possible to prevent mismatching even when the recording medium 18 is removed and replaced with another recording medium.

Also, the recording medium 18 of the recording and reproducing apparatus 100 is not limited to a hard disk; various recording media such as optical disks, magneto-optical disks, semiconductor memories and the like can be used as the recording medium 18. Further, the recording medium 18 is not limited to being disposed within the recording and reproducing apparatus 100; image information recorded on a hard disk device connected externally or the like can be used as information for reproduction.

Further, while the foregoing embodiments have been described by taking as an example a case where the present invention is applied to a recording and reproducing apparatus using a hard disk as a recording medium, the present invention is not limited to this. The present invention is also applicable to video camera devices. That is, the present invention is applicable to various recording and reproducing apparatus that can capture image information, record the image information on a recording medium, and have a function of reproducing the recorded image information.

The present invention is also applicable to reproducing apparatus having a function of reproducing image information recorded on a recording medium. In this case, even when the reproducing apparatus cannot write information on chapter marks or information on edit points to the recording medium, it suffices to be able to write the information on chapter marks and the information on edit points to a memory of the reproducing apparatus and read the information on chapter marks and the information on edit points as required.

Further, the number of sub-image display areas and the number of still images (thumbnails) displayed for edit point selection are not limited to those of the foregoing embodiments; the number of sub-image display areas and the number of still images (thumbnails) displayed for edit point selection may be increased or decreased according to the size of the display screen or the like.

As described above, according to the present invention, it is possible to perform editing as required basically in the reproduction mode, without the need for properly using two different modes, that is, the reproduction mode and the edit mode, as with conventional recording and reproducing apparatus. Therefore, inconveniences of not knowing an operation for shifting to the edit mode, taking time to shift to the edit mode, or the like are obviated.

In addition, editing operations are very easy because editing operations can be performed by using a very limited number of operating keys of an operating device, such as a remote control or the like. Therefore, inconveniences of frequently causing erroneous operation, missing a target scene while being distracted with operation, or the like are obviated.

Further, a chapter mark is attached to an image of a target scene, and the image provided with the chapter mark and images adjacent thereto can be checked simultaneously as reduced images and displayed in a scrollable manner. Therefore, an image of the target scene can be accurately specified for editing with reference to the image provided with the chapter mark without making a lot of use of conventional functions such as fast forward, fast reverse, frame advance and the like.

Further, it is possible to quickly and accurately find an image of a target scene from image information recorded over a long time.

The invention claimed is:

1. An image processing apparatus, comprising:
designating means for designating one or more frame images from among a plurality of frame images forming a moving image;
extracting means for extracting a group of frame images from the plurality of frame images, the group of frame images including a particular one of the one or more designated frame images, a first predetermined number of frame images which temporally precede the particular frame image, and a second predetermined number of frame images which temporally succeed the particular frame image;
display controlling means for controlling display of at least one of a temporal sequence of frame images formed of the group of frame images; and
specifying means for selecting and specifying a desired frame image from among the temporal sequence of frame images.

2. An image processing apparatus as claimed in claim 1, wherein a number of frame images in said group of frame images is proportional to a display speed of said moving image.

3. An image processing apparatus as claimed in claim 1, wherein said extracting means extracts said one or more frame images on the basis of a predetermined pattern.

4. An image processing apparatus as claimed in claim 3, wherein said pattern corresponds to positional information of a frame image specified previously by said specifying means.

5. An image processing apparatus, comprising:
first extracting means for extracting a predetermined number of frame images from among a plurality of frame images forming a moving image;
first display controlling means for controlling display of a predetermined number of moving images and said predetermined number of frame images as initial images;
first specifying means for selecting and specifying a desired moving image from among said predetermined number of moving images;
designating means for designating an arbitrary frame image from said desired moving image;
second extracting means for extracting a group of frame images from the desired moving image, the group of frame images including said arbitrary frame image, a first predetermined number of frame images which temporally precede the arbitrary frame image, and a second predetermined number of frame images which temporally succeed said arbitrary frame image;
second display controlling means for controlling display of at least one of a temporal sequence of frame images formed of the group of frame images; and
second specifying means for selecting and specifying a desired frame image from among said temporal sequence of frame images.

6. An image processing apparatus as claimed in claim 5, wherein said predetermined number of frame images is proportional to a display speed of said predetermined number of moving images.

7. An image processing apparatus as claimed in claim 5, wherein said first display controlling means effects control such that at least one of said predetermined number of moving images is displayed at a different display speed than a remainder of said predetermined number of moving images.

8. An image processing apparatus as claimed in claim 5, wherein said second display controlling means controls the display of said group of frame images when a position of said arbitrary frame image coincides with a position of a frame image forming at least one moving image of said predetermined number of moving images.

9. An image processing apparatus as claimed in claim 5, wherein said first extracting means extracts said predetermined number of frame images on the basis of a predetermined pattern.

10. An image processing apparatus as claimed in claim 9, wherein said pattern corresponds to positional information of a frame image specified previously by said second specifying means.

11. An image processing method, comprising: using an image processing apparatus to perform the following:
designating one or more frame images from among a plurality of frame images forming a moving image;
extracting a group of frame images from the plurality of frame images, the group of frame images including a particular one of the one or more designated frame images, a first predetermined number of frame images which temporally precede the particular frame image, and a second predetermined number of frame images which temporally succeed the particular frame image;

controlling display of at least one of a temporal sequence of frame images formed of the group of frame images; and selecting and specifying a desired frame image from among the temporal sequence of frame images.

12. An image processing method as claimed in claim 11, wherein a number of frame images in the group of frame images is proportional to a display speed of the moving image.

13. An image processing method as claimed in claim 11, wherein said extracting step includes extracting the one or more frame images on the basis of a predetermined pattern.

14. An image processing method as claimed in claim 13, wherein the pattern corresponds to positional information of a frame image specified previously in said selecting and specifying step.

15. An image processing method, comprising: using an image processing apparatus to perform the following:

extracting a predetermined number of frame images from among a plurality of frame images forming a moving image;

controlling display of a predetermined number of moving images and the predetermined number of frame images as initial images;

selecting and specifying a desired moving image from among the predetermined number of moving images;

designating an arbitrary frame image from the desired moving image;

extracting a group of frame images from the desired moving image, the group of frame images including the arbitrary frame image, a first predetermined number of frame images which temporally precede the arbitrary frame image, and a second predetermined number of frame images which temporally succeed the arbitrary frame image;

controlling display of at least one of a temporal sequence of frame images formed of the group of frame images; and selecting and specifying a desired frame image from among the temporal sequence of frame images.

16. An image processing method as claimed in claim 15, wherein the predetermined number of frame images is proportional to a display speed of the predetermined number of moving images.

17. An image processing method as claimed in claim 15, wherein the display of the predetermined number of moving images is controlled such that at least one of the predetermined number of moving images is displayed at a different display speed than a remainder of the predetermined number of moving images.

18. An image processing method as claimed in claim 15, wherein the group of frame images is displayed when a position of the arbitrary frame image coincides with a position of a frame image forming at least one moving image of the predetermined number of moving images.

19. An image processing method as claimed in claim 15, wherein said step of extracting the predetermined number of frame images includes extracting the predetermined number of frame images on the basis of a predetermined pattern.

20. An image processing method as claimed in claim 19, wherein the pattern corresponds to positional information of a frame image specified previously in said step of specifying and selecting said desired frame image.

21. A computer-readable medium having recorded therein a computer program having instructions for executing an image processing method, said image processing method comprising:

designating one or more frame images from among a plurality of frame images forming a moving image;

extracting a group of frame images from the plurality of frame images, the group of frame images including a particular one of the one or more designated frame images, a first predetermined number of frame images which temporally precede the particular frame image, and a second predetermined number of frame images which temporally succeed the particular frame image;

controlling display of at least one of a temporal sequence of frame images formed of the group of frame images; and receiving selection and specification of a desired frame image from among the temporal sequence of frame images.

22. A computer-readable medium as claimed in claim 21, wherein a number of frame images in the group of frame images is proportional to a display speed of the moving image.

23. A computer-readable medium as claimed in claim 21, wherein said extracting step includes extracting the one or more frame images on the basis of a predetermined pattern.

24. A computer-readable medium as claimed in claim 23, wherein the pattern corresponds to positional information of a frame image specified previously in said receiving step.

25. A computer-readable medium having recorded therein a computer program having instructions for executing an image processing method, said image processing method comprising:

extracting a predetermined number of frame images from among a plurality of frame images forming a moving image;

controlling display of a predetermined number of moving images and the predetermined number of frame images as initial images;

receiving a selection and specification of a desired moving image from among the predetermined number of moving images;

designating an arbitrary frame image from the desired moving image;

controlling the display of a group of frame images from the desired moving image, the group of frame images including the arbitrary frame image, a first predetermined number of frame images temporally precede the arbitrary frame image, and a second predetermined number of frame images which temporally succeed the arbitrary frame image;

controlling display of at least one of a temporal sequence of frame images formed of the group of frame images; and receiving a selection and specification of a desired frame image from temporal sequence the group of frame images.

26. A computer-readable medium as claimed in claim 25, wherein the predetermined number of frame images is proportional to a display speed of the predetermined number of moving images.

27. A computer-readable medium as claimed in claim 25, wherein the display of the predetermined number of moving images is controlled such that at least one of the predetermined number of moving images is displayed at a different display speed than a remainder of the predetermined number of moving images.

28. A computer-readable medium as claimed in claim 25, wherein the group of frame image is displayed when a position of the arbitrary frame image coincides with a position of a frame image forming at least one moving image of the predetermined number of moving images.

29. A computer-readable medium as claimed in claim 25, wherein said step of extracting the predetermined number of frame images includes extracting the predetermined number of frame images on the basis of a predetermined pattern.

30. A computer-readable medium as claimed in claim 29, wherein the pattern corresponds to positional information of a frame image specified previously in said step of receiving the selection and specification of the desired frame image.

\* \* \* \* \*